(12) United States Patent
De Sousa Webber

(10) Patent No.: US 11,714,602 B2
(45) Date of Patent: *Aug. 1, 2023

(54) METHODS AND SYSTEMS FOR IDENTIFYING A LEVEL OF SIMILARITY BETWEEN A PLURALITY OF DATA REPRESENTATIONS

(71) Applicant: cortical.io AG, Vienna (AT)

(72) Inventor: Francisco De Sousa Webber, Vienna (AT)

(73) Assignee: cortical.io AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,264

(22) Filed: Dec. 1, 2021

(65) Prior Publication Data

US 2022/0091817 A1    Mar. 24, 2022

Related U.S. Application Data

(63) Continuation of application No. 16/744,582, filed on Jan. 16, 2020, now Pat. No. 11,216,248, which is a
(Continued)

(51) Int. Cl.
*G06F 7/20*     (2006.01)
*G06F 16/2455*  (2019.01)
(Continued)

(52) U.S. Cl.
CPC ............ *G06F 7/20* (2013.01); *G06F 16/2455* (2019.01); *G06F 16/3347* (2019.01); *G06F 40/205* (2020.01); *G06F 40/279* (2020.01)

(58) Field of Classification Search
CPC ....................................................... G06F 7/20
See application file for complete search history.

(56) References Cited

U.S. PATENT DOCUMENTS 5,369,764 A    11/1994   Blair
5,778,362 A     7/1998   Deerwester
(Continued)

FOREIGN PATENT DOCUMENTS

CN    1489086 A     4/2004
CN    101251862 B   6/2010
(Continued)

OTHER PUBLICATIONS

Ampazis, N., et al., LSISOM—A Latent Semantic Indexing Approach to Self-Organizing Maps of Document Collections, Neural Processing Letters 00: 1-17, 2004 Kluwer Academic Publishers, 17 pages.
(Continued)

*Primary Examiner* — Van H Oberly
(74) *Attorney, Agent, or Firm* — Blueshift IP, LLC; Cynthia M. Gilbert

(57) ABSTRACT

A reference map generator clusters, into a semantic map, a set of data documents selected according to at least one criterion and associated with a medical diagnosis. A parser generates an enumeration of measurements occurring in the set of data documents. A representation generator generates for each measurement in the enumeration, a sparse distributed representation (SDR). The method includes storing, by a processor on a second computing device, in each of a plurality of memory cells on the second computing device, one of the generated SDRs. A diagnosis support module receives a document comprising a plurality of measurements. The representation generator generates a compound SDR for the document. Each of the plurality of bitwise comparison circuits determine a level of overlap between the compound SDR and the stored generated SDR. The diagnosis support module provides an identification of the medical diagnosis associated with a stored SDR.

4 Claims, 35 Drawing Sheets

Related U.S. Application Data continuation of application No. 15/785,985, filed on Oct. 17, 2017, now Pat. No. 10,572,221.

(60) Provisional application No. 62/410,418, filed on Oct. 20, 2016.

(51) Int. Cl.
  *G06F 16/33* (2019.01)
  *G06F 40/205* (2020.01)
  *G06F 40/279* (2020.01)

(56) References Cited

U.S. PATENT DOCUMENTS

| | | | |
|---|---|---|---|
| 5,787,422 | A | 7/1998 | Tukey |
| 5,907,840 | A | 5/1999 | Evans |
| 6,122,626 | A | 9/2000 | Brandsma |
| 6,260,036 | B1 | 7/2001 | Almasi |
| 6,523,026 | B1 | 2/2003 | Gillis |
| 6,654,742 | B1 | 11/2003 | Kobayashi et al. |
| 6,675,159 | B1 | 1/2004 | Lin et al. |
| 6,687,812 | B1 | 2/2004 | Shimada |
| 6,721,721 | B1 | 4/2004 | Bates et al. |
| 6,787,422 | B2 | 9/2004 | Ang |
| 6,922,700 | B1 | 7/2005 | Aggarwal |
| 7,036,072 | B1 | 4/2006 | Sulistio et al. |
| 7,068,787 | B1 | 6/2006 | Ta |
| 7,502,779 | B2 | 3/2009 | Brockway et al. |
| 7,707,206 | B2 | 4/2010 | Encina |
| 7,739,208 | B2 | 6/2010 | George |
| 7,937,342 | B2 | 5/2011 | George |
| 7,971,150 | B2 | 6/2011 | Raskutti et al. |
| 8,037,010 | B2 | 10/2011 | Jaros |
| 8,103,603 | B2 | 1/2012 | George |
| 8,504,570 | B2 | 8/2013 | Hawkins et al. |
| 8,676,802 | B2 | 3/2014 | Zelevinsky et al. |
| 10,394,851 | B2 | 8/2019 | De Sousa Webber |
| 10,394,854 | B2 | 8/2019 | Mitra et al. |
| 10,572,221 | B2 | 2/2020 | Webber |
| 10,885,089 | B2 | 1/2021 | De Sousa Webber |
| 11,216,248 | B2 | 1/2022 | De Sousa Webber |
| 2001/0027391 | A1 | 10/2001 | Yasunaga et al. |
| 2002/0129015 | A1 | 9/2002 | Caudill et al. |
| 2002/0165884 | A1 | 11/2002 | Kreulen et al. |
| 2003/0110181 | A1 | 6/2003 | Schuetze et al. |
| 2004/0103070 | A1 | 5/2004 | Joseph |
| 2006/0020595 | A1 | 1/2006 | Norton et al. |
| 2006/0155751 | A1 | 7/2006 | Geshwind |
| 2006/0212413 | A1* | 9/2006 | Rujan ............... G06F 16/355 706/20 |
| 2007/0124293 | A1 | 5/2007 | Lakowske et al. |
| 2007/0136336 | A1 | 6/2007 | Shanahan et al. |
| 2007/0250521 | A1 | 10/2007 | Kaminski, Jr. |
| 2007/0276774 | A1 | 11/2007 | Ahmad |
| 2008/0005221 | A1 | 1/2008 | Irlam et al. |
| 2008/0059389 | A1 | 3/2008 | Jaros |
| 2008/0256067 | A1 | 10/2008 | Nelson |
| 2009/0024598 | A1 | 1/2009 | Xie et al. |
| 2009/0049067 | A1 | 2/2009 | Murray |
| 2009/0307213 | A1 | 12/2009 | Deng |
| 2010/0191684 | A1 | 7/2010 | George |
| 2010/0205123 | A1 | 8/2010 | Sculley et al. |
| 2011/0047156 | A1 | 2/2011 | Knight et al. |
| 2011/0078159 | A1 | 3/2011 | Li et al. |
| 2011/0225108 | A1 | 9/2011 | Hawkins |
| 2012/0011124 | A1 | 1/2012 | Bellegarda |
| 2012/0210423 | A1 | 8/2012 | Friedrichs et al. |
| 2012/0239662 | A1 | 9/2012 | Tanaka |
| 2012/0254192 | A1 | 10/2012 | Gelbard |
| 2013/0054552 | A1* | 2/2013 | Hawkins ............ G06N 20/00 707/706 |
| 2013/0132411 | A1 | 5/2013 | Pfeifle |
| 2013/0246322 | A1 | 9/2013 | De Sousa Webber |
| 2014/0046985 | A1 | 2/2014 | Gauthier |
| 2014/0223296 | A1 | 8/2014 | Solmer et al. |
| 2014/0279727 | A1 | 9/2014 | Baraniuk |
| 2014/0310226 | A1 | 10/2014 | Marianetti, II et al. |
| 2015/0019530 | A1 | 1/2015 | Felch |
| 2015/0058320 | A1 | 2/2015 | Zheng et al. |
| 2015/0178378 | A1 | 6/2015 | Hellstrom et al. |
| 2015/0269484 | A1 | 9/2015 | Hawkins et al. |
| 2016/0034560 | A1 | 2/2016 | Setayesh |
| 2016/0042053 | A1 | 2/2016 | Webber et al. |
| 2016/0054940 | A1 | 2/2016 | Khoueir |
| 2017/0053025 | A1 | 2/2017 | De Sousa Webber |
| 2018/0113676 | A1 | 4/2018 | De Sousa Webber |
| 2019/0332619 | A1 | 10/2019 | De Sousa Webber |
| 2020/0150922 | A1 | 5/2020 | De Sousa Webber |
| 2021/0049198 | A1 | 2/2021 | De Sousa Webber |
| 2022/0156303 | A1 | 5/2022 | De Sousa Webber |

FOREIGN PATENT DOCUMENTS

| | | |
|---|---|---|
| CN | 105956010 A | 9/2016 |
| EP | 1049030 A1 | 11/2000 |
| EP | 1426882 A2 | 6/2004 |
| EP | 2639749 B1 | 9/2013 |
| JP | 2015056077 A | 3/2015 |
| WO | 2016020368 A1 | 2/2016 |

OTHER PUBLICATIONS

Bishop, C.M., "Neural Networks for Pattern Recognition," Oxford University Press, New York, 1995/2010.

Communication Pursuant to Article 94(3) EPC and Annex to Communication in connection with EP12159672, dated Apr. 24, 2013, 7 pages.

Communication pursuant to Article 94(3) EPC in connection with EP12159672, dated Nov. 15, 2013, 9 pages.

Communication Under Rule 71(3) EPC Intention to Grant in connection with EP12159672, dated Jul. 20, 2016, 5 pages.

Examination Report dated Dec. 1, 2021, in Indian patent application No. 201947015229, 6 pages.

Examination Report dated Jan. 31, 2020, in Indian patent application No. 7518/DELNP/2014, 7 pages.

Examiner's Report received in Canadian Patent Application No. 2,864,946 dated Aug. 6, 2018, 4 pages.

Extended European Search Report and Written Opinion in connection with EP12159672, dated Jul. 10, 2012, 9 pages.

Final Office Action dated Jul. 11, 2019, in U.S. Appl. No. 15/219,851 of Francisco Eduardo De Sousa Nebber, filed Jun. 26, 2016, 31 pages.

Final Office Action dated Mar. 22, 2021, in U.S. Appl. No. 16/510,108 of Francisco Eduardo De Sousa Webber, filed Jul. 12, 2019, 35 pages.

First Examination Report dated Oct. 16, 2020, in Australian patent application No. 2016311039, 4 pages.

First Office Action dated Jul. 6, 2021, in Japanese patent application No. 2019-521400, 7 pages.

First Office Action dated Jul. 20, 2021, in Canadian patent application No. 2,950,676, 3 pages.

H. Ichiki et al.: "Multi-Layer Self-Organizing Semantic Maps," in A Publication of Electronics, Information and Systems Society (vol. 113-C, No. 1), 1993 Published by the Transaction of the Institute of Electrical Engineering of Japan, 15 pages.

Hawkins, J., et al., "Sequence Memory for Prediction, Inference and Behaviour," Philosophical Transactions of the Royal Society of London, Series B, Biological Sciences, 364(1521), pp. 1203-1209, 2009.

Hawkins, J., et al., "Hierarchical Temporal Memory Concepts, Theory, and Terminology," [online]. Mar. 27, 2007, [originally retrieved on Jul. 25, 2012], pp. 1-20. Retrieved from the Internet: <URL http://www.numenta.com/Numenta_HTM_Concepts.pdf>.

Hawkins, J., et al., "Hierarchical Temporal Memory Including HTM Cortical Learning Algorithms," Whitepaper of Numenta, Inc., Version 0.2.1, [online], Sep. 12, 2011, [retrieved on Jul. 11, 2016], pp.

(56) References Cited

OTHER PUBLICATIONS 1-68. Retrieved from the Internet: <URL http://numenta.com/assets/pdf/whitepapers/hierarchical-temporal-memory-cortical-learning-algorithm-0.2.1-en pdf>.
Honkela, T., et al., Adaptive Translation: Finding Interlingual Mappings Using Self-Organizing Maps, Artificial Neural Networks—ICANN 2008, 18th International Conference, Prague, Czech Republic, Sep. 3-6, 2008, Proceedings, Part 1, vol. 5163 of the series Lecture Notes in Computer Science, pp. 603-612, Springer Berlin Heidelberg 2008.
International Preliminary Report on Patentability in connection with PCT/EP2013/053546, dated Jun. 16, 2014, 9 pages.
International Preliminary Report on Patentability in connection with PCT/EP2015/067918, dated Feb. 7, 2017, 7 cages.
International Preliminary Report on Patentability, dated Apr. 23, 2019, by The International Bureau of WIPO in International Patent Application No. PCT/EP2017/076681, 13 pages.
International Search Report and Written Opinion in connection with PCT/EP2015/067918, dated Oct. 9, 2015, 10 pages.
International Search Report and Written Opinion in connection with PCT/EP2016/068329, dated Oct. 20, 2016, 8 pages.
International Search Report and Written Opinion of the International Searching Authority in connection with PCT/EP2017/076681, dated Feb. 5, 2018, 16 pages.
Invitation Pursuant to Article 94(3) and Rule 71(1) EPC, including Annex to Result of Consultation by Telephone in connection with EP12159672, dated Apr. 28, 2015, 8 pages.
Kaski, S., et al., "Websom-Self-Organizing Maps of Document Collections," Neurocomputing, 21(1-3), pp. 101-117, 1998.
Kohonen, T., et al., "Self-Organizing Maps of Symbol Strings," Neurocomputing, 21(1-3), pp. 19-30, 1998.
Kohonen, Teuvo, "The Self-Organizing Map," Proceedings of the IEEE, vol. 78, No. 9, Sep. 1990, 17 pages.
Korean Patent Application No. 10-2014-7023545, Office Action dated Apr. 29, 2019.
Li, Yuan et al., "Association Retrieve Based on Concept Semantic Space," Journal of Beijing Technology University, pp. 577-580, Dec. 25, 2001.
Merkl, D., "Text Classification with Self-Organizing Maps: Some Lessons Learned," Neurocomputing, 21(1-3), pp. 51-77, 1998.
Non-Final Office Action dated Aug. 6, 2021, in U.S. Appl. No. 16/510,108 of Francisco Eduardo De Sousa Webber, filed Jul. 12, 2019, 24 pages.
Non-Final Office Action dated Aug. 13, 2018, in U.S. Appl. No. 14/816,133, filed Aug. 3, 2015, De Sousa Webber, 9 pages.
Non-Final Office Action dated Jan. 12, 2018, in U.S. Appl. No. 14/816,133, filed Aug. 3, 2015, De Sousa Webber, 22 pages.
Non-Final Office Action dated Jun. 26, 2020, in U.S. Appl. No. 16/510,108 of Francisco Eduardo De Sousa Webber, filed Jul. 12, 2019, 70 pages.
Non-Final Office Action dated Mar. 16, 2021, in U.S. Appl. No. 16/744,582 of Francisco Eduardo De Sousa Webber, filed Jan. 16, 2020, 49 pages.
Non-Final Office Action dated May 14, 2020, in U.S. Appl. No. 15/219,851 of Francisco Eduardo De Sousa Webber, filed Jul. 26, 2016, 28 pages.
Non-Final Rejection dated Jan. 3, 2019, in U.S. Appl. No. 15/219,851 of Francisco Eduardo De Sousa Webber, filed Jun. 26, 2016, 33 pages.
Non-Final Rejection dated Mar. 10, 2014, in related U.S. Appl. No. 13/441,138, filed Apr. 6, 2012, De Sousa Webber, 20 pages.
Non-Final Rejection dated May 30, 2019, in U.S. Appl. No. 15/785,985, filed Oct. 17, 2017, Francisco De Sousa Webber, 23 pages.
Notice of Allowance dated Aug. 20, 2020, in U.S. Appl. No. 15/219,851 of Francisco Eduardo De Sousa Webber, filed Jul. 26, 2016, 17 pages.
Notice of Allowance dated Mar. 27, 2019, in U.S. Appl. No. 14/816,133, filed Aug. 3, 2015, De Sousa Webber, 8 pages.
Notice of Allowance dated May 29, 2019, in U.S. Appl. No. 14/816,133, filed Aug. 3, 2015, De Sousa Webber, 7 pages.
Notice of Allowance dated Oct. 21, 2019, in U.S. Appl. No. 15/785,985, filed Oct. 17, 2017, Francisco De Sousa Webber, 9 pages.
Notice of Allowance dated Sep. 3, 2021, in U.S. Appl. No. 16/744,582, filed Jan. 16, 2020, Francisco De Sousa Webber, 30 pages.
Notice of Allowance dated Sep. 16, 2014, in U.S. Appl. No. 13/441,138, filed Apr. 6, 2012, De Sousa Webber, 26 pages.
Notification of Reasons for Refusal issued by the Japanese Patent Office in patent application No. 2014-561350, dated Feb. 6, 2017, 9 pages.
Observations according to Article 34 PCT in connection with PCT/EP2013/053546, dated Mar. 27, 2014, 8 pages.
Office Action dated Sep. 21, 2021, in Korean patent application No. 10-2017-7003305, 5 pages.
Final Office Action received in U.S. Appl. No. 16/510,108 dated Apr. 15, 2022, 42 pages.
International Search Report and Written Opinion dated Feb. 18, 2022, in international patent application No. PCT/EP2021/082138, 12 pages.
Renato Fernandes Correa et al., "Improving Self-Organization of Document Collections by Semantic Mapping," Neurocomputing, Elsevier, Amsterdam, NL, vol. 70, No. 1-3, Dec. 2006, pp. 62-69, XP027970334, ISSN 0925-2312.
Summons to attend oral proceedings pursuant to Rule 115(1) EPC dated Apr. 11, 2022, in European patent application No. 17816444.8, 14 pages.
Office Examination Report No. 1 received in Australian patent application No. 2013231564, dated Jul. 24, 2017, 4 pages.
Office Examination Report No. 1 received in Australian patent application No. 2015299050, dated Mar. 31, 2020, 4 pages.
Office Examination Report No. 2 received in Australian patent application No. 2015299050, dated Jul. 30, 2020, 4 pages.
Plate, T., "Distributed Representations", Encyclopedia of Cognitive Science, Article No. 59, pp. 1-15 (Sep. 29, 2003).
Polzlbauer, G., et al., "Advanced Visualization of Self-Organizing Maps with Vector Fields," IEEE Transactions on Neural Networks, 19, pp. 911-922, 2006.
Rachkovskij, et at, Similarity-based Retrieval with Structure-Sensitive Sparse Binary Distributed Representations, Computational Intelligence, Mar. 2012.
Rey, G.D., et al., "Neurale Netze," 2nd edition, Hans Huber, Hofgrefe AG, Bem, 2011.
Ritter, H., et al., "Self-Organizing Semantic Maps," Biological Cybernetics, Springer Verlag Heidelberg, vol. 61, No. 1, Aug. 1, 1989, pp. 241-254.
Rodriguez, A., et al., "Derivation and Analysis of Basic Computational Operations of Thalamocortical Circuits," Journal of Cognitive Neuroscience, 16:5, pp. 856-877, 2004.
Rodriguez, RJ., et al., "Towards a Hierarchical Temporary Memory Based Self-Managed Dynamic Trust Replication Mechanism in Cognitive Mobile Ad-hoc Networks," Proceedings of the 10th WSEAS International Conference on Artificial Intelligence, Knowledge Engineering and Data Bases, 2011.
Somervuo, P. J., "Online Algorithm for the Self-Organizing Map of Symbol Strings," Neural Networks, Elsevier Science Publishers, Barking, GB, vol. 17, No. 8-9, Oct. 1, 2004, pp. 1231-1239.
Starzyk, Ja, et al., "Spatio-Temporal Memories for Machine Learning: A Long-Term Memory Organization," IEEE Transactions of Neural Networks, 20(5), pp. 768-780, 2009.
State Intellectual Property Office of the People's Republic of China First Office Action in connection with PCT2013/80013771.8, dated May 19, 2016, 16 pages.
State Intellectual Property Office of the People's Republic of China Second Office Action for 201380013771.8, dated Feb. 4, 2017, 11 pages.
State Intellectual Property Office of the People's Republic of China Third Office Action for 201380013771.8, dated May 31, 2017.
Summons to Attend Oral Proceedings Pursuant to Rule 115(1) EPC in connection with EP12159672, dated Jan. 19, 2016, 10 pages.
Vesanto, J., et al., "Clustering of the Self-Organizing Map," IEEE Transactions on Neural Networks, 11 (3), pp. 586-600, 2000.

(56) References Cited

OTHER PUBLICATIONS

Written Opinion of the International Preliminary Examining Authority in connection with PCT/EP2013/053546, dated Mar. 11, 2014, 8 pages.
Written Opinion of the International Searching Authority dated Apr. 23, 2013, in connection with PCT/EP2013/053546, 8 pages.
Yang, H., et al. "Mining Multilingual Texts Using Growing Hierarchical Self-Organizing Maps," Machine Learning and Cybernetics, 2007 International Conference on Machine Learning and Cybernetics, Hong Kong, Aug. 2007, pp. 2263-2268.
Examination Report mailed in Canadian patent application No. 2,992,822, dated Nov. 9, 2022, 3 pages.
First Office Action dated Jul. 19, 2022 in Chinese patent application No. 10-2019-7011423, 11 pages (translation included).
Non-Final Office Action dated Sep. 23, 2022, in U.S. Appl. No. 17/086,797 of Francisco Eduardo De Sousa Webber, filed Nov. 2, 2020, 25 pages.
U.S. Appl. No. 14/816,133, filed Aug. 3, 2015.
U.S. Appl. No. 16/510,108, filed Jul. 12, 2019.
U.S. Appl. No. 15/219,851, filed Jul. 26, 2016.
U.S. Appl. No. 17/086,797, filed Nov. 1, 2020.
U.S. Appl. No. 15/785,985, filed Oct. 17, 2017.
U.S. Appl. No. 16/744,582, filed Jan. 16, 2020.
U.S. Appl. No. 17/526,474, filed Nov. 15, 2021.
Non-Final Rejection dated Mar. 31, 2023, in U.S. Appl. No. 16/510,108 of Francisco Eduardo De Sousa Webber, filed Jul. 12, 2019, 36 pages.
Notice of Allowance dated Feb. 21, 2023, in U.S. Appl. No. 17/526,474 of Francisco De Sousa Webber, filed Nov. 15, 2021, 65 pages.
Second Office Action dated Jan. 31, 2023 in Korean patent application No. 10-2019-7011423, 6 pages.

\* cited by examiner

METHODS AND SYSTEMS FOR IDENTIFYING A LEVEL OF SIMILARITY BETWEEN A PLURALITY OF DATA REPRESENTATIONS

CROSS-REFERENCE TO RELATED APPLICATIONS

This application is a continuation of U.S. patent application Ser. No. 16/744,582, filed on Jan. 16, 2020, entitled "Methods and Systems for Identifying a Level of Similarity Between a Plurality of Data Representations", which application is a continuation of U.S. patent application Ser. No. 15/785,985, filed on Oct. 17, 2017, now U.S. Pat. No. 10,572,221, issued Feb. 25, 2020, entitled "Methods and Systems for Identifying a Level of Similarity Between a Plurality of Data Representations", which itself claims priority from U.S. Provisional Patent Application Ser. No. 62/410,418, filed on Oct. 20, 2016, entitled "Methods and Systems for Identifying a Level of Similarity Between a Plurality of Data Representations," each of which is hereby incorporated by reference.

BACKGROUND

In conventional systems, the use of self-organizing maps is typically limited to clustering data documents by type and to either predicting where an unseen data document would be clustered to, or analyzing the cluster structure of the used data document collection. Such conventional systems do not typically provide functionality for using the resulting "clustering map" as a "distributed semantic projection map" for the explicit semantic definition of the data document's constituent data items. Furthermore, conventional systems typically use conventional processor-based computing to execute methods for using self-organizing maps.

BRIEF SUMMARY

In one aspect, a computer-implemented method for identifying a level of similarity between a first data item and a data item within a set of data documents includes clustering, by a reference map generator executing on a first computing device, in a two-dimensional metric space, a set of data documents selected according to at least one criterion, generating a semantic map. The method includes associating, by the semantic map, a coordinate pair with each of the set of data documents. The method includes generating, by a parser executing on the first computing device, an enumeration of data items occurring in the set of data documents. The method includes determining, by a representation generator executing on the first computing device, for each data item in the enumeration, occurrence information including: (i) a number of data documents in which the data item occurs, (ii) a number of occurrences of the data item in each data document, and (iii) the coordinate pair associated with each data document in which the data item occurs. The method includes generating, by the representation generator, for each data item in the enumeration, a sparse distributed representation (SDR) using the occurrence information, resulting in a plurality of generated SDRs. The method includes storing, by a processor on a second computing device, in each of a plurality of memory cells on the second computing device, one of the plurality of generated SDRs, each of the plurality of memory cells including a bitwise comparison circuit. The method includes receiving, by the second computing device, from a third computing device, a first data item. The method includes providing, by the processor, via a data bus, to each of the plurality of memory cells, an SDR of the first data item. The method includes determining, by each of the plurality of bitwise comparison circuits, a level of overlap between the SDR of the first data item and the generated SDR stored in the memory cell associated with the bitwise comparison circuit. The method includes determining, by each of the plurality of bitwise comparison circuits, whether the level of overlap satisfies a threshold provided by the processor. The method includes providing, to the processor, by each of the comparison circuits that determined the level of overlap did satisfy the threshold, a document reference number stored in the associated memory cell, the document reference number identifying a document including the data item from which the SDR stored in the memory cell was generated. The method includes providing, by the second computing device, to the third computing device, an identification of each data item from which the SDRs stored in the memory cells satisfying the threshold were generated and a level of similarity between the data item from which the stored SDR was generated and the received data item.

In another aspect, a computer-implemented method for identifying a level of similarity between binary vectors includes storing, by a processor on a computing device, in each of a plurality of memory cells on the computing device, one of a plurality of binary vectors, each of the plurality of memory cells including a bitwise comparison circuit. The method includes receiving, by the computing device, a binary vector for comparing to each of the stored plurality of binary vectors. The method includes providing, by a processor, via a data bus, to each of the plurality of memory cells, the received binary vector. The method includes determining, by each of the bitwise comparison circuits, a level of overlap between the received binary vector and the binary vector stored in the memory cell associated with the bitwise comparison circuit. The method includes determining, by each of the plurality of bitwise comparison circuits, whether the level of overlap satisfies a threshold provided by the processor. The method includes providing, to the processor, by each of the comparison circuits that determined the level of overlap did satisfy the threshold, an identification of the stored binary vector with the satisfactory level of overlap. The method includes providing, by the processor, an identification of each stored binary vector satisfying the threshold and a level of similarity between the stored binary vector and the received binary vector.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for identifying a level of similarity between a plurality of data representations. In one of these embodiments, the identification is based upon determined distances between sparse distributed representations (SDRs) or any other type of long binary vector.

Figure 1A:
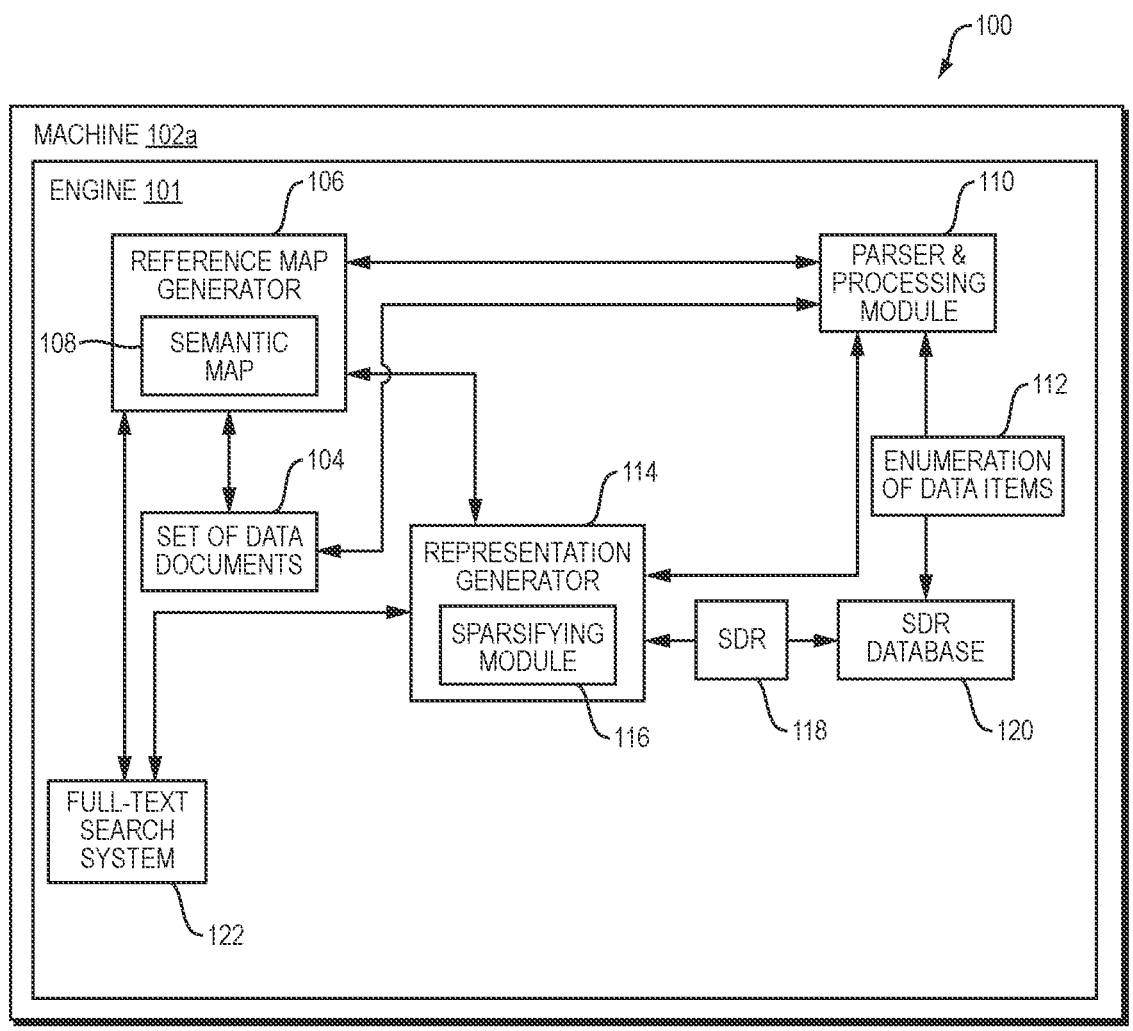
FIG. 1A is a block diagram depicting an embodiment of a system for mapping data items to sparse distributed representations.

Referring now to FIG. 1A, a block diagram depicts one embodiment of a system for mapping data items to sparse distributed representation. In brief overview, the system 100 includes an engine 101, a machine iota, a set of data documents 104, a reference map generator 106, a semantic map 108, a parser and preprocessing module 110, an enumeration of data items 112, a representation generator 114, a sparsifying module 116, one or more sparse distributed representations (SDRs) 118, a sparse distributed representation (SDR) database 120, and a full-text search system 122. In some embodiments, the engine 101 refers to all of the components and functionality described in connection with FIGS. 1A-1C and 2.

Referring now to FIG. 1A, and in greater detail, the system includes a set of data documents 104. In one embodiment, the documents in the set of data documents 104 include text data. In another embodiment, the documents in the set of data documents 104 include variable values of a physical system. In still another embodiment, the documents in the set of data documents 104 include medical records of patients. In another embodiment, the documents in the set of data documents 104 include chemistry-based information (e.g., DNA sequences, protein sequences, and chemical formulas). In yet another embodiment, each document in the set of data documents 104 includes musical scores. The data items within data documents 104 may be words, numeric values, medical analyses, medical measurements, and musical notes. The data items may be strings of any type (e.g., a string including one or more numbers). The data items in a first set of data documents 104 may be different language than the data items in a second set of data documents 104. In some embodiments, the set of data documents 104 includes historic log data. A "document" as used herein may refer to a collection of data items each of which corresponds to a system variable originating from the same system. In some embodiments, system variables in such a document are sampled concurrently.

As indicated above the use of "data item" herein encompasses words as string data, scalar values as numerical data, medical diagnoses and analyses as numeric data or class-data, musical notes and variables of any type all coming from a same "system." The "system" may be any physical system, natural or artificial, such as a river, a technical device, or a biological entity such as a living cell or a human organism. The system may also be a "conceptual system" such as a language or web server log-data. The language can be a natural language such as English or Chinese, or an artificial language such as JAVA or C++ program code. As indicated above, the use of "data document" encompasses a set of "data items." These data items may be interdependent by the semantics of the underlying "system." This grouping can be a time based group, if all data item values are sampled at the same moment; for example, measurement data items coming from the engine of a car can be sampled every second and grouped into a single data document. This grouping can also be done along a logical structure characterized by the "system" itself, for example in natural language, word data items can be grouped as sentences, while in music, data items corresponding to notes can be grouped by measures. Based on these data documents, document vectors can be generated by the above methods (or according to other methods as understood by those of ordinary skill in the art) in order to generate a semantic map of the "system," as will be described in greater detail below. Using this "system," semantic map data item SDRs can be generated, as will be described in greater detail below. All of the methods and systems described below may be applied to all types of data item SDRs.

In one embodiment, a user selects the set of data documents 104 according to at least one criterion. For example, the user may select data documents for inclusion in the set of data documents 104 based upon whether the data documents relate to a particular subject matter. As another example, the set of data documents 104 represents a semantic universe in which the system 100 will be used. In one embodiment, the user is a human user of the system 100. In another embodiment, the machine 100 executes functionality for selecting data documents in the set of data documents 104.

The system 100 includes a reference map generator 106. In one embodiment, the reference map generator 106 is a self-organizing map. In another embodiment, the reference map generator 106 is a generative topographic map. In still another embodiment, the reference map generator 106 is an elastic map. In another embodiment, the reference map generator 106 is a neural gas type map. In still another embodiment, the reference map generator 106 is any type of competitive, learning-based, unsupervised, dimensionality-reducing, machine-learning method. In another embodiment, the reference map generator 106 is any computational method that can receive the set of data documents 104 and generate a two-dimensional metric space on which are clustered points representing the documents from the set of data documents 104. In still another embodiment, the reference map generator 106 is any computer program that accesses the set of data documents 104 to generate a two-dimensional metric space on which every clustered point represents a data document from the set of data documents 104. Although typically described herein as populating a two-dimensional metric space, in some embodiments, the reference map generator 106 populates an n-dimensional metric space. In some embodiments, the reference map generator 106 is implemented in software. In other embodiments, the reference map generator 106 is implemented in hardware.

The two-dimensional metric space may be referred to as a semantic map 108. The semantic map 108 may be any vector space with an associated distance measure.

In one embodiment, the parser and preprocessing module 110 generates the enumeration of data items 112. In another embodiment, the parser and preprocessing module 110 forms part of the representation generator 114. In some embodiments, the parser and preprocessing module 110 is implemented at least in part as a software program. In other embodiments, the parser and preprocessing module no is implemented at least in part as a hardware module. In still other embodiments, the parser and preprocessing module 110 executes on the machine 102. In some embodiments, a parser and preprocessing module 110 may be specialized for a type of data. In other embodiments, a plurality of parser and preprocessing modules 110 may be provided for a type of data.

In one embodiment, the representation generator 114 generates distributed representations of data items. In some embodiments, the representation generator 114 is implemented at least in part as a software program. In other embodiments, the representation generator 114 is implemented at least in part as a hardware module. In still other embodiments, the representation generator 114 executes on the machine 102.

In one embodiment, the sparsifying module 116 generates a sparse distributed representation (SDR) of a data item. As will be understood by one of ordinary skill in the art, an SDR may be a large numeric (binary) vector. For example, an SDR may have several thousand elements. In some embodiments, each element in an SDR generated by the sparsifying module 116 has a specific semantic meaning. In one of these embodiments, vector elements with similar semantic meaning are closer to each other than semantically dissimilar vector elements, measured by the associated distance metric.

In one embodiment, the representation generator 114 provides the functionality of the sparsifying module 116. In another embodiment, the representation generator 114 is in communication with a separate sparsifying module 116. In some embodiments, the sparsifying module 116 is implemented at least in part as a software program. In other embodiments, the sparsifying module 116 is implemented at least in part as a hardware module. In still other embodiments, the sparsifying module 116 executes on the machine 102.

In one embodiment, the sparse distributed representation (SDR) database 120 stores sparse distributed representations 118 generated by the representation generator 114. In another embodiment, the sparse distributed representation database 120 stores SDRs and the data item the SDRs represent. In still another embodiment, the SDR database 120 stores metadata associated with the SDRs. In another embodiment, the SDR database 120 includes an index for identifying an SDR 118. In yet another embodiment, the SDR database 120 has an index for identifying data items semantically close to a particular SDR 118. In one embodiment, the SDR database 120 may store, by way of example and without limitation, any one or more of the following: a reference number for a data item, the data item itself, an identification of a data item frequency for the data item in the set of data documents 104, a simplified version of the data item, a compressed binary representation of an SDR 118 for the data item, one or several tags for the data item, an indication of whether the data item identifies a location (e.g., "Vienna"), and an indication of whether the data item identifies a person (e.g., "Einstein"). In another embodiment, the sparse distributed representation database 120 may be any type or form of database.

Examples of an SDR database 120 include, without limitation, structured storage (e.g., NoSQL-type databases and BigTable databases), HBase databases distributed by The Apache Software Foundation of Forest Hill, Md., MongoDB databases distributed by 10Gen, Inc. of New York, N.Y., Cassandra databases distributed by The Apache Software Foundation, and document-based databases. In other embodiments, the SDR database 120 is an ODBC-compliant database. For example, the SDR database 120 may be provided as an ORACLE database manufactured by Oracle Corporation of Redwood City, Calif. In other embodiments, the SDR database 120 can be a Microsoft ACCESS database or a Microsoft SQL server database manufactured by Microsoft Corporation of Redmond, Wash. In still other embodiments, the SDR database 120 may be a custom-designed database based on an open source database, such as the MYSQL family of freely available database products distributed by Oracle Corporation.

Figure 2:
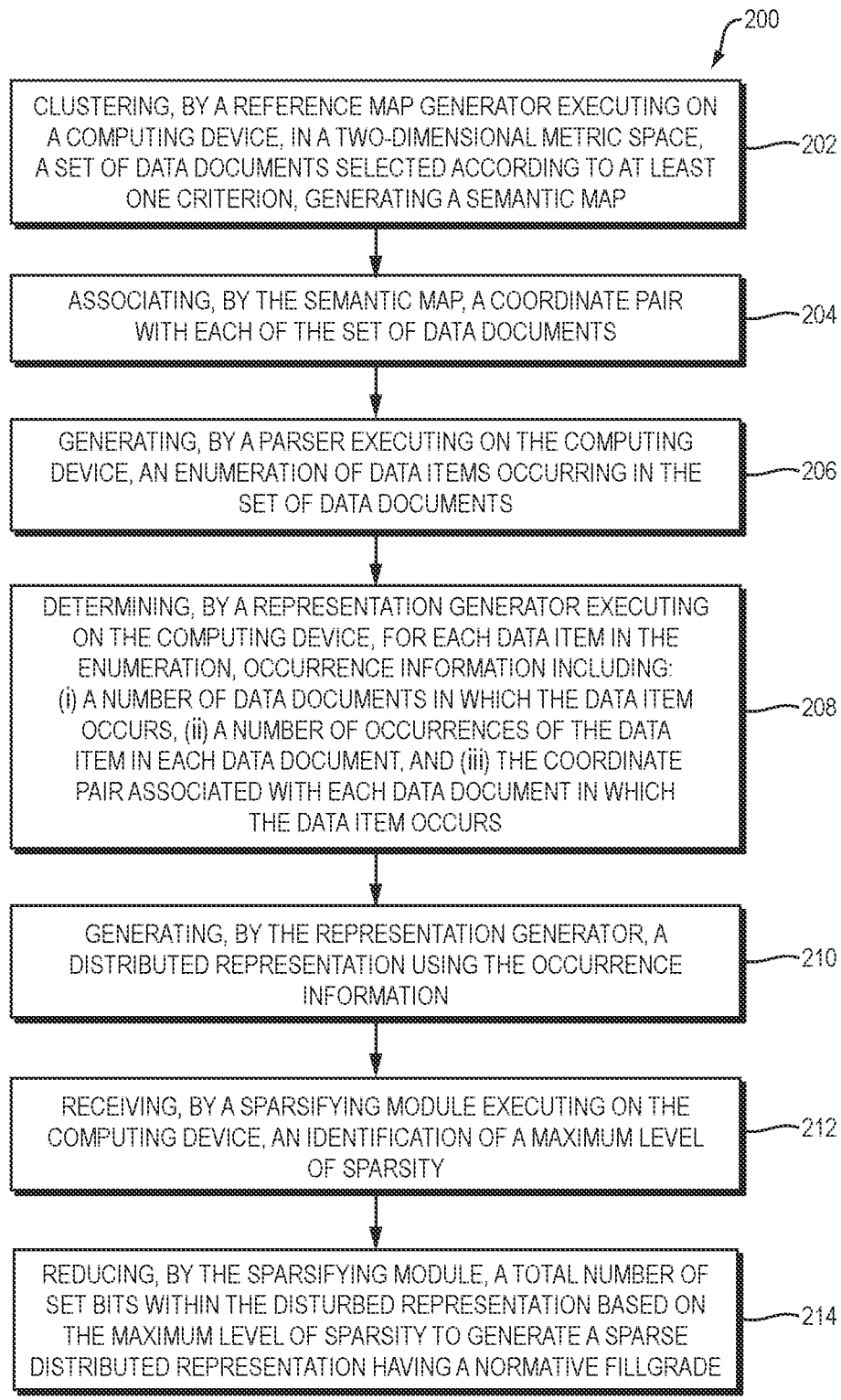
FIG. 2 is a flow diagram depicting an embodiment of a method for mapping data items to sparse distributed representations.

Referring now to FIG. 2, a flow diagram depicts one embodiment of a method 200 for mapping data items to sparse distributed representations. In brief overview, the method 200 includes clustering, by a reference map generator executing on a computing device, in a two-dimensional metric space, a set of data documents selected according to at least one criterion, generating a semantic map (202). The method 200 includes associating, by the semantic map, a coordinate pair with each of the set of data documents (204). The method 200 includes generating, by a parser executing on the computing device, an enumeration of data items occurring in the set of data documents (206). The method 200 includes determining, by a representation generator executing on the computing device, for each data item in the enumeration, occurrence information including: (i) a number of data documents in which the data item occurs, (ii) a number of occurrences of the data item in each data document, and (iii) the coordinate pair associated with each data document in which the data item occurs (208). The method 200 includes generating, by the representation generator, a distributed representation using the occurrence information (210). The method 200 includes receiving, by a sparsifying module executing on the computing device, an identification of a maximum level of sparsity (212). The method 200 includes reducing, by the sparsifying module, a total number of set bits within the distributed representation based on the maximum level of sparsity to generate a sparse distributed representation having a normative fillgrade (214).

Figure 1B:
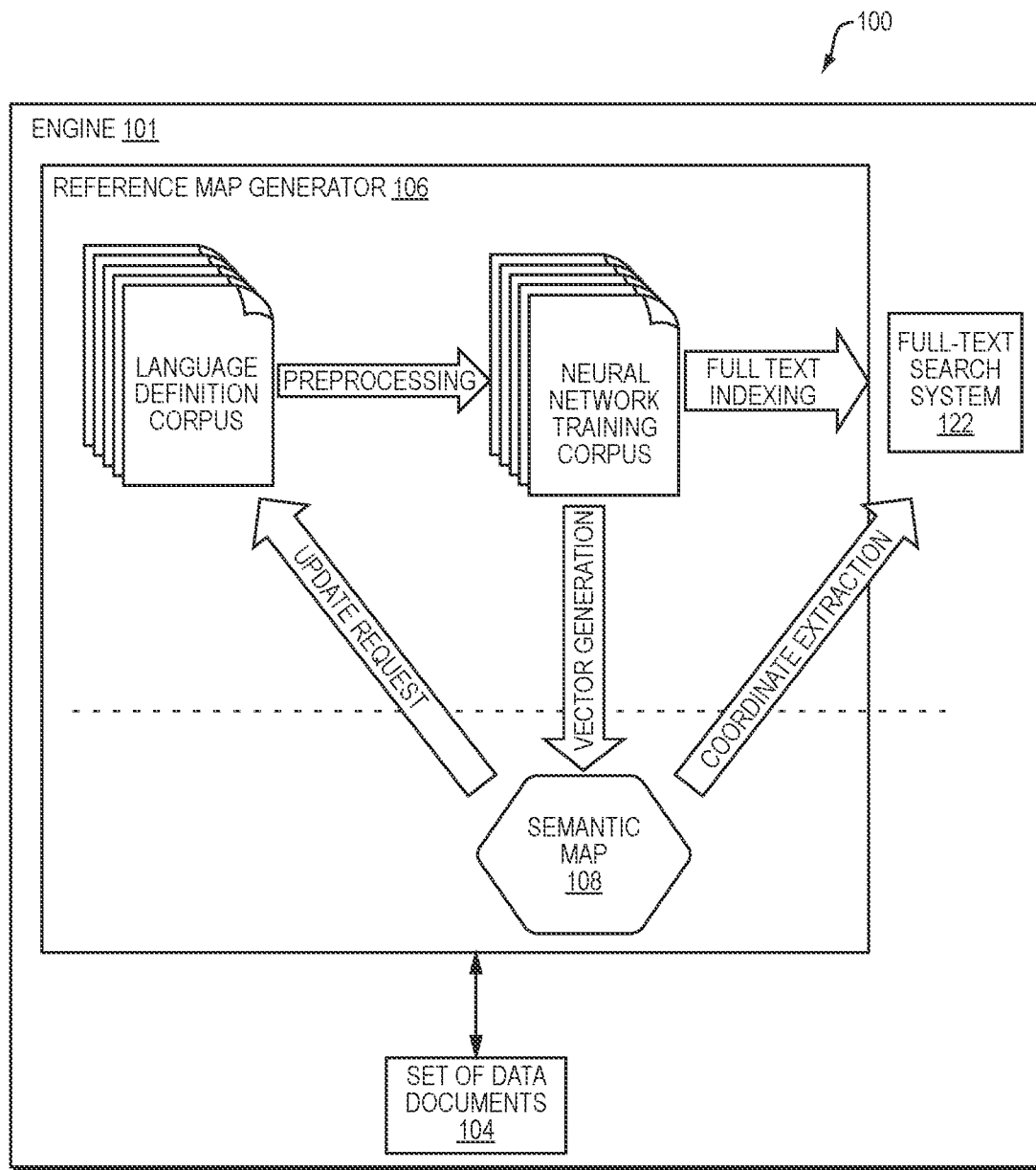
FIG. 1B is a block diagram depicting one embodiment of a system for generating a semantic map for use in mapping data items to sparse distributed representations.

Referring now to FIG. 2 in greater detail, and in connection with FIG. 1A-1B, the method 200 includes clustering, by a reference map generator executing on a computing device, in a two-dimensional metric space, a set of data documents selected according to at least one criterion, generating a semantic map (202). In one embodiment, the at least one criterion indicates that data items in the set of data documents 104 appear a threshold number of times. In another embodiment, the at least one criterion indicates that each data document in the set of data documents 104 should include descriptive information about the state of the system it was derived from. In the case of data documents, the at least one criterion indicates that each data document should express a conceptual topic (e.g., an encyclopedic description). In another embodiment, the at least one criterion indicates that a list of characteristics of the set of data documents 104 should evenly fill out a desired information space. In another embodiment, the at least one criterion indicates that the set of data documents 104 is originating from the same system. In the case of data documents, the at least one criterion indicates that the data documents are all in the same language. In still another embodiment, the at least one criterion indicates that the set of data documents 104 be in a natural (e.g., human) language. In still another embodiment, the at least one criterion indicates that the set of data documents 104 be in a computer language (e.g., computer code of any type). In another embodiment, the at least one criterion indicates that the set of data documents 104 may include any type or form of jargon or other institutional rhetoric (e.g., medicine, law, science, automotive, military, etc.). In another embodiment, the at least one criterion indicates that the set of data documents 104 should have a threshold number of documents in the set. In some embodiments, a human user selects the set of data documents 104 and the machine 102 receives the selected set of data documents 104 from the human user (e.g., via a user interface to a repository, directory, document database, or other data structure storing one or more data documents, not shown).

In one embodiment, the machine 102 preprocesses the set of data documents 104. In some embodiments, the parser and preprocessing module no provides the preprocessing functionality for the machine 102. In another embodiment, the machine 102 segments each of the set of data documents 104 into terms and sentences, standardizes punctuation, and eliminates or converts undesired characters. In still another embodiment, the machine 102 executes a tagging module (not shown) to associate one or more meta-information tags to any data item or portion of a data item in the set of data documents 104. In another embodiment, the machine 102 normalizes the text size of a basic conceptual unit, slicing each of the set of data documents 104 into equally sized text snippets. In this embodiment, the machine 102 may apply one or more constraints when slicing the set of data documents 104 into the snippets. For example, and without limitation, the constraints may indicate that documents in the set of data documents 104 should only contain complete sentences, should contain a fixed number of sentences, should have a limited data item count, should have a minimum number of distinct nouns per documents, and that the slicing process should respect the natural paragraphs originating from a document author. In one embodiment, the application of constraints is optional.

In some embodiments, to create more useful document vectors, the system 100 provides functionality for identifying the most relevant data items, from a semantic perspective, of each document in a set of data documents 104. In one of these embodiments, the parser and preprocessing module 110 provides this functionality. In another embodiment, the reference map generator 106 receives one or more document vectors and generates the semantic map 108 using the received one or more document vectors. For example, the system 100 may be configured to identify and select nouns (e.g., identifying based on a part-of-speech tag assigned to each data item in a document during preprocessing). As another example, selected nouns may be stemmed to aggregate all morphologic variants behind one main data item instance (e.g., plurals and case variations). As a further example, a term-frequency-inverse document frequency ("tf-idf indexed") statistic is calculated for selected nouns, reflecting how important a data item is to a data document given the specific set of data documents 104; a coefficient may be computed based on the data item count in the document and a data item count in the set of data documents 104. In some embodiments, the system 100 identifies a predetermined number of the highest tf-idf indexed and stemmed nouns per document, generating an aggregate complete list of selected nouns to define document vectors (e.g., and as understood by one of ordinary skill in the art, vectors indicating whether a particular data item appears in a document) used in training the semantic map 106. In other embodiments, functionality for preprocessing and vectorization of the set of data documents 104 generates a vector for each document in the set of data documents 104. In one of these embodiments, an identifier and an integer per data item on the list of selected nouns represent each document.

In one embodiment, the machine 102 provides the preprocessed documents to a full-text search system 122. For example, the parser and preprocessing module no may provide this functionality. In another embodiment, use of the full-text search system 122 enables interactive selection of the documents. For example, the full-text search system 122 may provide functionality allowing for retrieval of all documents, or snippets of original documents, that contain a specific data item using, for example, literal exact matching. In still another embodiment, each of the preprocessed documents (or snippets of preprocessed documents) is associated with at least one of the following: a document identifier, a snippet identifier, a document title, the text of the document, a count of data items in the document, a length in bytes of the document, and a classification identifier. In another embodiment, and as will be discussed in further detail below, semantic map coordinate pairs are assigned to documents; such coordinate pairs may be associated with the preprocessed documents in the full-text search system 122. In such an embodiment, the full-text search system 122 may provide functionality for receiving a single or compound data item and for returning the coordinate pairs of all matching documents containing the received data item. Full-text search systems 122 include, without limitation, Lucene-based Systems (e.g., Apache SOLR distributed by The Apache Software Foundation, Forest Hills, Md., and ELASTICSEARCH distributed by Elasticsearch Global BV, Amsterdam, The Netherlands), open source systems (Indri distributed by The Lemur Project through SourceForge Lemur Project, owned and operated by Slashdot Media, San Francisco, Calif., a Dice Holdings, Inc. company, New York, N.Y.; MNOGOSEARCH distributed by Lavtech.Com Corp.; Sphinx distributed by Sphinx Technologies Inc.; Xapian distributed by the Xapian Project; Swish-e distributed by Swish-e.org; BaseX distributed by BaseX GmbH, Konstanz, Germany; DataparkSearch Engine distributed by www.dataparksearch.org: ApexKB distributed by SourceForge, owned and operated by Slashdot Media; Searchdaimon distributed by Searchdaimon AS, Oslo, Norway; and Zettair distributed by RMIT University, Melbourne, Australia), and commercial systems (Autonomy IDOL manufactured by Hewlett-Packard, Sunnyvale, Calif.; the COGITO product line manufactured by Expert System S.p.A. of Modena, Italy; Fast Search & Transfer manufactured by Microsoft, Inc. of Redmond, Wash.; ATTIVIO manufactured by Attivio, Inc. of Newton, Mass.; BRS/Search manufactured by OpenText Corporation, Waterloo, Ontario, Canada; Perceptive Intelligent Capture (powered by Brainware) manufactured by Perceptive Software from Lexmark, Shawnee, Kans.; any of the products manufactured by Concept Searching, Inc. of McLean, Va.; COVEO manufactured by Coveo Solutions, Inc. of San Mateo, Calif.; Dieselpoint SEARCH manufactured by Dieselpoint, Inc. of Chicago, Ill.; DTSEARCH manufactured by dtSearch Company, Bethesda, Md.; Oracle Endeca Information Discovery manufactured by Oracle Corporation, Redwood Shores, Calif.; products manufactured by Exalead, a subsidiary of Dassault Systemes of Paris, France; Inktomi search engines provided by Yahoo!; ISYS Search now Perceptive Enterprise Search manufactured by Perceptive Software from Lexmark of Shawnee, Kans.; Locayta now ATTRAQT FREESTYLE MERCHANDISING manufactured by ATTRAQT, Ltd. of London, England, UK; Lucid Imagination now LUCIDWORKS manufactured by LucidWorks of Redwood City, Calif.; MARKLOGIC manufactured by MarkLogic Corporation, San Carlos, Calif.; Mindbreeze line of products manufactured by Mindbreeze GmbH of Linz, Austria; Omniture now Adobe SiteCatalyst manufactured by Adobe Systems, Inc. of San Jose, Calif.; OpenText line of products manufactured by OpenText Corporation of Waterloo, Ontario, Canada; PolySpot line of products manufactured by PolySpot S.A. of Paris, France; Thunderstone line of products manufactured by Thunderstone Software LLC of Cleveland, Ohio; and Vivisimo now IBM Watson Explorer manufactured by IBM Corporation of Armonk, N.Y.). Full-text search systems may also be referred to herein as enterprise search systems.

In one embodiment, the reference map generator 106 accesses the document vectors of the set of data documents 104 to distribute each of the documents across a two-dimensional metric space. In another embodiment, the reference map generator 106 accesses the preprocessed set of data documents 104 to distribute points representing each of the documents across the two-dimensional metric space. In still another embodiment, the distributed points are clustered. For example, the reference map generator 106 may calculate a position of a point representing a document based on semantic content of the document. The resulting distribution represents the semantic universe of a specific set of data documents 104.

In one embodiment, the reference map generator 106 is trained using the document vectors of the preprocessed set of data documents 104. In another embodiment, the reference map generator 106 is trained using the document vectors of the set of data documents 104 (e.g., without preprocessing). Users of the system 100 may use training processes well understood by those skilled in the relevant arts to train the reference map generator 106 with the set of data documents 104.

In one embodiment, the training process leads to two results. First, for each document in a set of data documents 104, a pair of coordinates is identified that positions the document on the semantic map 108; the coordinates may be stored in the respective document entry within the full-text search system 122. Second, a map of weights is generated that allows the reference map generator 106 to position any new (unseen) document vector on the semantic map 108; after the training of the reference map generator 106, the document distribution may remain static. However, if the initial training set is large and descriptive enough, adding new training documents can extend the vocabulary. In order to avoid the time consuming re-computation of the semantic map, new documents may be positioned on the map by transforming their document vectors with the trained weights. The intended semantic map 108 can be refined and improved by analyzing the distribution of the points representing documents over the semantic map 108. If there are topics that are under- or over-represented, the set of data documents 104 can be adapted accordingly and the semantic map 108 can then be recomputed.

Therefore, the method 200 includes clustering, by a reference map generator executing on a computing device, in a two-dimensional metric space, a set of data documents selected according to at least one criterion, generating a semantic map. As discussed above and as will be understood by those of ordinary skill in the art, various techniques may be applied to cluster the data documents; for example, and without limitation, implementations may leverage generative topographic maps, growing self-organizing maps, elastic maps, neural gas, random mapping, latent semantic indexing, principal components analysis or any other dimensionality reduction-based mapping method.

Referring now to FIG. 1B, a block diagram depicts one embodiment of a system for generating a semantic map 108 for use in mapping data items to sparse distributed representations. As depicted in FIG. 1B, the set of data documents 104 received by the machine 102 may be referred to as a language definition corpus. Upon preprocessing of the set of data documents, the documents may be referred to as a reference map generator training corpus. The documents may also be referred to as a neural network training corpus. The reference map generator 106 accesses the reference map generator training corpus to generate as output a semantic map 108 on which the set of data documents are positioned. The semantic map 108 may extract the coordinates of each document. The semantic map 108 may provide the coordinates to the full-text search system 122. By way of non-limiting example, corpuses may include those based on an application (e.g., a web application for content creation and management) allowing collaborative modification, extension, or deletion of its content and structure; such an application may be referred to as a "wiki" and the "Wikipedia" encyclopedia project supported and hosted by the Wikimedia Foundation of San Francisco, Calif., is one example of such an application. Corpuses may also include knowledge bases of any kind or type.

As will be understood by those of ordinary skill in the art, any type or form of algorithm may be used to map high dimensional vectors into a low dimensional space (e.g., the semantic map 108) by, for example, clustering the input vectors such that similar vectors are located close to each other on the low dimensional space, resulting in a low dimensional map that is topologically clustered. In some embodiments, a size of a quadratic semantic map defines the "semantic resolution" with which patterns of sparse distributed representations (SDRs) of data items will be computed, as will be discussed in further detail below. For example, a side-length of 128 corresponds to a descriptiveness of 16K features per data item-SDR. In principle, the size of the map can be chosen freely, considering that there are computational limits as bigger reference map generator sizes take longer to train and bigger SDRs take longer to be compared or processed by any means. As another example, a data item SDR size of 128×128 has proven to be useful when applied on a "general English language" set of data documents 104.

Referring again to FIG. 2, the method 200 includes associating, by the semantic map, a coordinate pair with each of the set of data documents (204). As discussed above, in populating the semantic map 108, the reference map generator 106 calculates a position of a point on the semantic map 108, the point representing a document in the set of data documents 104. The semantic map 108 may then extract the coordinates of the point. In some embodiments, the semantic map 108 transmits the extracted coordinates to the full-text search system 122.

Figure 1C:
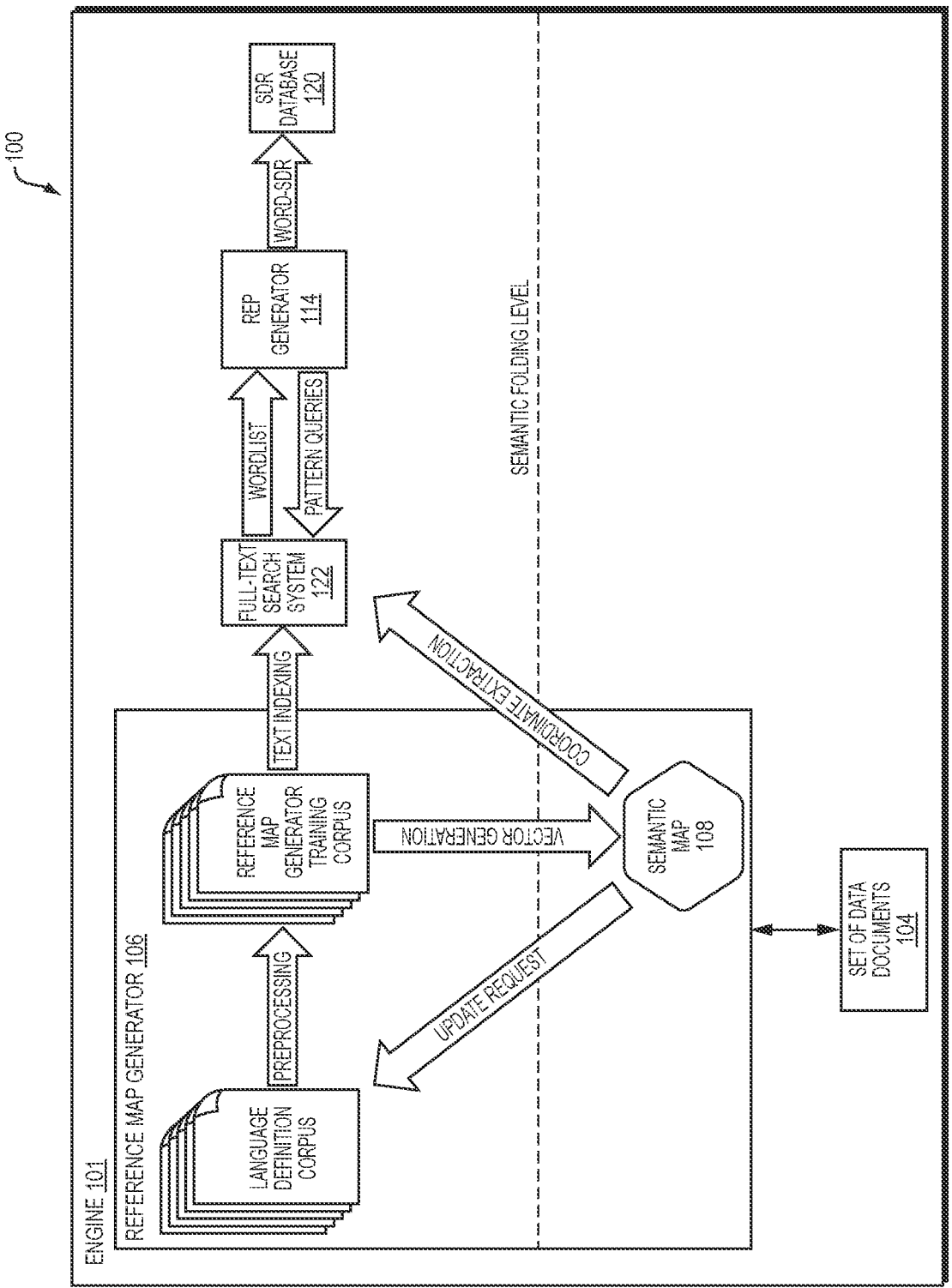
FIG. 1C is a block diagram depicting one embodiment of a system for generating a sparse distributed representation for a data item in a set of data documents.

Referring now to FIG. 1C, a block diagram depicts one embodiment of a system for generating a sparse distributed representation for each of a plurality of data items in the set of data documents 104. As shown in FIG. 1C, the representation generator 114 may transmit a query to the full-text search system 122 and receive one or more data items matching the query. The representation generator 114 may generate sparse distributed representations of data items retrieved from the full-text search system 122. In some embodiments, using data from a semantic map 108 to generate the SDRs may be said to involve "folding" semantic information into generated sparse distributed representations (e.g., sparsely populated vectors).

Referring back to FIG. 2, the method 200 includes generating, by a parser executing on the computing device, an enumeration of data items occurring in the set of data documents (206). In one embodiment, the parser and preprocessing module 110 generates the enumeration of data items 112. In another embodiment, the parser and preprocessing module 110 accesses the set of data documents 104 directly to generate the enumeration of data items 112. In still another embodiment, the parser and preprocessing module 110 accesses the full-text search system 122 storing (as described above) a preprocessed version of the set of data documents 104. In another embodiment, the parser and preprocessing module 110 extends the enumeration of data items 112 to include not just the data items explicitly included in the set of data documents 104 but common useful data item combinations; for example, the parser and preprocessing module 110 may access frequent combinations of data items (such as "bad weather" or "electronic commerce") retrieved from publicly available collections.

In one embodiment, the parser and preprocessing module 110 delimits the data items in the enumeration 112 using, for example, spaces, or punctuation. In another embodiment, data items appearing in the enumeration 112 multiple times under different parts of speech tags are treated as distinct (e.g., the data item "fish" will have a different SDR if it is used as a noun than if it is used as a verb and so two entries are included). In another embodiment, the parser and preprocessing module 110 provides the enumeration of data items 112 to the SDR database 120. In still another embodiment, the representation generator 114 will access the stored enumeration of data items 112 to generate an SDR for each data item in the enumeration 112.

The method 200 includes determining, by a representation generator executing on the computing device, for each data item in the enumeration, occurrence information including: (i) a number of data documents in which the data item occurs, (ii) a number of occurrences of the data item in each data document, and (iii) the coordinate pair associated with each data document in which the data item occurs (208). In one embodiment, the representation generator 114 accesses the full-text search system 122 to retrieve data stored in the full-text search system 122 by the semantic map 108 and the parser and preprocessing module 110 and generates sparse distributed representations for data items enumerated by the parser and preprocessing module 110 using data from the semantic map 108.

In one embodiment, the representation generator 114 accesses the full-text search system 122 to retrieve coordinate pairs for each document that contain a particular string (e.g., words or numbers or combinations of words and numbers). The representation generator 114 may count the number of retrieved coordinate pairs to determine a number of documents in which the data item occurs. In another embodiment, the representation generator 114 retrieves, from the full-text search system 122, a vector representing each document that contains the string. In such an embodiment, the representation generator 114 determines a number of set bits within the vector (e.g., the number of bits within the vector set to 1), which indicates how many times the data item occurred in a particular document. The representation generator 114 may add the number of set bits to determine the occurrence value.

The method 200 includes generating, by the representation generator, a distributed representation using the occurrence information (210). The representation generator 114 may use well-known processes for generating distributed representation. In some embodiments, the distributed representation may be used to determine a pattern representative of semantic contexts in which a data item in the set of data documents 104 occurs; the spatial distribution of coordinate pairs in the pattern reflects the semantic regions in the context of which the data item occurred. The representation generator 114 may generate a two-way mapping between a data item and its distributed representation. The SDR database 120 may be referred to as a pattern dictionary with which the system 100 may identify data items based on distributed representations and vice versa. Those of ordinary skill in the art will understand that by using different sets of data documents 104 (e.g., selecting documents of different types of subject matter, in different languages, based on varying constraints) or originating from varying physical systems or from different medical analysis methods or from varying musical styles, the system 100 will generate different pattern dictionaries.

The method 200 includes receiving, by a sparsifying module executing on the computing device, an identification of a maximum level of sparsity (212). In one embodiment, a human user provides the identification of the maximum level of sparsity. In another embodiment, the maximum level of sparsity is set to a predefined threshold. In some embodiments, the maximum level of sparsity depends on a resolution of the semantic map 108. In other embodiments, the maximum level of sparsity depends on a type of the reference map generator 106.

The method 200 includes reducing, by the sparsifying module, a total number of set bits within the distributed representation based on the maximum level of sparsity to generate a sparse distributed representation having a normative fillgrade (214). In one embodiment, the sparsifying module 116 sparsifies the distributed representation by setting a count threshold (e.g., using the received identification of the maximum level of sparsity) that leads to a specific fillgrade of the final SDR 118. The sparsifying module 116 therefore generates an SDR 118, which may be said to provide a binary fingerprint of the semantic meaning or the semantic value of a data item in the set of data documents 104; the SDR 118 may also be referred to as a semantic fingerprint. The sparsifying module 116 stores the SDR 118 in the SDR database 120.

In generating an SDR, the system 100 populates a vector with 1s and 0s—1 if a data document uses a data item, 0 if it doesn't, for example. Although a user may receive a graphical representation of the SDR showing points on a map reflective of the semantic meaning of the data item (the graphical representation being referred to either as an SDR, a semantic fingerprint, or a pattern), and although the description herein may also refer to points and patterns, one of ordinary skill in the art will understand that referring to "points" or "patterns" also refers to the set bits within the SDR vector that are set—to the data structure underlying any such graphical representation, which is optional.

In some embodiments, the representation generator 114 and the sparsifying module 116 may combine a plurality of data items into a single SDR. For example, if a phrase, sentence, paragraph, or other combination of data items needs to be converted into a single SDR that reflects the "union property" of the individual SDRs, the system 100 may convert each individual data item into its SDR (by generating dynamically or by retrieving the previously generated SDR) and use a binary OR operation to form a single compound SDR from the individual SDRs. Continuing with this example, the number of set bits is added for every location within the compound SDR. In one embodiment, the sparsifying module 116 may proportionally reduce a total number of set bits using a threshold resulting in a normative fillgrade. In another embodiment, the sparsifying module 116 may apply a weighting scheme to reduce the total number of set bits, which may include evaluating a number of bits surrounding a particular set bit instead of simply counting the number of set bits per location in the SDR. Such a locality weighting scheme may favor bits that are part of clusters within the SDR and are therefore semantically more important than single isolated bits (e.g., with no set bits surrounding them).

In some embodiments, implementation of the methods and systems described herein provides a system that does not simply generate a map that clusters sets of data documents by context, but goes on to analyze the positions on the map representing clustered data documents, determine which data documents include a particular data item based on the analysis, and use the analysis to provide a specification for each data item in each data document. The sparse distributed representations of the data items are generated based on data retrieved from the semantic map 108. The sparse distributed representations of the data items need not be limited to use in training other machine learning methods, but may be used to determine relationships between the data items (such as, for example, determining similarity between data items, ranking data items, or identifying data items that users did not previously know to be similar for use in searching and analysis in a variety of environments). In some embodiments, by transforming any piece of information in an SDR using the methods and systems as described herein, any data item becomes "semantically grounded" (e.g., within its semantic universe) and therefore explicitly comparable and computable even without using any machine learning, neural network, or cortical algorithm.

Figure 3:
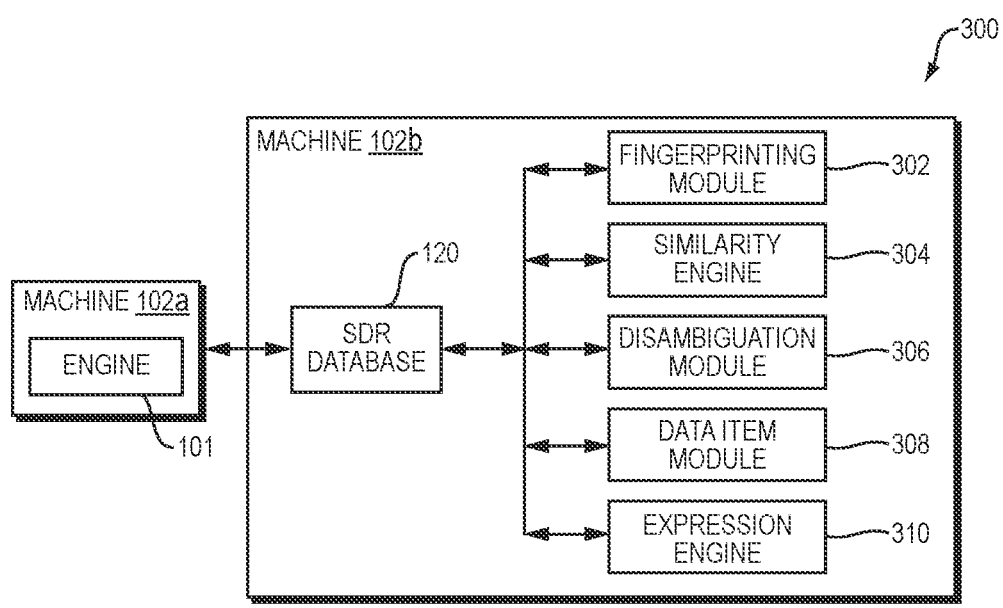
FIG. 3 is a block diagram depicting one embodiment of a system for performing arithmetic operations on sparse distributed representations of data items generated using data documents clustered on semantic maps.

Referring now to FIG. 3, a block diagram depicts one embodiment of a system for performing operations using sparse distributed representations of data items from data documents clustered on semantic maps. In one embodiment, the system 300 includes functionality for determining semantic similarity between sparse distributed representations. In another embodiment, the system 300 includes functionality for determining relevance ranking of data items converted into SDRs by matching against a reference data item converted into an SDR. In still another embodiment, the system 300 includes functionality for determining classifications of data items converted into SDRs by matching against a reference text element converted into an SDR. In another embodiment, the system 300 includes functionality for performing topic filtering of data items converted into SDRs by matching against a reference data item converted into an SDR. In yet another embodiment, the system 300 includes functionality for performing keyword extraction from data items converted into SDRs.

In brief overview, the system 300 includes the elements and provides the functionality described above in connection with FIGS. 1A-1C (shown in FIG. 3 as the engine 101 and the SDR database 120). The system 300 also includes a machine iota, a machine 102b, a fingerprinting module 302, a similarity engine 304, a disambiguation module 306, a data item module 308, and an expression engine 310. In one embodiment, the engine 101 executes on the machine iota. In another embodiment, the fingerprinting module 302, the similarity engine 304, the disambiguation module 306, the data item module 308, and the expression engine 310 execute on the machine 102b.

Referring now to FIG. 3, in connection with FIGS. 1A-1C and 2, the system 300 includes a fingerprinting module 302. In one embodiment, the fingerprinting module 302 includes the representation generator 114 and the sparsifying module 116 described above in connection with FIGS. 1A-1C and 2. In another embodiment, the fingerprinting module 302 forms part of the engine 101. In other embodiments, the fingerprinting module 302 is implemented at least in part as a hardware module. In other embodiments, the fingerprinting module 302 is implemented at least in part as a software program. In still other embodiments, the fingerprinting module 302 executes on the machine 102. In some embodiments, the fingerprinting module 302 performs a postproduction process to transform a data item SDR into a semantic fingerprint (e.g., via the sparsification process described herein) in real-time, with SDRs that are not part of the SDR database 120 but that are generated dynamically (e.g., to create document semantic fingerprints from word semantic fingerprints); however, such postproduction processing is optional. In other embodiments, the representation generator 114 may be accessed directly in order to generate sparsified SDRs for data items that do not yet have SDRs in the SDR database 120; in such an embodiment, the representation generator 114 may call the sparsifying module 116 automatically and automatically generate a sparsified SDR. The terms "SDR" and "fingerprint" and "semantic fingerprint" are used interchangeably herein and may be used to refer both to SDRs that have been generated by the fingerprinting module 302 and to SDRs that are generated by the calling the representation generator 114 directly.

The system 300 includes a similarity engine 304. The similarity engine 304 may provide functionality for computing distances between SDRs and determining a level of similarity. In other embodiments, the similarity engine 304 is implemented at least in part as a hardware module. In other embodiments, the similarity engine 304 is implemented at least in part as a software program. In still other embodiments, the similarity engine 304 executes on the machine 102b.

The system 300 includes a disambiguation module 306. In one embodiment, the disambiguation module 306 identifies contextual sub-spaces embodied within a single SDR of a data item. Therefore, the disambiguation module 306 may allow users to better understand different semantic contexts of a single data item. In some embodiments, the disambiguation module 306 is implemented at least in part as a hardware module. In some embodiments, the disambiguation module 306 is implemented at least in part as a software program. In other embodiments, the disambiguation module 306 executes on the machine 102b.

The system 300 includes a data item module 308. In one embodiment, the data item module 308 provides functionality for identifying the most characteristic data items from a set of received data items—that is, data items whose SDRs have less than a threshold distance from an SDR of the received set of data items, as will be discussed in greater detail below. The data item module 308 may be used in conjunction with or instead of a keyword extraction module 802 discussed below in connection with FIG. 8A. In some embodiments, the data item module 308 is implemented at least in part as a hardware module. In some embodiments, the data item module 308 is implemented at least in part as a software program. In other embodiments, the data item module 308 executes on the machine 102b.

The system 300 includes an expression engine 310. In one embodiment, as will be discussed in greater detail below, the expression engine 310 provides functionality for evaluating Boolean operators received with one or more data items from a user. Evaluating the Boolean operators provides users with flexibility in requesting analysis of one or more data items or combinations of data items. In some embodiments, the expression engine 310 is implemented at least in part as a hardware module. In some embodiments, the expression engine 310 is implemented at least in part as a software program. In other embodiments, the expression engine 310 executes on the machine 102b.

Figure 4:
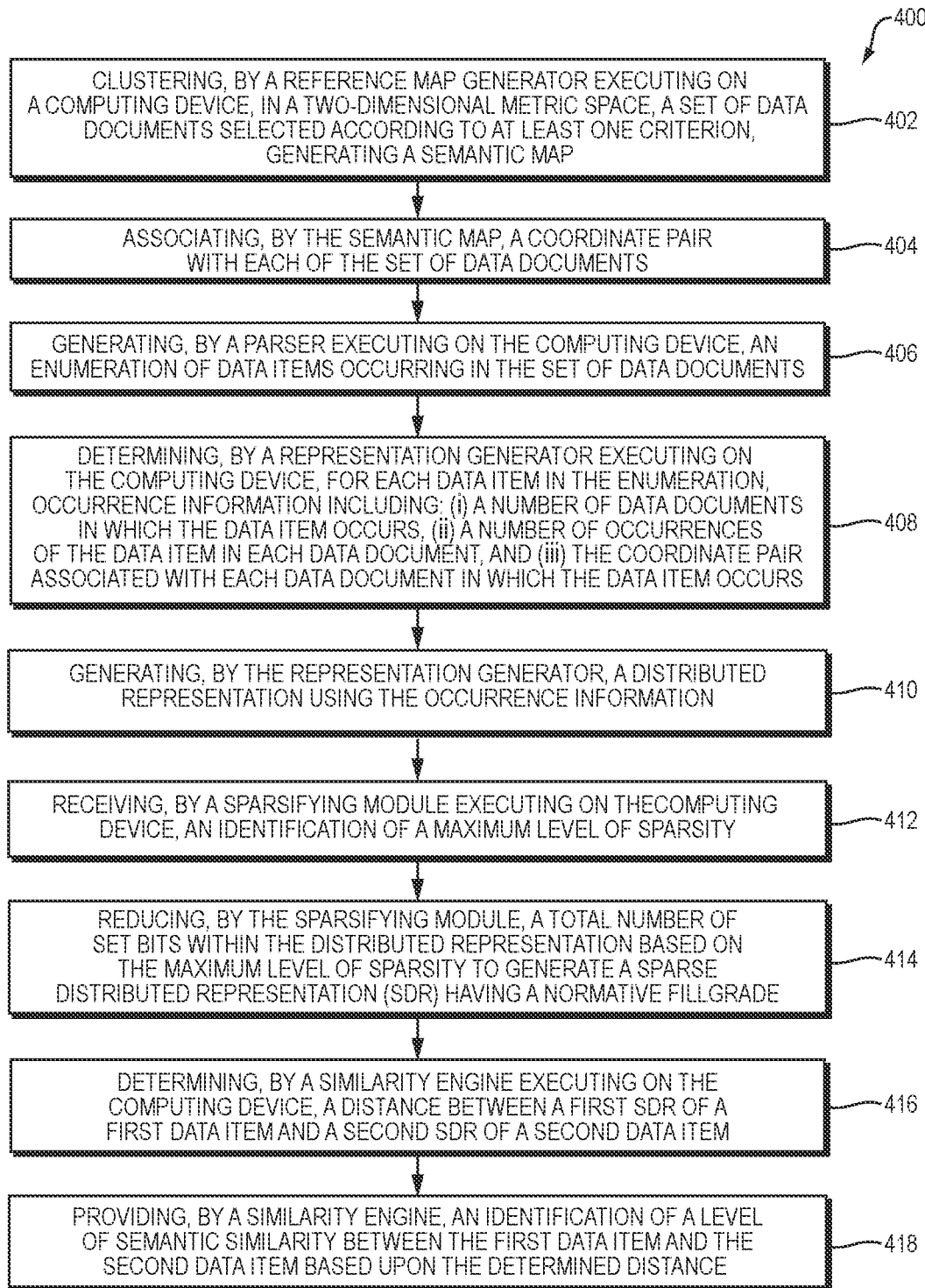
FIG. 4 is a flow diagram depicting one embodiment of a method for identifying a level of semantic similarity between data items.

Referring now to FIG. 4, a flow diagram depicts one embodiment of a method for identifying a level of similarity between data items. In brief overview, the method 400 includes clustering, by a reference map generator executing on a computing device, in a two-dimensional metric space, a set of data documents selected according to at least one criterion, generating a semantic map (402). The method 400 includes associating, by the semantic map, a coordinate pair with each of the set of data documents (404). The method 400 includes generating, by a parser executing on the computing device, an enumeration of data items occurring in the set of data documents (406). The method 400 includes determining, by a representation generator executing on the computing device, for each data item in the enumeration, occurrence information including: (i) a number of data documents in which the data item occurs, (ii) a number of occurrences of the data item in each data document, and (iii) the coordinate pair associated with each data document in which the data item occurs (408). The method 400 includes generating, by the representation generator, a distributed representation using the occurrence information (410). The method 400 includes receiving, by a sparsifying module executing on the computing device, an identification of a maximum level of sparsity (412). The method 400 includes reducing, by the sparsifying module, a total number of set bits within the distributed representation based on the maximum level of sparsity to generate a sparse distributed representation (SDR) having a normative fillgrade (414). The method 400 includes determining, by a similarity engine executing on the computing device, a distance between a first SDR of a first data item and a second SDR of a second data item (416). The method 400 includes providing, by the similarity engine, an identification of a level of semantic similarity between the first data item and the second data item based upon the determined distance (418).

Referring to FIG. 4 in greater detail, and in connection with FIGS. 1A-1C and 2-3, the method 400 includes clustering, by a reference map generator executing on a computing device, in a two-dimensional metric space, a set of data documents selected according to at least one criterion, generating a semantic map (402). In one embodiment, the clustering occurs as described above in connection with FIG. 2 (202).

The method 400 includes associating, by the semantic map, a coordinate pair with each of the set of data documents (404). In one embodiment, the associating occurs as described above in connection with FIG. 2 (204).

The method 400 includes generating, by a parser executing on the computing device, an enumeration of data items occurring in the set of data documents (406). In one embodiment, the generating occurs as described above in connection with FIG. 2 (206).

The method 400 includes determining, by a representation generator executing on the computing device, for each data item in the enumeration, occurrence information including: (i) a number of data documents in which the data item occurs, (ii) a number of occurrences of the data item in each data document, and (iii) the coordinate pair associated with each data document in which the data item occurs (408). In one embodiment, the determining occurs as described above in connection with FIG. 2 (208).

The method 400 includes generating, by the representation generator, a distributed representation using the occurrence information (410). In one embodiment, the generating occurs as described above in connection with FIG. 2 (210).

The method 400 includes receiving, by a sparsifying module executing on the computing device, an identification of a maximum level of sparsity (412). In one embodiment, the receiving occurs as described above in connection with FIG. 2 (212).

The method 400 includes reducing, by the sparsifying module, a total number of set bits within the distributed representation based on the maximum level of sparsity to generate a sparse distributed representation (SDR) having a normative fillgrade (414). In one embodiment, the reducing occurs as described above in connection with FIG. 2 (214).

The method 400 includes determining, by a similarity engine executing on the computing device, a distance between a first SDR of a first data item and a second SDR of a second data item (416). In one embodiment, the similarity engine 304 computes the distance between at least two SDRs. Distance measures may include, without limitation, Direct Overlap, Euclidian Distance (e.g., determining the ordinary distance between two points in an SDR in a similar manner as a human would measure with a ruler), Jaccard Distance, and Cosine-similarity. The smaller the distance between two SDRs, the greater the similarity and (with semantic folding SDRs) a higher similarity indicates a higher semantic relatedness of the data elements the SDRs represent. In one embodiment, the similarity engine 304 counts a number of bits that are set on both the first SDR and the second SDR (e.g., points at which both SDRs are set to 1). In another embodiment, the similarity engine 304 identifies a first point in the first SDR (e.g., an arbitrarily selected first bit that is set to 1), finds the same point within the second SDR and determines the closest set bit in the second SDR. By determining what the closest set bit in the second SDR is to a set bit in the first SDR—for each set bit in the first SDR—the similarity engine 304 is able to calculate a sum of the distances at each point and divide by the number of points to determine the total distance. Those of ordinary skill in the art will understand other mechanisms may be used to determine distances between SDRs. In some embodiments, similarity is not an absolute measure but may vary depending on the different contexts that a data item might have. In one of these embodiments, therefore, the similarity engine 304 also analyzes the topography of the overlap between the two SDRs. For example, the topology of the overlap may be used to add a weighting function to the similarity computation. As another example, similarity measures may be used.

The method 400 includes providing, by the similarity engine, an identification of a level of semantic similarity between the first data item and the second data item based upon the determined distance (418). The similarity engine 304 may determine that the distance between the two SDRs exceeds a maximum threshold for similarity and thus the represented data items are not similar. Alternatively, the similarity engine 304 may determine that the distance between the two SDRs does not exceed the maximum threshold and thus the represented data items are similar. The similarity engine 304 may identify the level of similarity based upon a range, threshold, or other calculation. In one embodiment, because SDRs actually represent the semantic meaning (expressed by a large number of semantic features) of a data item, it is possible to determine the semantic closeness between two data items.

In some embodiments, the system 100 provides a user interface (not shown) with which users may enter data items and receive an identification of the level of similarity. The user interface may provide this functionality to users directly accessing the machine 100. Alternatively, the user interface may provide this functionality to users accessing the machine 100 across a computer network. By way of example, and without limitation, a user may enter a pair of data items such as "music" and "apple" into the user interface; the similarity engine 304 receives the data items and generates the SDRs for the data items as described above in connection with FIGS. 1A-1C and 2. Continuing with this example, the similarity engine 304 may then compare the two SDRs as described above. Although not required, the similarity engine 304 may provide a graphical representation of each of the SDRs to the user via the user interface, allowing the user to visually review the way in which each data item is semantically mapped (e.g., viewing the points that are clustered in a semantic map representing a use of the data item in the reference collection used for training the reference map generator 106).

Figure 5:
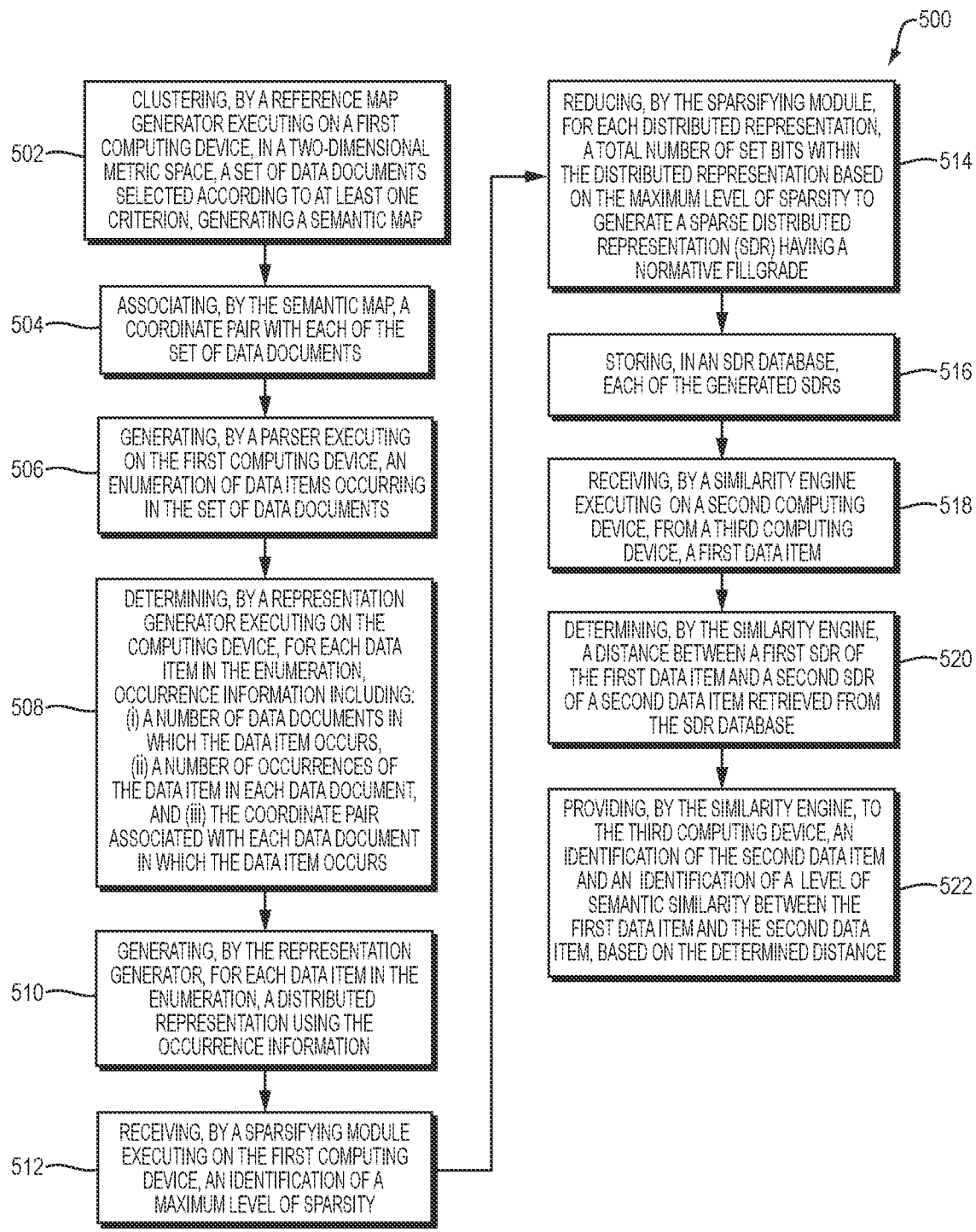
FIG. 5 is a flow diagram depicting one embodiment of a method for identifying a level of semantic similarity between a user-provided data item and a data item within a set of data documents.

In some embodiments, the similarity engine 304 receives only one data item from a user. Referring now to FIG. 5, a flow diagram depicts one embodiment of such a method. In brief overview, the method 500 includes clustering, by a reference map generator executing on a first computing device, in a two-dimensional metric space, a set of data documents selected according to at least one criterion, generating a semantic map (502). The method 500 includes associating, by the semantic map, a coordinate pair with each of the set of data documents (504). The method 500 includes generating, by a parser executing on the first computing device, an enumeration of data items occurring in the set of data documents (506). The method 500 includes determining, by a representation generator executing on the first computing device, for each data item in the enumeration, occurrence information including: (i) a number of data documents in which the data item occurs, (ii) a number of occurrences of the data item in each data document, and (iii) the coordinate pair associated with each data document in which the data item occurs (508). The method 500 includes generating, by the representation generator, for each data item in the enumeration, a distributed representation using the occurrence information (510). The method 500 includes receiving, by a sparsifying module executing on the first computing device, an identification of a maximum level of sparsity (512). The method 500 includes reducing, by the sparsifying module, for each distributed representation, a total number of set bits within the distributed representation based on the maximum level of sparsity to generate a sparse distributed representation (SDR) having a normative fillgrade (514). The method 500 includes storing, in an SDR database, each of the generated SDRs (516). The method 500 includes receiving, by a similarity engine executing on a second computing device, from a third computing device, a first data item (518). The method 500 includes determining, by the similarity engine, a distance between a first SDR of the first data item and a second SDR of a second data item retrieved from the SDR database (520). The method 500 includes providing, by the similarity engine, to the third computing device, an identification of the second data item and an identification of a level of semantic similarity between the first data item and the second data item, based on the determined distance (522).

In some embodiments, (502)-(516) are performed as described above in connection with FIG. 2 (202-214).

The method 500 includes receiving, by a similarity engine executing on a second computing device, from a third computing device, a first data item (518). In one embodiment, the system 300 includes a user interface (not shown) with which a user may enter the first data item. In another embodiment, the fingerprinting module 302 generates an SDR of the first data item. In still another embodiment, the representation generator 114 generates the SDR.

The method 500 includes determining, by the similarity engine, a distance between a first SDR of the first data item and a second SDR of a second data item retrieved from the SDR database (520). In one embodiment, the method 500 includes determining the distance between the first SDR of the first data item and the second SDR of the second data item as described above in connection with FIG. 4 (416). In some embodiments, the similarity engine 304 retrieves the second data item from the SDR database 120. In one of these embodiments, the similarity engine 304 examines each entry in the SDR database 120 to determine whether there is a level of similarity between the retrieved item and the received first data item. In another of these embodiments, the system 300 implements current text indexing techniques and text search libraries to perform efficient indexing of a semantic fingerprint (i.e., SDR) collection and to allow the similarity engine 304 to identify the second SDR of the second data item more efficiently than a "brute force" process such as iterating through each and every item in the database 120.

The method 500 includes providing, by the similarity engine, to the third computing device, an identification of the second data item and an identification of a level of semantic similarity between the first data item and the second data item, based on the determined distance (522). In one embodiment, the similarity engine 304 provides the identifications via the user interface. In another embodiment, the similarity engine 304 provides an identification of a level of semantic similarity between the first data item and the second data item based upon the determined distance, as described above in connection with FIG. 4 (418). In some embodiments, it will be understood, the similarity engine 304 retrieves a third SDR for a third data item from the SDR database and repeats the process of determining a distance between the first SDR of the first data item and the third SDR of the third data item and providing an identification of a level of semantic similarity between the first and third data items, based on the determined distance.

In one of these embodiments, the similarity engine 304 may return an enumeration of other data items that are most similar to the received data item. By way of example, the similarity engine 304 may generate an SDR 118 for the received data item and then search the SDR database 120 for other SDRs that are similar to the SDR 118. In other embodiments, the data item module 308 provides this functionality. By way of example, and without limitation, the similarity engine 304 (or the data item module 308) may compare the SDR 118 for the received data item with each of a plurality of SDRs in the SDR database 120 as described above and return an enumeration of data items that satisfy a requirement for similarity (e.g., having a distance between the data items that falls below a predetermined threshold). In some embodiments, the similarity engine 304 returns the SDRs that are most similar to a particular SDR (as opposed to returning the data item itself).

In some embodiments, a method for receiving a data item (which may be referred to as a keyword) and identifying similar data items performs as described above in connection with FIG. 2 (202-214). In some embodiments, the data item module 308 provides this functionality. In one of these embodiments, the method includes receiving a data item. The method may include receiving a request for most similar data items that are not identical to the received data item. In another of these embodiments, the method includes generating a first SDR for the received data item. In still another of these embodiments, the method includes determining a distance between the first SDR and each SDR in the SDR database 120. In yet another of these embodiments, the method includes providing an enumeration of data items for which the distance between an SDR of an enumerated data item and the first SDR fall below a threshold. Alternatively, the method includes providing an enumeration of data items with a level of similarity between each data item and the received data item above a threshold. In some embodiments, methods for identifying similar data items provide functionality for receiving a data item or an SDR of a data item and generating an enumeration of SDRs ordered by increasing distance (e.g., Euclidean distance). In one of these embodiments, the system 100 provides functionality for returning all contextual data items—that is, data items within the conceptual space in which the submitted data item occurs.

The data item module 308 may return similar data items either to a user providing the received data item or to another module or engine (e.g., the disambiguation module 306).

In some embodiments, the system may generate an enumeration of similar data items and transmit the enumeration to a system for executing queries, which may be either a system within the system 300 or a third-party search system. For example, a user may enter a data item into a user interface for executing queries (e.g., a search engine) and the user interface may forward the data item to the query module 601; the query module 601 may automatically call components of the system (e.g., the similarity engine 304) to generate the enumeration of similar data items and provide the data items to the user interface for executing as queries in addition to the user's original query, thereby improving the comprehensiveness of the user's search results. As another example, and as will be discussed in further detail in connection with FIGS. 6A-6C, the system may generate the enumeration of similar data items, provide the data items directly to a third-party search system, and return the results of the expanded search to the user via the user interface. Third-party search systems (which may also be referred to herein as enterprise search systems) may be any type or form; as indicated above in connection with the full-text search system 122, a side variety of such systems are available and may be enhanced using the methods and systems described herein.

Figure 6A:
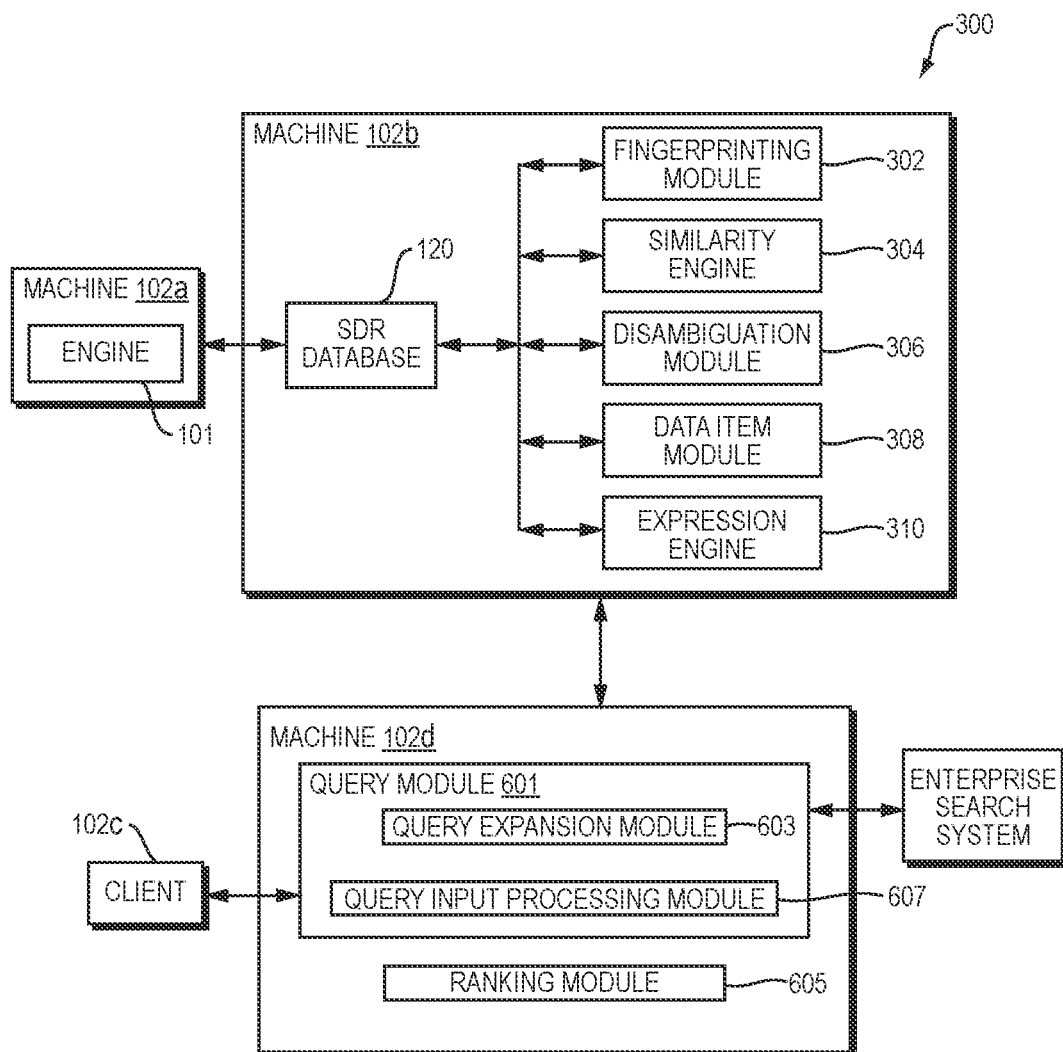
FIG. 6A is a block diagram depicting one embodiment of a system for expanding a query provided for use with a full-text search system.

Referring now to FIG. 6A, a block diagram depicts one embodiment of a system 300 for expanding a query of a full-text search system. In brief overview, the system 300 includes the elements and provides the functionality described above in connection with FIGS. 1A-1C and FIG. 3 above. The system 300 includes a machine 102*d* executing a query module 601. The query module 601 executes a query expansion module 603, a ranking module 605, and a query input processing module 607.

In one embodiment, the query module 601 receives query terms, directs the generation of SDRs for the received terms, and directs the identification of similar query terms. In another embodiment, the query module 601 is in communication with an enterprise search system provided by a third party. For example, the query module 601 may include one or more interfaces (e.g., application programming interface) with which to communicate with the enterprise search system. In some embodiments, the query module 601 is implemented at least in part as a software program. In other embodiments, the query module 601 is implemented at least in part as a hardware module. In still other embodiments, the query module 601 executes on the machine 102*d*.

In one embodiment, the query input processing module 607 receives query terms from a user of a client 102C. In another embodiment, the query input processing module 607 identifies a type of query term (e.g., individual word, group of words, sentence, paragraph, document, SDR, or other expression to be used in identifying similar terms). In some embodiments, the query input processing module 607 is implemented at least in part as a software program. In other embodiments, the query input processing module 607 is implemented at least in part as a hardware module. In still other embodiments, the query input processing module 607 executes on the machine 102*d*. In further embodiments, the query module 601 is in communication with or provides the functionality of the query input processing module 607.

In one embodiment, the query expansion module 603 receives query terms from a user of a client 102C. In another embodiment, the query expansion module 603 receives query terms from the query input processing module 607. In still another embodiment, the query expansion module 603 directs the generation of an SDR for a query term. In another embodiment, the query expansion module 603 directs the identification, by the similarity engine 304, of one or more terms that are similar to the query term (based on a distance between the SDRs). In some embodiments, the query expansion module 603 is implemented at least in part as a software program. In other embodiments, the query expansion module 603 is implemented at least in part as a hardware module. In still other embodiments, the query expansion module 603 executes on the machine 102*d*. In further embodiments, the query module 601 is in communication with or provides the functionality of the query expansion module 603.

Figure 6B:
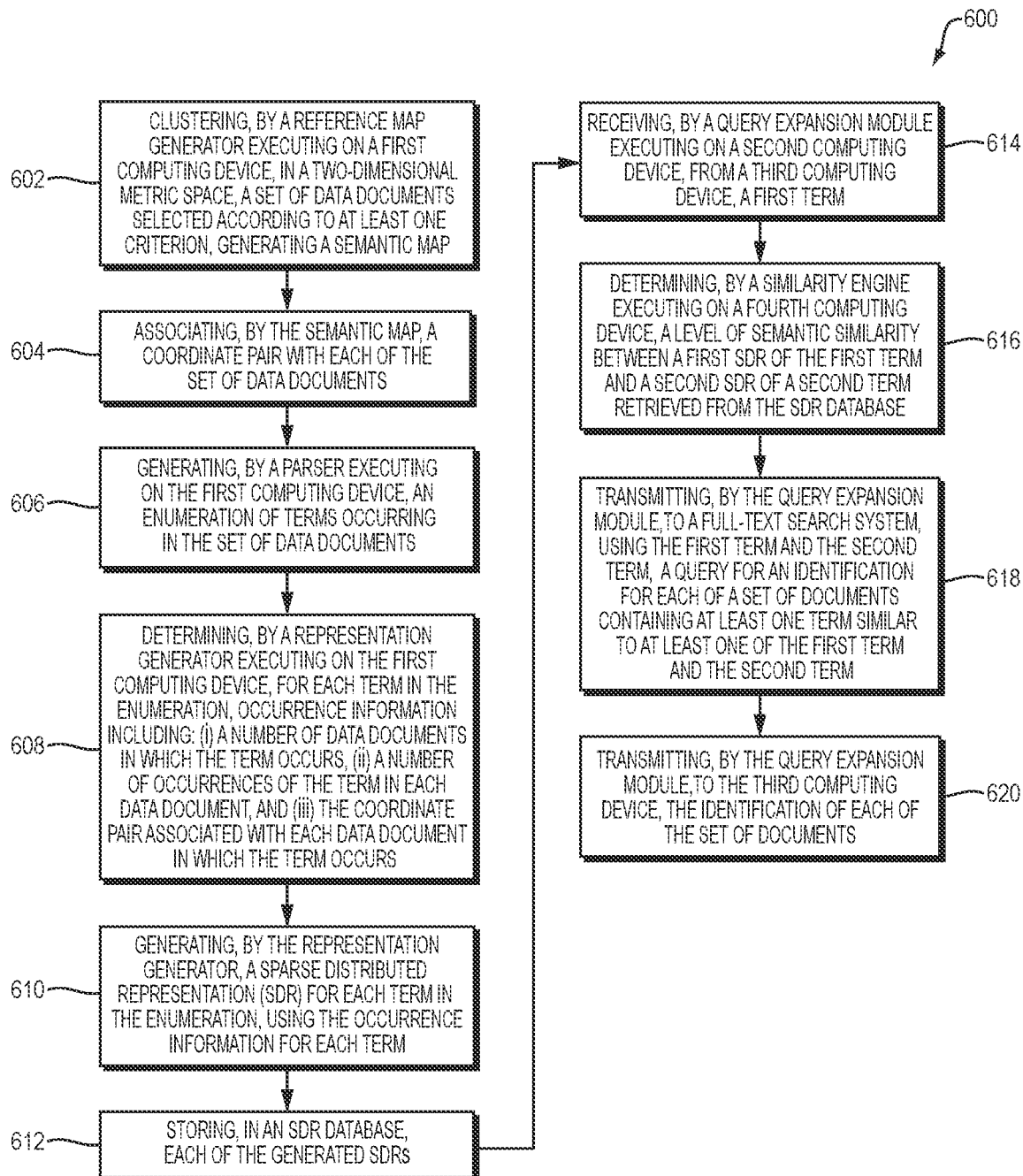
FIG. 6B is a flow diagram depicting one embodiment of a method for expanding a query provided for use with a full-text search system.

Referring now to FIG. 6B, a flow diagram depicts one embodiment of a method 600 for expanding a query of a full-text search system. In brief overview, the method 600 includes clustering, by a reference map generator executing on a first computing device, in a two-dimensional metric space, a set of data documents selected according to at least one criterion, generating a semantic map (602). The method 600 includes associating, by the semantic map, a coordinate pair with each of the set of data documents (604). The method 600 includes generating, by a parser executing on the first computing device, an enumeration of terms occurring in the set of data documents (606). The method 600 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (608). The method 600 includes generating, by the representation generator, a sparse distributed representation (SDR) for each term in the enumeration, using the occurrence information for each term (610). The method 600 includes storing, in an SDR database, each of the generated SDRs (612). The method 600 includes receiving, by a query expansion module executing on a second computing device, from a third computing device, a first term (614). The method 600 includes determining, by a similarity engine executing on a fourth computing device, a level of semantic similarity between a first SDR of the first term and a second SDR of a second term retrieved from the SDR database (616). The method 600 includes transmitting, by the query expansion module, to a full-text search system, using the first term and the second term, a query for an identification of each of a set of documents containing at least one term similar to at least one of the first term and the second term (618). The method 600 includes transmitting, by the query expansion module, to the third computing device, the identification of each of the set of documents (620).

In some embodiments, (602)-(612) are performed as described above in connection with FIG. 2 (202-214).

The method 600 includes receiving, by a query expansion module executing on a second computing device, from a third computing device, a first term (614). In one embodiment, the query expansion module 603 receives the first data item as described above in connection with FIG. 5 (518). In another embodiment, the query input processing module 607 receives the first term. In still another embodiment, the query input processing module 607 transmits the first term, with a request for generation of an SDR, to the fingerprinting module 302. In yet another embodiment, the query input processing module 607 transmits the first term to the engine 101 for generation of an SDR by the representation generator 114.

The method 600 includes determining, by a similarity engine executing on a fourth computing device, a level of semantic similarity between a first SDR of the first term and a second SDR of a second term retrieved from the SDR database (616). In one embodiment, the similarity engine 304 determines the level of semantic similarity as described above in connection with FIG. 5 (520).

The method 600 includes transmitting, by the query expansion module, to a full-text search system, using the first term and the second term, a query for an identification of each of a set of documents containing at least one term similar to at least one of the first term and the second term (618). In some embodiments, the similarity engine 304 provides the second term to the query module 601. It will be understood that the similarity engine may provide a plurality of terms that have a level of similarity to the first term that exceeds a similarity threshold. In other embodiments, the query module 601 may include one or more application programing interfaces with which to transmit queries, including one or more search terms, to the third-party enterprise search system.

The method 600 includes transmitting, by the query expansion module, to the third computing device, the identification of each of the set of documents (620).

Figure 6C:
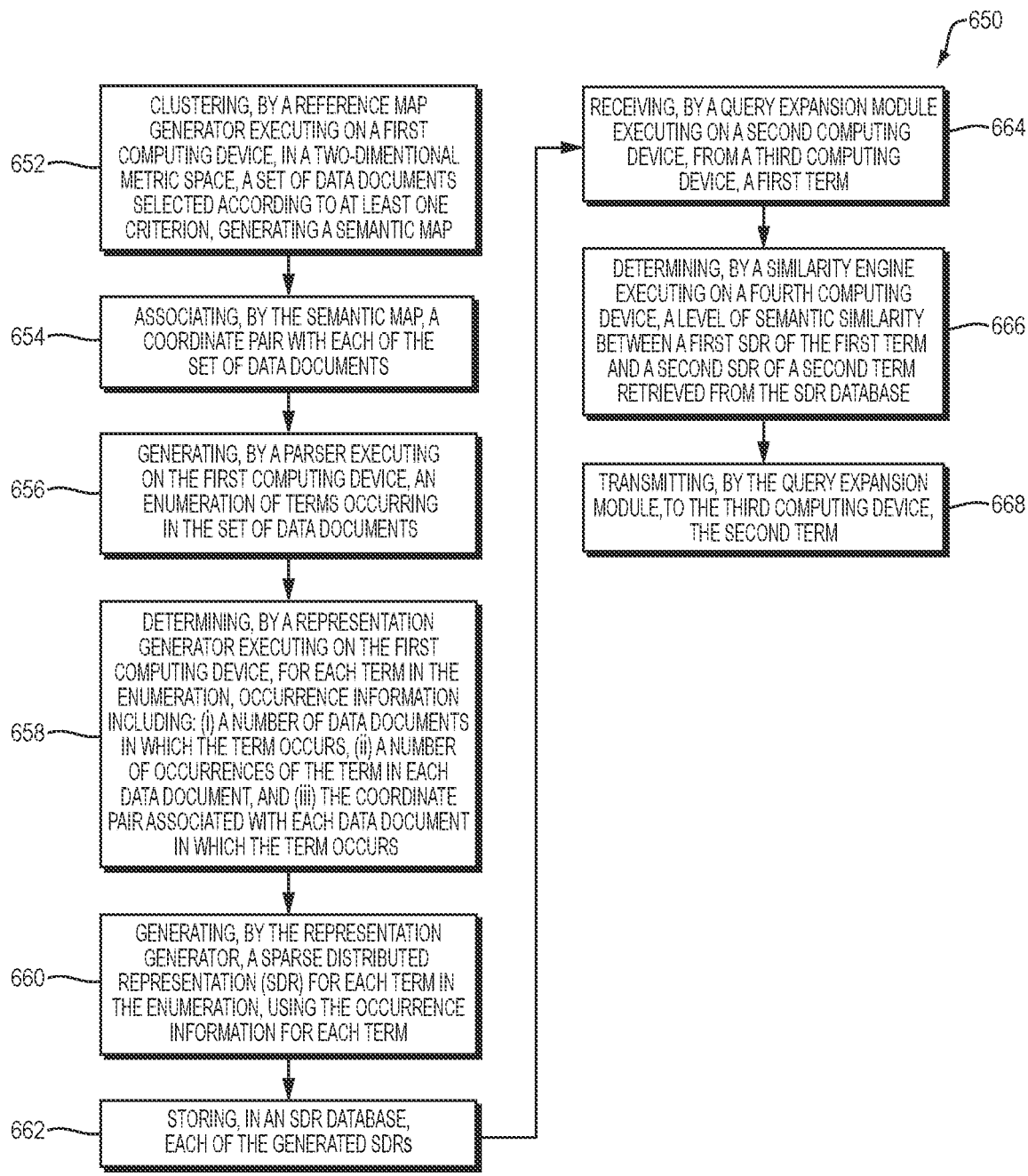
FIG. 6C is a flow diagram depicting one embodiment of a method for expanding a query provided for use with a full-text search system.

Referring now to FIG. 6C, a flow diagram depicts one embodiment of a method 650 for expanding a query of a full-text search system. In brief overview, the method 650 includes clustering, by a reference map generator executing on a first computing device, in a two-dimensional metric space, a set of data documents selected according to at least one criterion, generating a semantic map (652). The method 650 includes associating, by the semantic map, a coordinate pair with each of the set of data documents (654). The method 600 includes generating, by a parser executing on the first computing device, an enumeration of terms occurring in the set of data documents (656). The method 650 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (658). The method 650 includes generating, by the representation generator, a sparse distributed representation (SDR) for each term in the enumeration, using the occurrence information for each term (660). The method 650 includes storing, in an SDR database, each of the generated SDRs (662). The method 650 includes receiving, by a query expansion module executing on a second computing device, from a third computing device, a first term (664). The method 650 includes determining, by a similarity engine executing on a fourth computing device, a level of semantic similarity between a first SDR of the first term and a second SDR of a second term retrieved from the SDR database (666). The method 650 includes transmitting, by the query expansion module, to the third computing device, the second term (668).

In one embodiment, (652)-(666) are performed as described above in connection with (602-616). However, instead of providing the term or terms identified by the similarity engine directly to the enterprise search system, the method 650 includes transmitting, by the query expansion module, to the third computing device, the second term (668). In such a method, a user of the third computing device has the ability to review or modify the second term before the query is transmitted to the enterprise search system. In some embodiments, the user wants additional control over the query. In other embodiments, the user prefers to execute the queries herself. In further embodiments, the user wants the ability to modify a term identified by the system before transmission of the query. In still other embodiments, providing the identified term to the user allows the system to request feedback from the user regarding the identified term. In one of these embodiments, for example, the user may rate the accuracy of the similarity engine in identifying the second term. In another of these embodiments, by way of example, the user provides an indication that the second term is a type of term in which the user has a level of interest (e.g., the second term is a type the user is currently researching or developing an area of expertise).

In some embodiments, a method for evaluating at least one Boolean expression includes receiving, by the expression engine 310, at least one data item and at least one Boolean operator. The method includes performing the functionality described above in connection with FIG. 2 (202-214). In one embodiment, the expression engine 310 receives a plurality of data items that a user combined using Boolean operators and parentheses. For example, the user may submit a phrase such as "jaguar SUB porsche" and the expression engine 310 will evaluate the phrase and generate a modified version of an SDR for the expression. In another embodiment, therefore, the expression engine 310 generates a first SDR 118 for a first data item in the received phrase. In still another embodiment, the expression engine 310 identifies the Boolean operator within the received phrase (e.g., by determining that the second data item in a three-data item phrase is the Boolean operator or by comparing each data item in the received phrase to an enumeration of Boolean operators to determine whether the data item is a Boolean operator or not). The expression engine 310 evaluates the identified Boolean operator to determine how to modify the first data item. For example, the expression evaluator 310 may determine that a Boolean operator "SUB" is included in the received phrase; the expression engine 310 may then determine to generate a second SDR for a data item following the Boolean operator (e.g., porsche, in the example phrase above) and generate a third SDR by removing the points from the first SDR that appear in the second SDR. The third SDR would then be the SDR of the first data item, not including the SDR of the second data item. Similarly, if the expression engine 310 determined that the Boolean operator was "AND," the expression engine 310 would generate a third SDR by only using points in common to the first and the second SDR. Therefore, the expression engine 310 accepts data items, compound data items, and SDRs combined using Boolean operators and parentheses and returns an SDR that reflects the Boolean result of the formulated expression. The resulting modified SDR may be returned to a user or provided to other engines within the system 200 (e.g., the similarity engine 304). As those of ordinary skill in the art will understand, Boolean operators include, without limitation, AND, OR, XOR, NOT, and SUB.

In some embodiments, a method for identifying a plurality of sub-contexts of a data item includes receiving, by the disambiguation module 306, a data item. The method includes performing the functionality described above in connection with FIG. 2 (202-214). In one embodiment, the method includes generating a first SDR for the received data item. In another embodiment, the method includes generating an enumeration of data items that have SDRs that are similar to the first SDR; for example, the method may include providing the first SDR to the similarity engine and requesting an enumeration of similar SDRs as described above. In still another embodiment, the method includes analyzing one of the enumerated SDRs that is similar but not equal to the first SDR and removing from the first SDR the points (e.g., set bits) that also appear in the enumerated SDR (e.g., via binary subtraction) to generate a modified SDR. In another embodiment, the method includes repeating the process of removing points that appear in both the first SDR and the similar (but not identical) SDRs until the method has removed from the first SDR all the points that appear in each of the enumeration of similar SDRs. By way of example, upon receiving a request for data items similar to the data item "apple," the system may return data items such as "macintosh," and "iphone," "operating system"; if a user provides the expression "apple SUB macintosh" and asks for similar data items from the remaining points, the system may return data items such as "fruit," "plum," "orange," "banana." Continuing with this example, if the user then provides the expression "apple SUB macintosh SUB fruit" and repeats the request for similar data items, the system may return data items such as "records," "beatles," and "pop music." In some embodiments, the method includes subtraction of the points of the similar SDRs from the largest clusters in the first SDR instead of from the entire SDR, providing a more optimized solution.

In some embodiments, as indicated above, data items may refer to items other than words. By way of example, the system 300 (e.g., the similarity engine 304) may generate SDRs for numbers, compare the SDRs with reference SDRs generated from other numbers and provide users with enumerations of similar data items. For example, and without limitation, the system 300 (e.g., the similarity engine 304) may generate an SDR for the data item "100.1" and determine that the SDR has a similar pattern to an SDR for a data item associated with a patient who was diagnosed with infection triggered fever (e.g., in an embodiment in which a doctor or healthcare entity implements the methods and systems described herein, data items generated based on physical characteristics of a patient, such as body temperature or any other characteristic, the system may store an association between an SDR for the data item (100.1) and an identification of the data item as a reference data item for a patient with a fever). Determining that the data items have similar patterns provides functionality for identifying commonalities between dynamically generated SDRs and reference SDRs, enabling users to better understand the import of a particular data item. In some embodiments, therefore, the reference SDRs are linked to qualified diagnoses, making it possible to match a new patient's SDR profile against diagnosed patterns and deduct from it a mosaic of possible diagnoses for the new patient. In one of these embodiments, by aggregating this collection of potential diagnoses, users may "see" where points (e.g., semantic features of a data item) overlap and/or match. In such an embodiment, the most similar diagnosis to the new patient's SDR pattern is the predicted diagnoses.

As another example, and without limitation, the set of data documents 104 may include logs of captured flight data generated by airplane sensors (as opposed to, for example, encyclopedia entries on flight); the logs of captured data may include alphanumeric data items or may be primarily numeric. In such an example, the system 100 may provide functionality for generating SDRs of a variable (e.g., a variable associated with any type of flight data) and compare the generated SDR with a reference SDR (e.g., an SDR of a data item used as a reference item known to have a particular characteristic such as a fact about the flight during which the data item was generated, for example, that the flight had a particular level of altitude or a characterization of the altitude such as too high or too low). As another example, the system 100 may generate a first SDR for "500 (degrees)" and determine that the first SDR is similar to a second SDR for "28,000 (feet)." The system 100 may then determine that the second SDR is a reference SDR for data items indicating a characteristic of the flight (e.g., too high, too low, too fast, etc.), and thus provide a user who started with a data item "500" with an understanding of the import of the data item.

In some embodiments, a method is provided for dividing a document into portions (also referred to herein as slices) while respecting the topical structure of the submitted text. In one embodiment, the data item module 308 receives a document to be divided into topical slices. In another embodiment, the data item module 308 identifies a location in the document that has a different semantic fingerprint than a second location and divides the document into two slices, one containing the first location and one containing the second. The method includes performing the functionality described above in connection with FIG. 2 (202-214). In one embodiment, the method includes generating an SDR 118 for each sentence (e.g., strings delimited by periods) in the document. In another embodiment, the method includes comparing a first SDR 118*a* of a first sentence with a second SDR 118*b* of a second sentence. For example, the method may include transmitting the two SDRs to the similarity engine 304 for comparison. In still another embodiment, the method includes inserting a break into the document after the first sentence when the distance between the two SDRs exceeds a predetermined threshold. In another embodiment, the method includes determining not to insert a break into the document when the distance between the two SDRs does not exceed the predetermined threshold. In still another embodiment, the method includes repeating the comparison between the second sentence and a subsequent sentence. In another embodiment, the method includes iterating through the document, repeating comparisons between sentences until reaching the end of the document. In yet another embodiment, the method includes using the inserted breaks to generate slices of the document (e.g., returning a section of the document up through a first inserted break as a first slice). In some embodiments, having a plurality of smaller slices is preferred over a document but arbitrarily dividing a document (e.g., by length or word count) may be inefficient or less useful than a topic-based division. In one of these embodiments, by comparing the compound SDRs of the sentences, the system 300 can determine where the topic of the document has changed creating a logical dividing point. In another of these embodiments, the system 300 may provide a semantic fingerprint index in addition to a conventional index. Further examples of topic slicing are discussed in connection with FIGS. 7A-7B below.

Figure 7A:
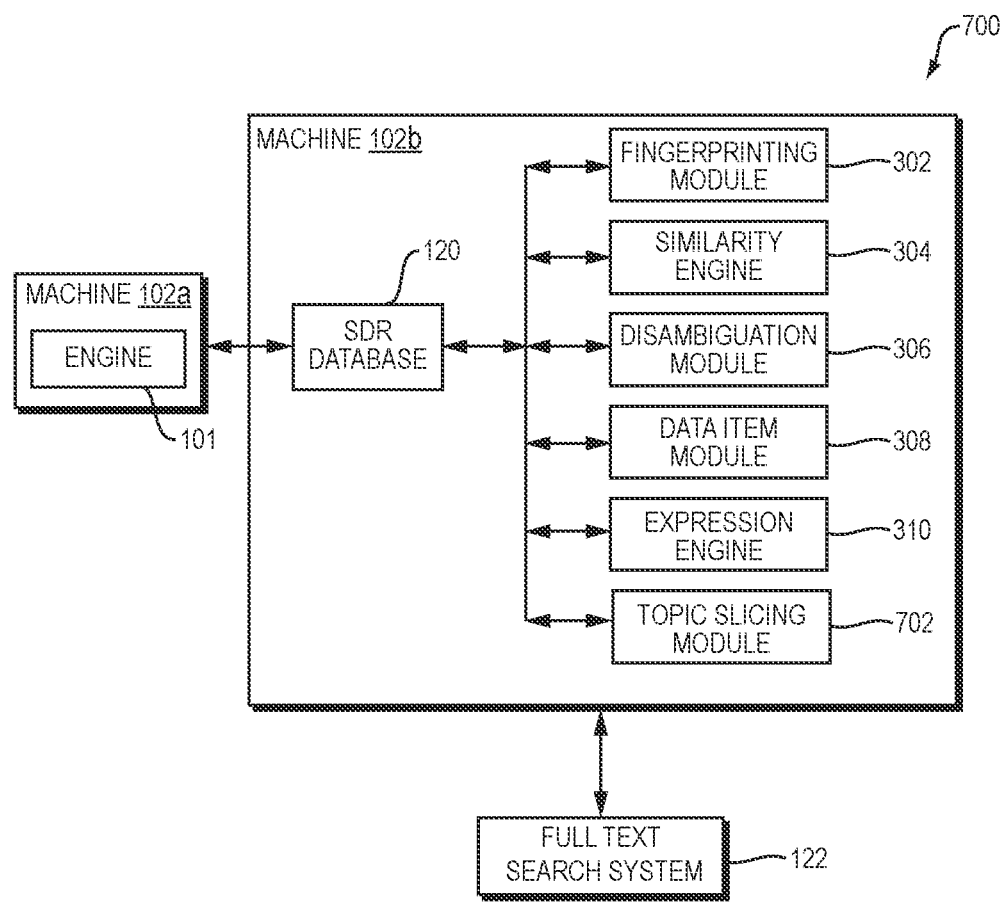
FIG. 7A is a block diagram depicting one embodiment of a system for providing topic-based documents to a full-text search system.
Figure 7B:
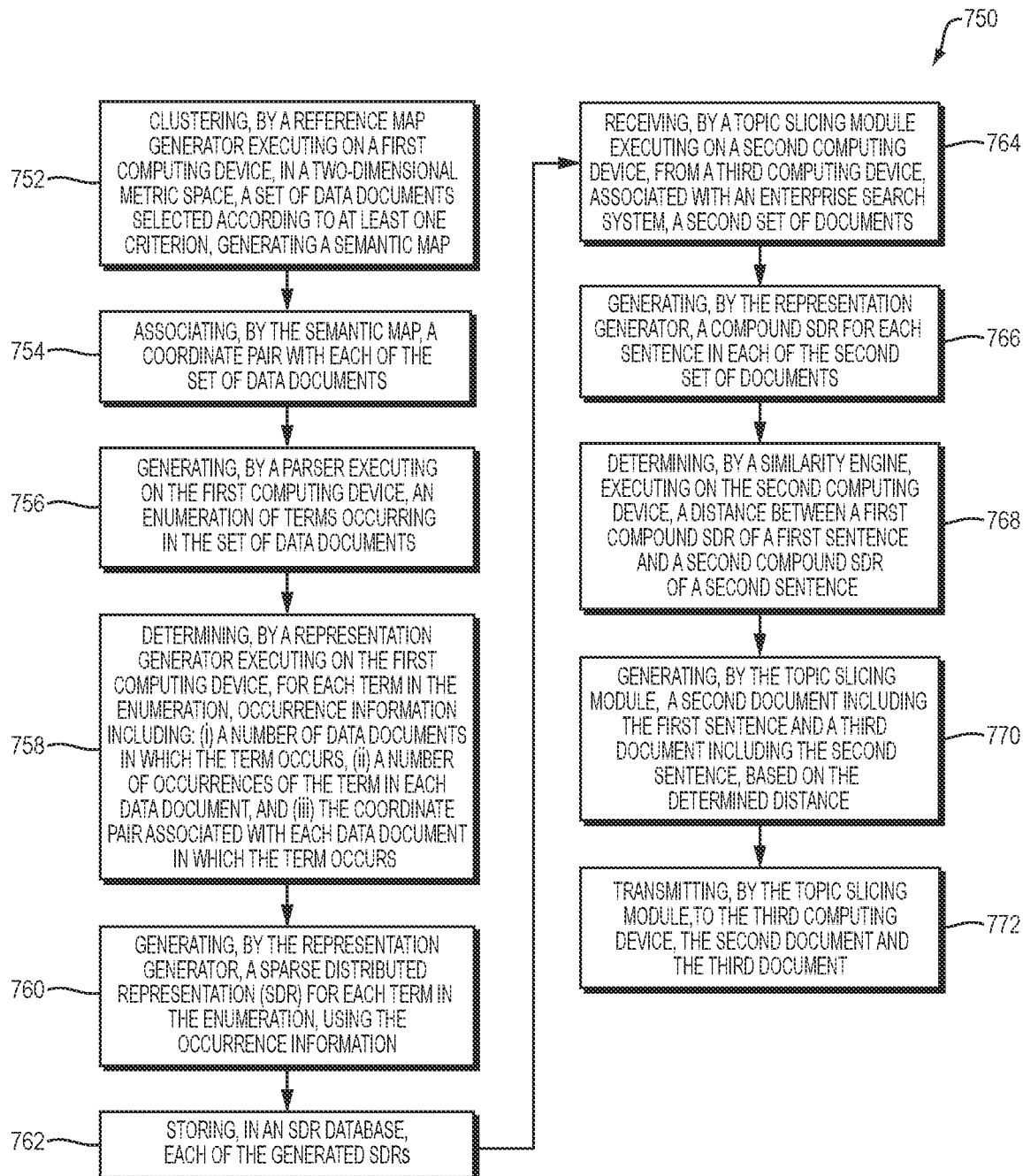
FIG. 7B is a flow diagram depicting one embodiment of a method for providing topic-based documents to a full-text search system.

Referring now to FIG. 7A, and in connection with FIG. 7B, a block diagram depicts one embodiment of a system 700 for providing topic-based documents to a full-text search system. In brief overview, the system 700 includes the elements and provides the functionality described above in connection with FIGS. 1A-1C and FIG. 3 above. The system 700 further includes a topic slicing module 702. In one embodiment, the topic slicing module 702 receives documents, directs the generation of SDRs for the received documents, and directs the generation of sub-documents in which sentences having less than a threshold level of similarity are placed into different documents, or other data structures. In another embodiment, the topic slicing module 702 is in communication with an enterprise search system provided by a third party. In some embodiments, the topic slicing module 702 is implemented at least in part as a software program. In other embodiments, the topic slicing module 702 is implemented at least in part as a hardware module. In still other embodiments, the topic slicing module 702 executes on the machine 102*b*.

Referring still to FIGS. 7A-B, a flow diagram depicts one embodiment of a method 750 for providing topic-based documents to a full-text search system. The method 750 includes clustering, by a reference map generator executing on a first computing device, in a two-dimensional metric space, a set of data documents selected according to at least one criterion, generating a semantic map (752). The method 750 includes associating, by the semantic map, a coordinate pair with each of the set of data documents (754). The method 750 includes generating, by a parser executing on the first computing device, an enumeration of terms occurring in the set of data documents (756). The method 750 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (758). The method 750 includes generating, by the representation generator, a sparse distributed representation (SDR) for each term in the enumeration, using the occurrence information (760). The method 750 includes storing, in an SDR database, each of the generated SDRs (762). The method 750 includes receiving, by a topic slicing module executing on a second computing device, from a third computing device associated with an enterprise search system, a second set of documents (764). The method 750 includes generating, by the representation generator, a compound SDR for each sentence in the each of the second set of documents (766). The method 750 includes determining, by a similarity engine executing on the second computing device, a distance between a first compound SDR of a first sentence and a second compound SDR of a second sentence (768). The method 750 includes generating, by the topic slicing module, a second document including the first sentence and a third document including the second sentence, based on the determined distance (770). The method 750 includes transmitting, by the topic slicing module, to the third computing device, the second document and the third document (772).

In one embodiment, (752)-(762) are performed as described above in connection with FIG. 2 (202)-(214).

The method 750 includes receiving, by a topic slicing module executing on a second computing device, from a third computing device associated with an enterprise search system, a second set of documents (764). In one embodiment, the topic slicing module 702 receives the second set of documents for processing to create a version of the second set of documents optimized for indexing by the enterprise search system, which may be a conventional search system. In another embodiment, the topic slicing module 702 receives the second set of documents for processing to create a version of the second set of documents optimized for indexing by a search system provided by the system 700, as will be described in greater detail below in connection with FIGS. 9A-9B. In some embodiments, the received second set of documents includes one or more XML documents. For example, the third computing device may have converted one or more enterprise documents into XML documents for improved indexing.

The method 750 includes generating, by the representation generator, a compound SDR for each sentence in each of the second set of documents (766). As discussed in connection with FIG. 2 above, if a phrase, sentence, paragraph, or other combination of data items needs to be converted into a single SDR that reflects the "union property" of the individual SDRs (e.g., the combination of the SDRs of each word in a sentence), the system 100 may convert each individual data item into its SDR (by generating dynamically or by retrieving the previously generated SDR) and use a binary OR operation to form a single compound SDR from the individual SDRs; the result may be sparsified by the sparsifying module 116.

The method 750 includes determining, by a similarity engine executing on the second computing device, a distance between a first compound SDR of a first sentence and a second compound SDR of a second sentence (768). In one embodiment, the similarity engine determines the distance as described above in connection with FIG. 4 (416).

The method 750 includes generating, by the topic slicing module, a second document including the first sentence and a third document including the second sentence, based on the determined distance (770). The topic slicing module may determine that the distance determined by the similarity engine exceeds a threshold for similarity and that the second sentence therefore relates to a different topic than the first sentence and so should go into a different document (or other data structure). In other embodiments, the similarity engine provides the topic slicing module 702 with an identification of a level of similarity between the first sentence and the second sentence, based on the determined distance (as described above in connection with FIG. 4) and the topic slicing module 702 determines that the level of similarity does not satisfy a threshold level of similarity and determines to put the second sentence in a different document than the first sentence. In contrast, in other embodiments, the topic slicing module 702 decides that the determined distance (and/or level of similarity) satisfies a similarity threshold and that the first sentence and the second sentence are topically similar and should remain together in a single document.

In still another embodiment, the method includes repeating the comparison between the second sentence and a subsequent sentence. In another embodiment, the method includes iterating through the document, repeating comparisons between sentences until reaching the end of the document.

The method 750 includes transmitting, by the topic slicing module, to the third computing device, the second document and the third document (772).

Figure 8A:
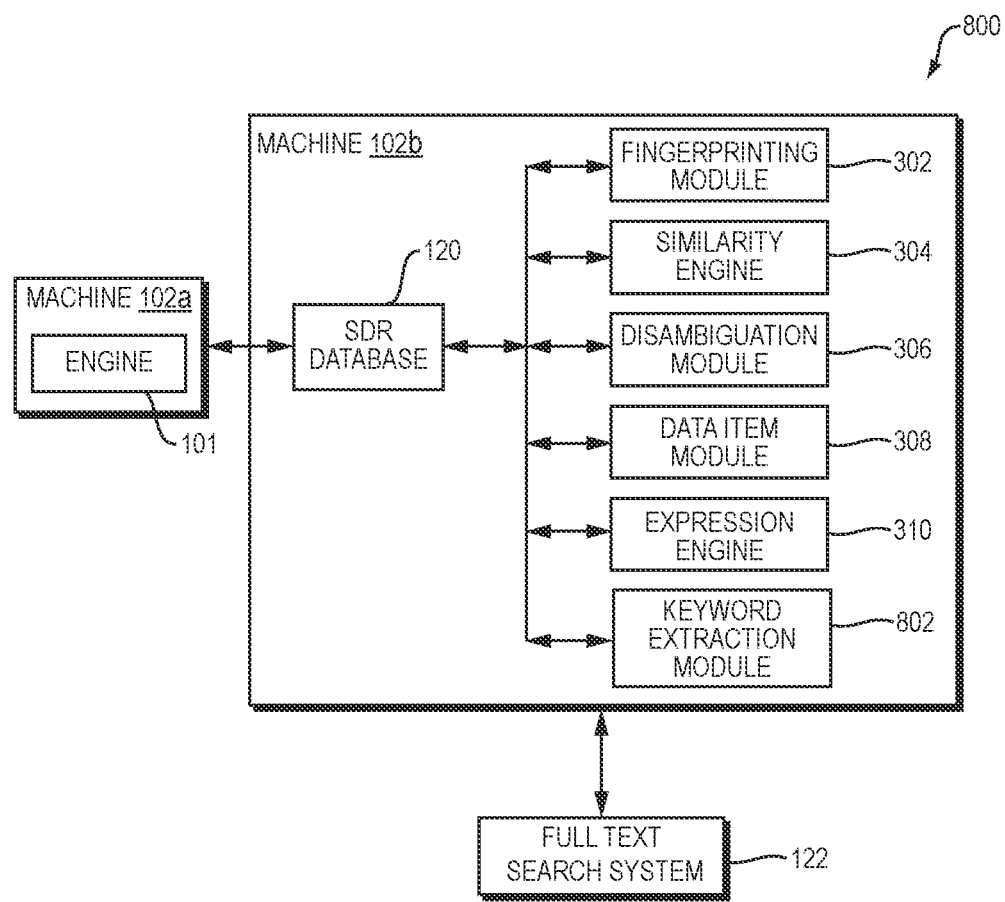
FIG. 8A is a block diagram depicting one embodiment of a system for providing keywords associated with documents to a full-text search system for improved indexing.
Figure 8B:
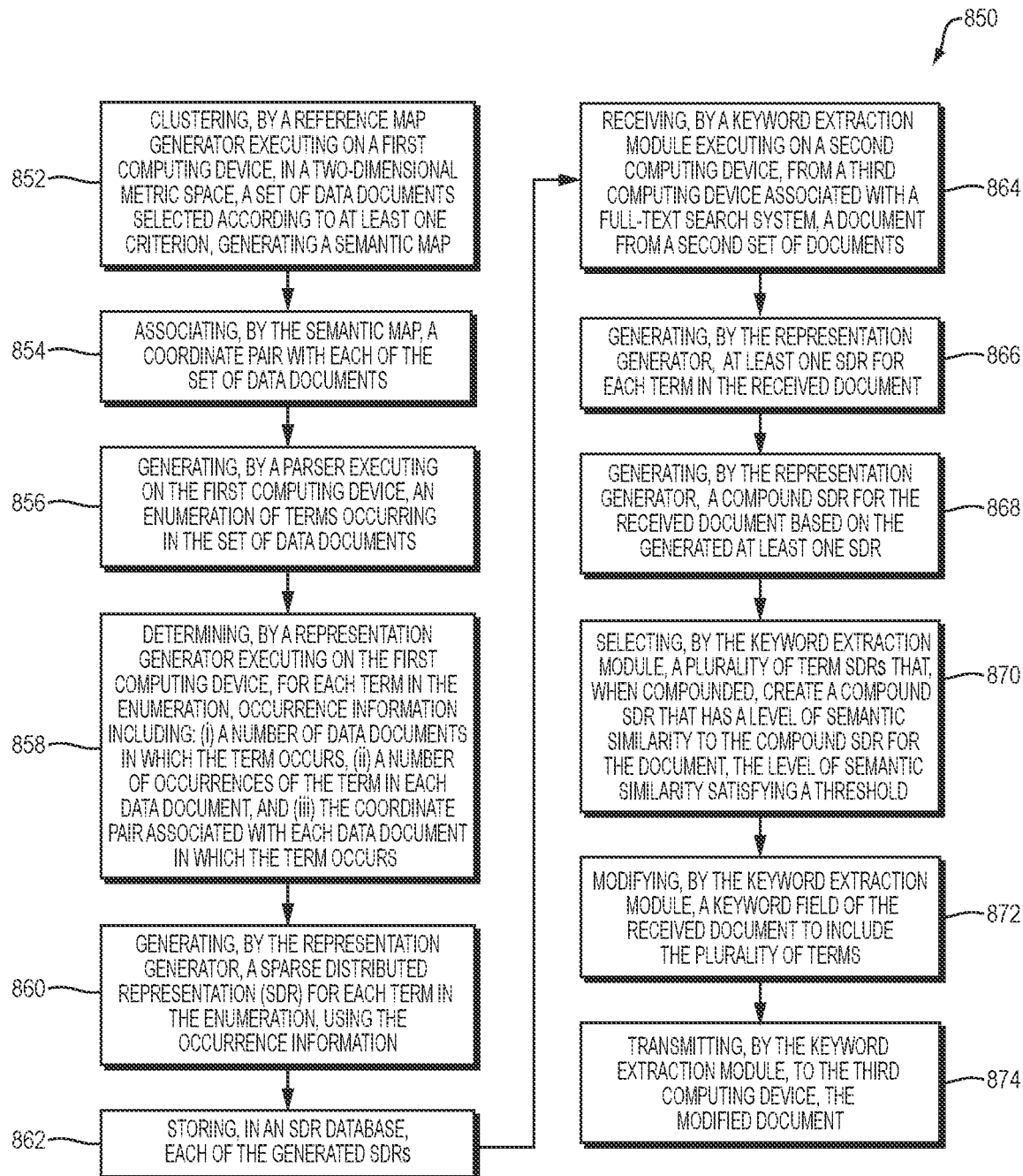
FIG. 8B is a flow diagram depicting one embodiment of a method for providing keywords associated with documents to a full-text search system for improved indexing.

Referring now to FIG. 8B, and in connection with FIG. 8A, a flow diagram depicts one embodiment of a method 850 for extracting keywords from text documents. The method 850 includes clustering in a two-dimensional metric space, by a reference map generator executing on a first computing device, a set of data documents selected according to at least one criterion, generating a semantic map (852). The method 850 includes associating, by the semantic map, a coordinate pair with each of the set of data documents (854). The method 850 includes generating, by a parser executing on the first computing device, an enumeration of terms occurring in the set of data documents (856). The method 850 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (858). The method 850 includes generating, by the representation generator, a sparse distributed representation (SDR) for each term in the enumeration, using the occurrence information (860). The method 850 includes storing, in an SDR database, each of the generated SDRs (862). The method 850 includes receiving, by a keyword extraction module executing on a second computing device, from a third computing device associated with a full-text search system, a document from a second set of documents (864). The method 850 includes generating, by the representation generator, at least one SDR for each term in the received document (866). The method 850 includes generating, by the representation generator, a compound SDR for the received document, based on the generated at least one SDR (868). The method 850 includes selecting, by the keyword extraction module, a plurality of term SDRs that, when compounded, create a compound SDR that has a level of semantic similarity to the compound SDR for the document, the level of semantic similarity satisfying a threshold (870). The method 850 includes modifying, by the keyword extraction module, a keyword field of the received document to include the plurality of terms (872). The method 850 includes transmitting, by the keyword extraction module, to the third computing device, the modified document (874).

In one embodiment, (852)-(862) are performed as described above in connection with FIG. 2 (202)-(214).

In one embodiment, the system 800 includes the elements and provides the functionality described above in connection with FIGS. 1A-1C and FIG. 3 above. The system 800 further includes a keyword extraction module 802. In one embodiment, the keyword extraction module 802 receives documents, directs the generation of SDRs for the received documents, identifies keywords for the received documents, and modifies the received documents to include the identified keywords. In another embodiment, the keyword extraction module 802 is in communication with an enterprise search system provided by a third party. In some embodiments, the keyword extraction module 802 is implemented at least in part as a software program. In other embodiments, the keyword extraction module 802 is implemented at least in part as a hardware module. In still other embodiments, the keyword extraction module 802 executes on the machine 102b.

The method 850 includes receiving, by a keyword extraction module executing on a second computing device, from a third computing device associated with a full-text search system, a document from a second set of documents (864). In one embodiment, the keyword extraction module 802 receives the documents as described at FIG. 7 (764), in connection with the topic slicing module 702.

The method 850 includes generating, by the representation generator, at least one SDR for each term in the received document (866). In one embodiment, the keyword extraction module 802 transmits each term in the received document to the representation generator 114 to generate the at least one SDR. In another embodiment, the keyword extraction module 802 transmits each term in the received document to the fingerprinting module 302 for generation of the at least one SDR.

In some embodiments, the keyword extraction module 802 transmits the document to the fingerprinting module 302 with a request for generation of compound SDRs for each sentence in the document. In other embodiments, the keyword extraction module 802 transmits the document to the representation generator 114 with a request for generation of compound SDRs for each sentence in the document.

The method 850 includes generating, by the representation generator, a compound SDR for the received document based on the generated at least one SDR (868). In one embodiment, the keyword extraction module 802 requests generation of the compound SDR from the representation generator 114. In another embodiment, the keyword extraction module 802 requests generation of the compound SDR from the fingerprinting module 302.

The method 850 includes selecting, by the keyword extraction module, a plurality of term SDRs that, when compounded, create a compound SDR that has a level of semantic similarity to the compound SDR for the document, the level of semantic similarity satisfying a threshold (870). In one embodiment, the keyword extraction module 802 directs the similarity engine 304 to compare the compound SDR for the document with the SDRs for a plurality of terms ("term SDRs") and to generate an identification of a level of similarity between the plurality of terms and the document itself. In some embodiments, the keyword extraction module 802 identifies the plurality of terms that satisfies the threshold by having the similarity engine 304 iterate through combinations of term SDRs, generate comparisons with the compound SDR for the document, and return an enumeration of a level of semantic similarity between the document and each combination of terms. In another of these embodiments, the keyword extraction module 302 identifies a plurality of terms having a level of semantic similarity to the document that satisfies the threshold and that also contains the least number of terms possible.

The method 850 includes modifying, by the keyword extraction module, a keyword field of the received document to include the plurality of terms (872). As indicated above, the received document may be a structured document, such as an XML document, and may have a section within which the keyword extraction module 802 may insert the plurality of terms.

The method 850 includes transmitting, by the keyword extraction module, to the third computing device, the modified document (874).

As described above, enterprise search systems may include implementations of conventional search systems, including those described in connection with the full-text search system 122 described above (e.g., Lucene-based systems, open source systems such as Xapian, commercial systems such as Autonomy IDOL or COGITO, and the other systems listed in detail above). The phrases "enterprise search system" and "full-text search system" may be used interchangeably herein. The methods and systems described in FIGS. 6-8 describe enhancements to such enterprise systems; that is, by implementing the methods and systems described herein, an entity making such an enterprise system available may enhance the available functionality—making indexing more efficient by adding keywords, expanding query terms for users and automatically providing them to the existing system, etc. However, entities making search systems available to their users may wish to go further than enhancing certain aspects of their existing systems by replacing the systems entirely, or seeking to implement an improved search system in the first instance. In some embodiments, therefore, an improved search system is provided.

Figure 9A:
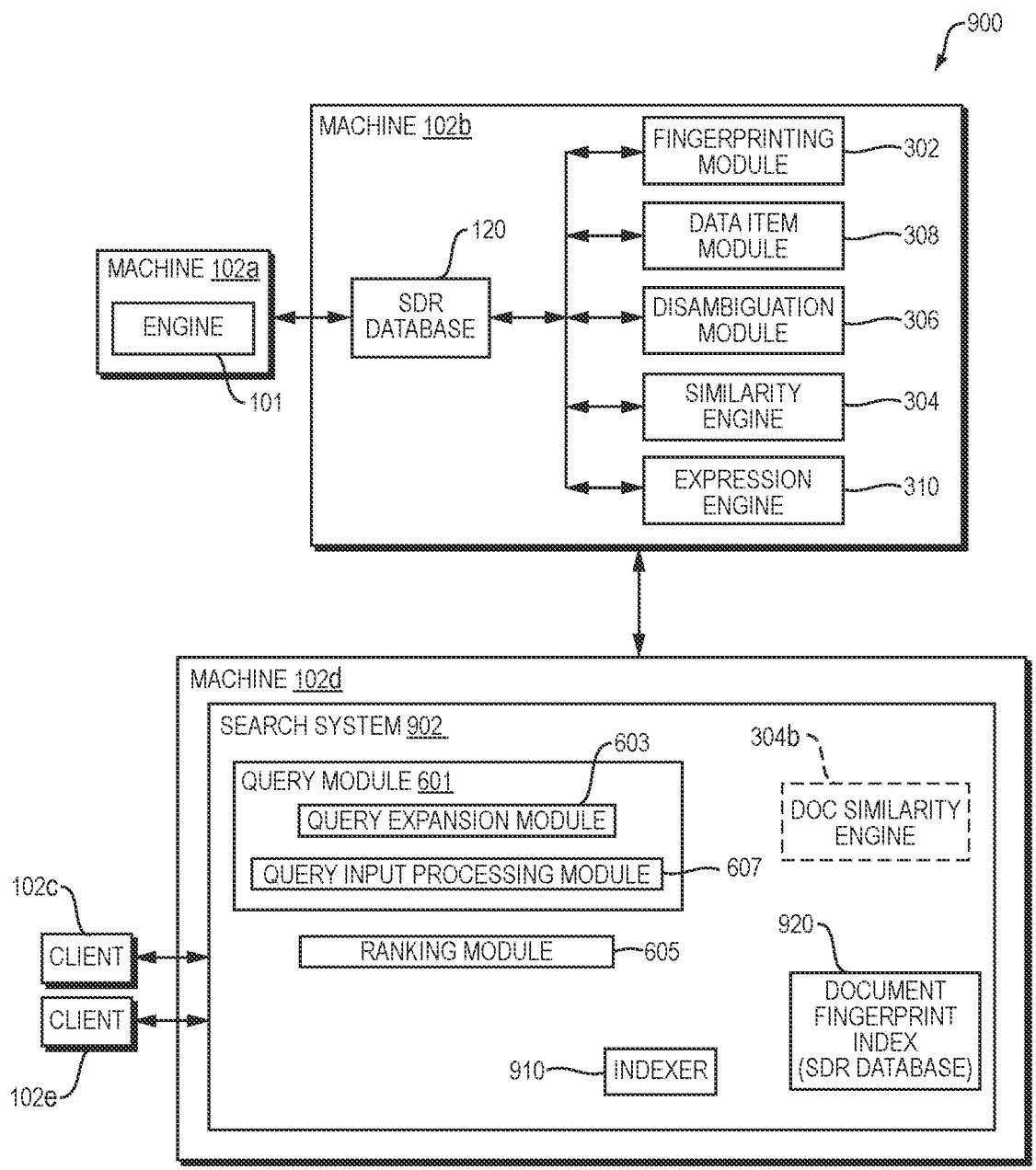
FIG. 9A is a block diagram depicting one embodiment of a system for providing search functionality for text documents.

Referring now to FIG. 9A, a block diagram depicts one embodiment of a system 900 for implementing a full-text search system 902. In one embodiment, the system 900 includes the functionality described above in connection with FIGS. 1A-1C, 3, 6A, 7A, and 8A. The search system 902 includes the query module 601, which may be provided as described above in connection with FIGS. 6A-6B. The search system 902 includes a document fingerprint index 920; the document fingerprint index 920 may be a version of the SDR database 120. The document fingerprint index 920 may also include metadata (e.g., tags). The search system 902 may include a document similarity engine 304B; for example, the document similarity engine 304b may be a copy of the similarity engine 304 that is refined over time for working with the search system 902. The search system 902 includes an indexer 910, which may be provided as either a hardware module or a software module.

Figure 9B:
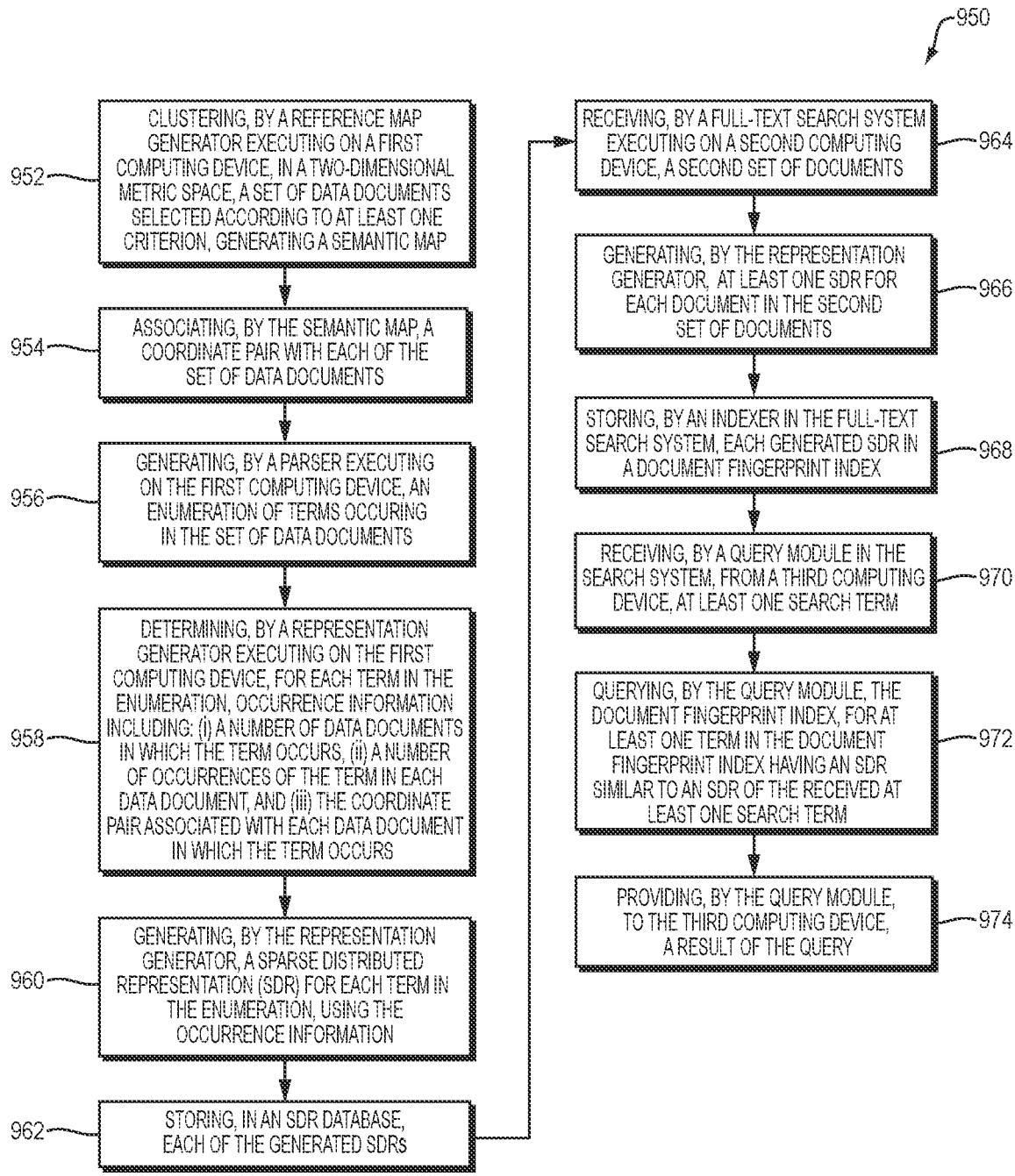
FIG. 9B is a flow diagram depicting one embodiment of a method for providing search functionality for text documents.

Referring now to FIG. 9B, and in connection with FIG. 9A, a method 950 includes clustering in a two-dimensional metric space, by a reference map generator executing on a first computing device, a set of data documents selected according to at least one criterion, generating a semantic map (952). The method 950 includes associating, by the semantic map, a coordinate pair with each of the set of data documents (954). The method 950 includes generating, by a parser executing on the first computing device, an enumeration of terms occurring in the set of data documents (956). The method 950 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (958). The method 950 includes generating, by the representation generator, a sparse distributed representation (SDR) for each term in the enumeration, using the occurrence information (960). The method 950 includes storing, in an SDR database, each of the generated SDRs (962). The method 950 includes receiving, by a full-text search system executing on a second computing device, a second set of documents (964). The method 950 includes generating, by the representation generator, at least one SDR for each document in the second set of documents (966). The method 950 includes storing, by an indexer in the full-text search system, each generated SDR in a document fingerprint index (968). The method 950 includes receiving, by a query module in the search system, from a third computing device, at least one search term (970). The method 950 includes querying, by the query module, the document fingerprint index, for at least one term in the document fingerprint index having an SDR similar to an SDR of the received at least one search term (972). The method 950 includes providing, by the query module, to the third computing device, a result of the query (974).

The method 950 includes clustering in a two-dimensional metric space, by a reference map generator executing on a first computing device, a set of data documents selected according to at least one criterion, generating a semantic map (952). In some embodiments, the set of data documents are selected and the clustering occurs as described above in connection with FIG. 2 (202). As indicated above in connection with FIGS. 1-2, in initializing a system for use with the methods and systems described herein, a training process occurs. As described above, the reference map generator 106 is trained using at least one set of data documents (more specifically, using the document vectors of each document in the set of data documents). As was also discussed above, the semantic resolution of a set of documents refers to how many positions are available based on the training data, which in some aspects reflects the nature of the training data (colloquially, this might be referred to as how much "real estate" is available on the map). To increase the semantic resolution, different or additional training documents may be used. There are, therefore, several different approaches to training the reference map generator 106. In one embodiment, a generic training corpus may be used when generating SDRs for each term received (e.g., terms within enterprise documents); one advantage to such an approach is that the corpus has likely been selected to satisfy one or more training criteria but a disadvantage is that the corpus may or may not have sufficient words to support a specialized enterprise corpus (e.g., a highly technical corpus including a number of terms that have particular meanings within a specialty or practice). In another embodiment, therefore, a set of enterprise documents may be used as the training corpus; one advantage to this approach is that the documents used for training will include any highly technical or otherwise specialized terms common within the enterprise but a disadvantage is that the enterprise documents may not satisfy the training criteria (e.g., there may not be enough documents, they may be of insufficient length or diversity, etc.). In still another embodiment, a generic training corpus and an enterprise corpus are combined for training purposes. In yet another embodiment, a special set of technical documents is identified and processed for use as a training corpus; for example, these documents may include key medical treatises, engineering specifications, or other key reference materials in specialties relevant to the enterprise documents that will be used. By way of example, a reference corpus may be processed and used for training and then the resulting engine 101 may use the trained database, separately licensed to enterprises seeking to implement the methods and systems described herein. These embodiments are equally applicable to the embodiments discussed in connection with FIGS. 6-8 as to those with FIGS. 9A-B.

Continuing with FIG. 9B, in some embodiments (954)-(962) are performed as described above in connection with FIGS. 1-2.

The method 950 includes receiving, by a full-text search system executing on a second computing device, a second set of documents (964). In one embodiment, the second set of documents includes enterprise documents (e.g., documents generated by, maintained by, accessed by, or otherwise associated with an enterprise seeking to implement the full-text search system 902). In another embodiment, the search system 902 makes one or more enterprise documents searchable. To do so, the search system 902 indexes the one or more enterprise documents. In one embodiment, the search system 902 directs the preprocessing of the enterprise documents (e.g., by having the topic slicing module 702 and/or the keyword extraction module 802 process the documents as described above in connection with FIGS. 7B and 8B). In another embodiment, the search system 902 directs the generation of an SDR for each of the documents based on the training corpus (as described above in connection with FIGS. 1-2). In still another embodiment, having generated SDRs for each document, the search system 902 has enabled a search process wherein a query term is received (e.g., by the query input processing module 607), an SDR is generated for the query term and the query SDR is compared to an indexed SDRs.

The method 950 includes generating, by the representation generator, at least one SDR for each document in the second set of documents (966). In one embodiment, the search system 902 includes functionality for transmitting the documents to the fingerprinting module 302 for generation of the at least one SDR. In another embodiment, the search system 902 includes functionality for transmitting the documents to the representation generator 114 for generation of the at least one SDR. The at least one SDR may include, by way of example, and without limitation, an SDR for each term in the document, a compound SDR for subsections of the document (e.g., sentences or paragraphs), and a compound SDR for the document itself.

The method 950 includes storing, by an indexer in the full-text search system, each generated SDR in a document fingerprint index (968). In one embodiment, the generated SDRs are stored in the document fingerprint index 920 in a substantially similar manner as the manner in which SDRs were stored in the SDR database 120, discussed above.

The method 950 includes receiving, by a query module in the search system, from a third computing device, at least one search term (970). In one embodiment, the query module receives the search term as described above in connection with FIGS. 6A-6B.

The method 950 includes querying, by the query module, the document fingerprint index, for at least one term in the document fingerprint index having an SDR similar to an SDR of the received at least one search term (972). In one embodiment, the query module 601 queries the document fingerprint index 920. In another embodiment, in which the system 900 includes a document similarity engine 304B, the query module 601 directs the document similarity engine 304b to identify the SDR of the at least one term in the document fingerprint index 920. In still another embodiment, the query module 601 directs the similarity engine 304 executing on the machine 102b to identify the term. In other embodiments, the query module 601 executes the search as described above in connection with FIGS. 6A-6B, although instead of sending the query to an external enterprise search system, the query module 601 sends the query to components within the system 900.

The method 950 includes providing, by the query module, to the third computing device, a result of the query (974). In some embodiments, in which there is more than one result (e.g., more than one similar term), the query module 601 first ranks the results or directs another module to rank the results. Ranking may implement conventional ranking techniques. Alternatively, ranking may include execution of the methods described in connection with FIGS. 11A-B below.

In some embodiments, the full-text search system 902 provides a user interface (not shown) with which a user may provide feedback on the query results. In one of these embodiments, the user interface includes a user interface element with which the user may specify whether the result was useful. In another of these embodiments, the user interface includes a user interface element with which the user may provide an instruction to the query module 601 to execute a new search using one of the query results. In still another of these embodiments, the user interface includes a user interface element with which the user may specify that they have an interest in a topic related to one of the query results and wish to store an identifier of the query result and/or the related topic for future reference by either the user or the system 900.

In one embodiment, a system may provide functionality for monitoring the types of searches a user executes and developing a profile for the user based on analysis of the SDRs of the search terms the user provided. In such an embodiment, the profile may identify a level of expertise of the user and may be provided to other users.

Figure 10A:
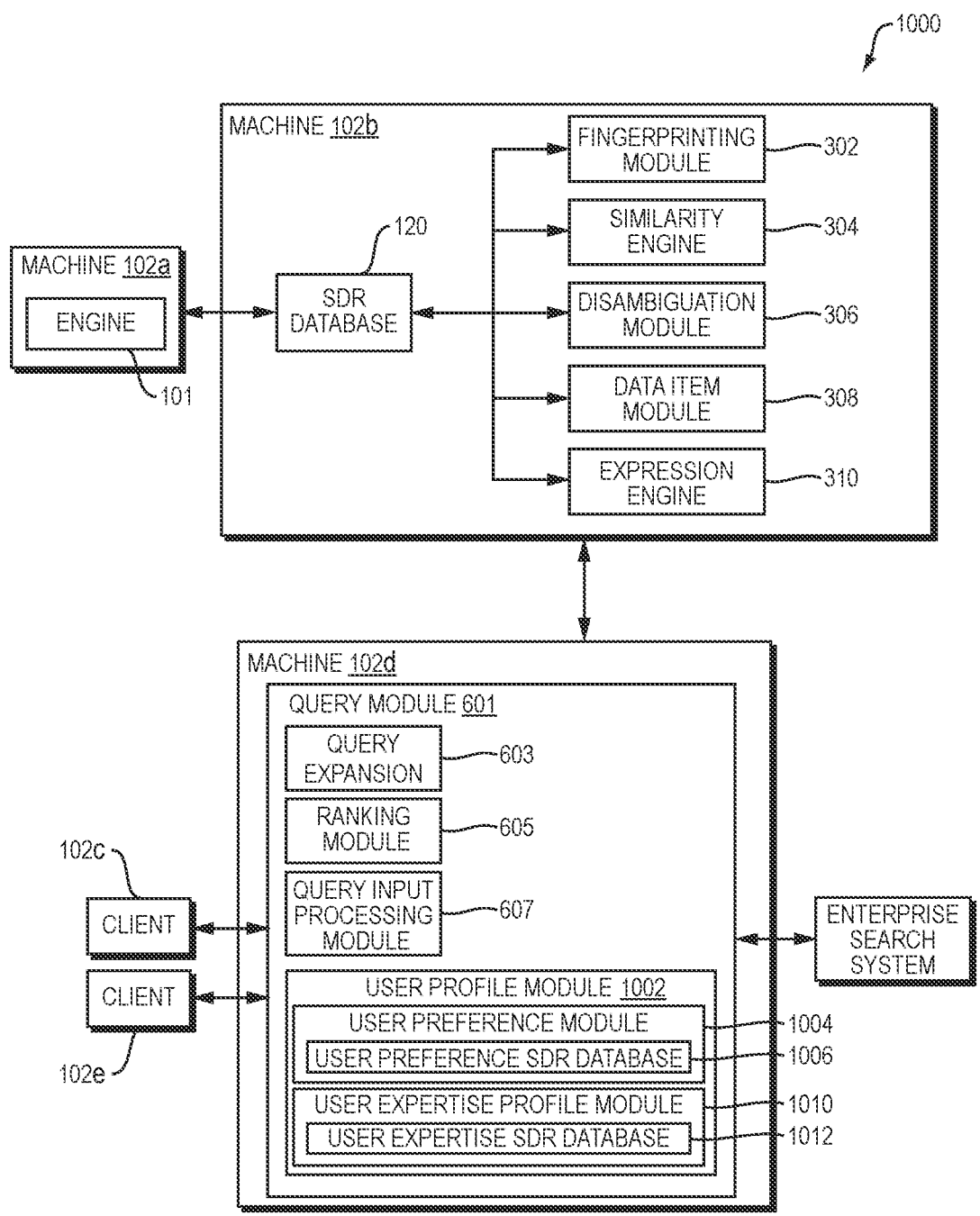
FIG. 10A is a block diagram depicting one embodiment of a system providing user expertise matching within a full-text search system.
Figure 10B:
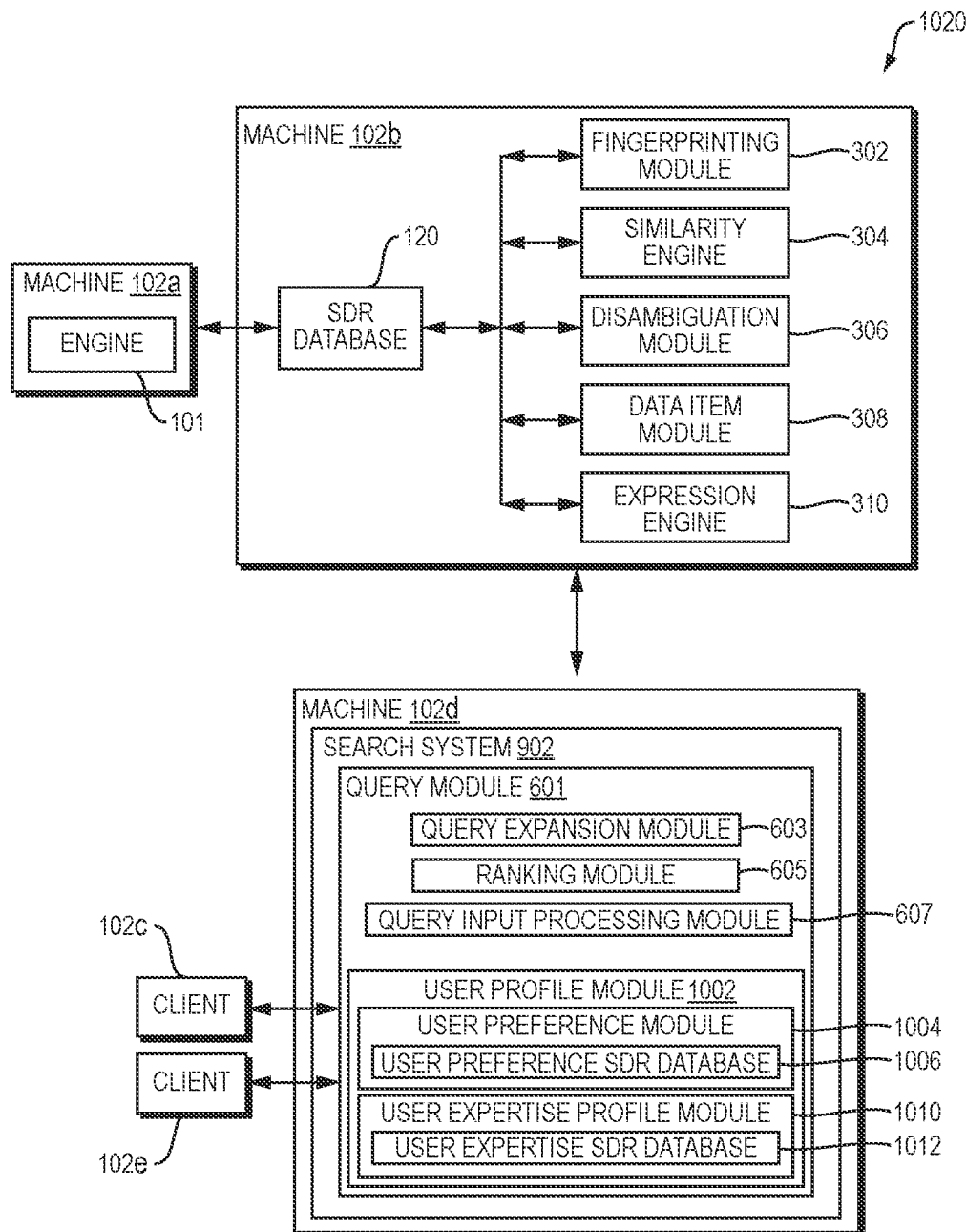
FIG. 10B is a block diagram depicting one embodiment of a system providing user expertise matching within a full-text search system.

Referring now to FIGS. 10A and 10B, block diagrams depict embodiments of systems for matching user expertise with requests for user expertise, based on previous search results. FIG. 10A depicts an embodiment in which functionality for developing user expertise profiles (e.g., user expertise profile module 1010) is provided in conjunction with a conventional full-text search system. FIG. 10B depicts an embodiment in which functionality for developing user expertise profiles (e.g., user expertise profile module 1010) is provided in conjunction with the full-text search system 902. Each of the modules depicted in FIGS. 10A-B may be provided as either hardware modules or software modules.

Figure 10C:
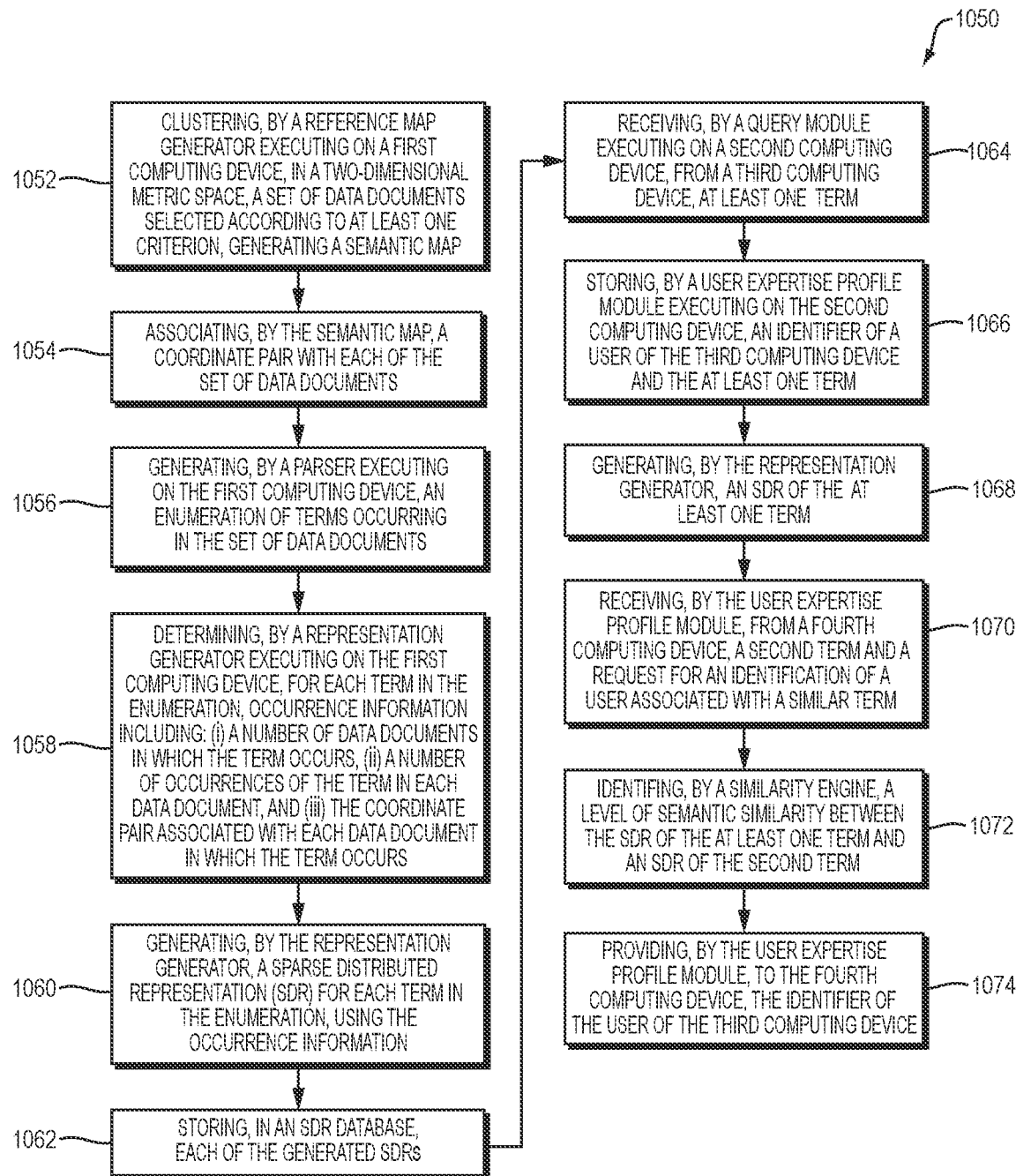
FIG. 10C is a flow diagram depicting one embodiment of a method for matching user expertise with requests for user expertise.

Referring now to FIG. 10C, a flow diagram depicts an embodiment of a method 1050 for matching user expertise with requests for user expertise, based on previous search results. The method 1050 includes clustering in a two-dimensional metric space, by a reference map generator executing on a first computing device, a set of data documents selected according to at least one criterion, generating a semantic map (1052). The method 1050 includes associating, by the semantic map, a coordinate pair with each of the set of data documents (1054). The method 1050 includes generating, by a parser executing on the first computing device, an enumeration of terms occurring in the set of data documents (1056). The method 1050 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1058). The method 1050 includes generating, by the representation generator, a sparse distributed representation (SDR) for each term in the enumeration, using the occurrence information (1060). The method 1050 includes storing each of the generated SDRs in an SDR database (1062). The method 1050 includes receiving, by a query module executing on a second computing device, from a third computing device, at least one term (1064). The method 1050 includes storing, by a user expertise profile module executing on the second computing device, an identifier of a user of the third computing device and the at least one term (1066). The method 1050 includes generating, by the representation generator, an SDR of the least one term (1068). The method 1050 includes receiving, by the user expertise profile module, from a fourth computing device, a second term and a request for an identification of a user who is associated with a similar term (1070). The method 1050 includes identifying, by a similarity engine, a level of semantic similarity between the SDR of the at least one term and an SDR of the second term (1072). The method 1050 includes providing, by the user expertise profile module, to the fourth computing device, the identifier of the user of the third computing device (1074).

In one embodiment, (1052)-(1062) are performed as described above in connection with FIG. 2 (202)-(214).

The method 1050 includes receiving, by a query module executing on a second computing device, from a third computing device, at least one term (1064). In one embodiment, the query module 601 receives the at least one term and executes the query as described above in connection with FIGS. 6A-C and 9A-B.

The method 1050 includes storing, by a user expertise profile module executing on the second computing device, an identifier of a user of the third computing device and the at least one term (1066). In one embodiment, the user profile module 1002 receives the identifier of the user and the at least one term from the query input processing module 607. In another embodiment, the user expertise profile module 1010 receives the identifier of the user and the at least one term from the query input processing module 607. In still another embodiment, the user expertise profile module 1010 stores the identifier of the user and the at least one term in a database. For example, the user expertise profile module 1010 stores the identifier of the user and the at least one term in the user expertise SDR database 1012 (e.g., with an SDR of the at least one term). In some embodiments, the method includes logging queries that are received from users with user identifiers and SDRs for each query term(s). In some embodiments, the user profile module 1002 also includes functionality for receiving an identification of search results that the querying user indicated were relevant or otherwise of interest to the querying user.

The method 1050 includes generating, by the representation generator, an SDR of the least one term (1068). In one embodiment, the user expertise profile module 1010 transmits the at least one data item to the fingerprinting module 302 for generation of the SDR. In another embodiment, the user expertise profile module 1010 transmits the at least one term to the representation generator 114 for generation of the SDR.

In some embodiments, the user expertise profile module 1010 receives a plurality of data items as the user continues to make queries over time. In one of these embodiments, the user expertise profile module 1010 directs the generation of a compound SDR that combines an SDR of a first query term with an SDR of a second query term; the resulting compound SDR more accurately reflects the types of queries that the user makes and the more term SDRs that can be added to the compound SDR over time, the more accurately the compound SDR will reflect an area of expertise of the user.

The method 1050 includes receiving, by the user expertise profile module, from a fourth computing device, a second term and a request for an identification of a user associated with a similar term (1070). In some embodiments, the request for the identification of the user associated with a similar data item is explicit. In other embodiments, the user expertise profile module 1010 automatically provides the identification as a service to the user of the fourth computing device. By way of example, a user of the fourth computing device performing a search for documents similar to query terms in a white paper the user is authoring may request (or be provided with an option to receive) an identification of other users who have developed an expertise in topics similar to the chosen query terms. By way of example, this functionality allows users to identify those who have developed an expertise in a particular topic, regardless of whether that expertise is part of their official title, job description, or role, making information readily available that was previously difficult to discern based only on official data or word of mouth or a personal connection. Since multiple areas of expertise (e.g., multiple SDRs based on one or more query terms) may be associated with a single user, information is available about primary as well as secondary areas of expertise; for example, although an individual may officially focus on a first area of research, the individual may perform a series of queries over the course of a week as they research a potential extension of their work into a second area of research and the expertise gained in even that limited period of time may be useful to another user. As another example, an individual seeking to build a team or structure (or restructure) an organization based on actual areas of interest may leverage the functionality of the user expertise profile module 1010 to identify users who have expertise relevant to the needs of the individual.

The method 1050 includes identifying, by a similarity engine, a level of semantic similarity between the SDR of the at least one term and an SDR of the second term (1072). In one embodiment, the similarity engine 304 executes on the second machine 102*b*. In another embodiment, the similarity engine 304 is provided by and executes within a search system 902. Having received the query term from the user seeking to identify an individual having an area of expertise, the user expertise profile module 1010 may direct the similarity engine 304 to identify other users from the user expertise SDR database 1012 that satisfy the request.

The method 1050 includes providing, by the user expertise profile module, to the fourth computing device, the identifier of the user of the third computing device (1074).

In some embodiments, a user of the methods and systems described herein may provide an identification of a preference regarding query terms. By way of example, a first user seeking to do a search on a query term may be interested in documents that relate to legal aspects of the query term—for example, uses of the query term or terms like it in court cases, patent applications, published licenses, or other legal documents—while a second user seeking to do a search on the same query term may be interested in documents that relate to scientific aspects of the query term—for example, uses of the query term or of terms like it in white papers, research publications, grant applications or other scientific documents. In some embodiments, the systems described herein provide functionality for identifying such preferences and ranking search results according to which results are closest (based on SDR analyses) to the type of document preferred by the searcher.

Referring back to FIGS. 10A and 10B, block diagrams depict embodiments of systems for semantic ranking of query results received from an enterprise search system based on user preferences. FIG. 10A depicts an embodiment in which functionality for semantic ranking is provided in conjunction with results from a conventional enterprise search system. FIG. 10B depicts an embodiment in which functionality for semantic ranking is provided in conjunction with results from a search system 902.

Figure 10D:
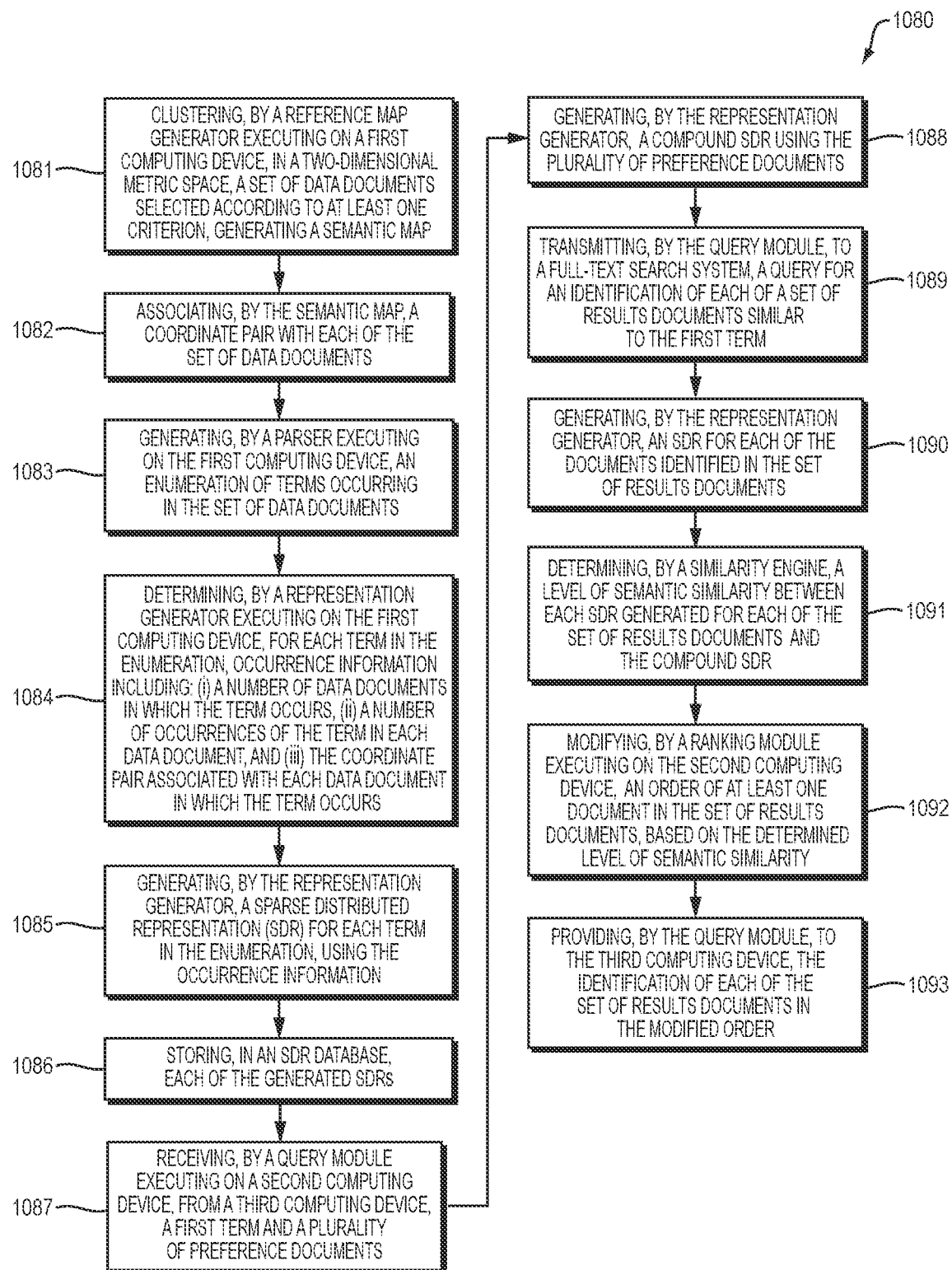
FIG. 10D is a flow diagram depicting one embodiment of a method for user profile-based semantic ranking of query results received from a full-text search system.

Referring now to FIG. 10D, a flow diagram depicts one embodiment of a method 1080 for user profile-based semantic ranking of query results received from a full-text search system. The method 1080 includes clustering in a two-dimensional metric space, by a reference map generator executing on a first computing device, a set of data documents selected according to at least one criterion, generating a semantic map (1081). The method 1080 includes associating, by the semantic map, a coordinate pair with each of the set of data documents (1082). The method 1080 includes generating, by a parser executing on the first computing device, an enumeration of terms occurring in the set of data documents (1083). The method 1080 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1084). The method 1080 includes generating, by the representation generator, a sparse distributed representation (SDR) for each term in the enumeration, using the occurrence information (1085). The method 1080 includes storing each of the generated SDRs in an SDR database (1086). The method 1080 includes receiving, by a query module executing on a second computing device, from a third computing device, a first term and a plurality of preference documents (1087). The method 1080 includes generating, by the representation generator, a compound SDR using the plurality of preference documents (1088). The method 1080 includes transmitting, by the query module, to a full-text search system, a query for an identification of each of a set of results documents similar to the first term (1089). The method 1080 includes generating, by the representation generator, an SDR for each of the documents identified in the set of results documents (1090). The method 1080 includes determining, by a similarity engine, a level of semantic similarity between each SDR generated for each of the set of results documents and the compound SDR (1091). The method 1080 includes modifying, by a ranking module executing on the second computing device, an order of at least one document in the set of results documents, based on the determined level of semantic similarity (1092). The method 1080 includes providing, by the query module, to the third computing device, the identification of each of the set of results documents in the modified order (1093).

In one embodiment (1081)-(1086) are performed as described above in connection with FIG. 2 (202)-(214).

The method 1080 includes receiving, by a query module executing on a second computing device, from a third computing device, a first term and a plurality of preference documents (1087). In one embodiment, the query input processing module 607 receives the first term as described above in connection with FIGS. 6A-B and 9A-B. In another embodiment, the query input processing module 607 provides a user interface element (not shown) allowing a user of the third computing device to provide (e.g., upload) one or more preference documents. Preference documents may be any type or form of data structure including one or more data items representative of a type of document the searching user is interested in. By way of example, a scientific researcher could provide a number of research documents that reflect the style and/or content of the type of documents the scientific researcher would consider relevant or preferable given her search objectives. As another example, a lawyer could provide a number of legal documents that reflect the style and/or content of the type of documents the lawyer would consider relevant or preferable given her search objectives. Furthermore, the system may provide functionality allowing a user to provide different sets of preference documents with different searches, allowing the user to create different preference profiles for use with different searches at different times—for example, a different preference profile may be relevant for a scientific search focused on a first topic of research than would be relevant for a scientific search focused on a second, different topic.

The method 1080 includes generating, by the representation generator, a compound SDR using the plurality of preference documents (1088). In one embodiment, the user preference module 1004 directs the generation of the compound SDR. For example, the user preference module 1004 may transmit the preference documents to the fingerprinting module 302 for generation of the compound SDR. As another example, the user preference module 1004 may transmit the preference documents to the representation generator 114 for generation of the compound SDR. The compound SDR that combines the SDRs of individual preference documents may be generated in the same way that compound SDRs of individual documents are generated from term SDRs. The user preference module 1004 may store the generated compound SDR in the user preference SDR database 1006.

The method 1080 includes transmitting, by the query module, to a full-text search system, a query for an identification of each of a set of results documents similar to the first term (1089). The query module 601 may transmit the query to an external enterprise search system as described in connection with FIGS. 6A-B. Alternatively, the query module 601 may transmit the query to a search system 902 as described above in connection with FIGS. 9A-B.

The method 1080 includes generating, by the representation generator, an SDR for each of documents identified in the set of results documents (1090). In one embodiment, the user preference module 1004 receives the set of results documents from the search system (either the search system 902 or the third-party enterprise search system). In another embodiment, the user preference module 1004 directs the similarity engine 304 to generate the SDRs for each of the received results documents.

The method 1080 includes determining, by a similarity engine, a level of semantic similarity between each SDR generated for each of the set of results documents and the compound SDR (1091). In one embodiment, the similarity engine 304 executes on the second machine 102*b*. In another embodiment, the similarity engine 304 is provided by and executes within a search system 902. In one embodiment, the user preference module 1004 directs the similarity engine 304 to identify the level of similarity. In another embodiment, the user preference module 1004 receives the level of similarity from the similarity engine 304.

The method 1080 includes modifying, by a ranking module executing on the second computing device, an order of at least one document in the set of results documents, based on the determined level of semantic similarity (1092). In one embodiment, by way of example and without limitation, the similarity engine 304 may have indicated that a result included as the fifth document in the set of results documents has a higher level of similarity to the compound SDR of the plurality of preference documents than the first four documents. The user preference module 1004 may then move the fifth document (or an identification of the fifth document) to the first position.

The method 1080 includes providing, by the query module, to the third computing device, the identification of each of the set of results documents in the modified order (1093). In one embodiment, by performing an analysis of search results as compared to preference documents, the system may personalize search results, taking into account the context of the search in order to select search results likely to be most important to the searcher. As another example, instead of returning an arbitrary number of conventionally ranked results (e.g., first ten or first page or other arbitrary number of results), the system could analyze thousands of documents and provide only those that are semantically relevant to the searcher.

In some embodiments, symptoms of a disease may occur in a patient at a very early phase and a medical professional may identify a clear medical diagnosis. However, in other embodiments, a patient may present with only a subset of symptoms and a medical diagnosis is not yet clearly identifiable; for example, a patient may provide a blood sample from which the values of ten different types of measurements are determined and only one of the measurement types has a pathological value while the other nine may be close to a threshold level but remain in a range of normal values. It may be challenging to identify a clear medical diagnosis in such a case and the patient may be subjected to further testing, additional monitoring, and delayed diagnosis while a medical professional waits to see if the remaining symptoms develop. In such an example, the inability to make an early diagnosis may result in slower treatment and potentially negative impacts on a health outcome for the patient. Some embodiments of the methods and systems described herein address such embodiments and provide functionality for supporting medical diagnoses.

As described above, the system described herein may generate and store SDRs for numerical data items as well as text-based items and identify a level of similarity between an SDR generated for a subsequently-received document and one of the stored SDRs. In some embodiments, if the received documents are associated with other data or metadata, such as a medical diagnosis, the system may provide an identification of the data or metadata (e.g., identifying a medical diagnosis associated with a document containing numerical data items) as a result of identifying the level of similarity.

Figure 11A:
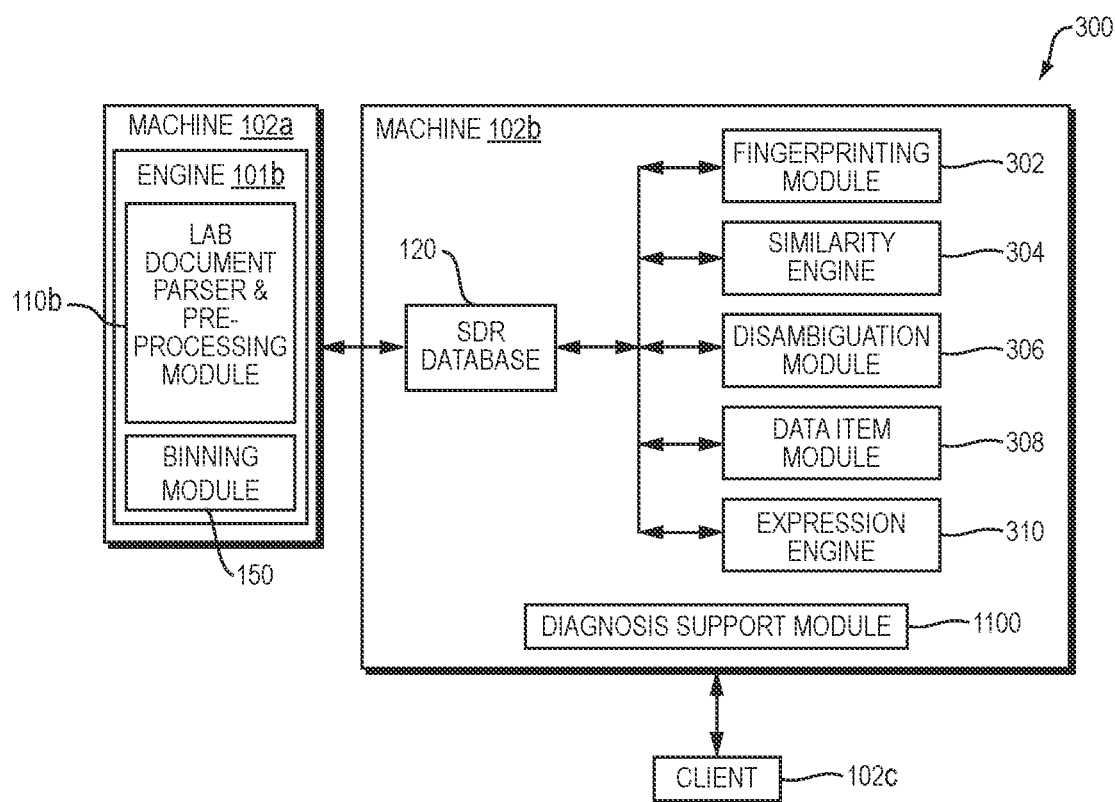
FIG. 11A is a block diagram depicting one embodiment of a system for providing medical diagnosis support.
Figure 11B:
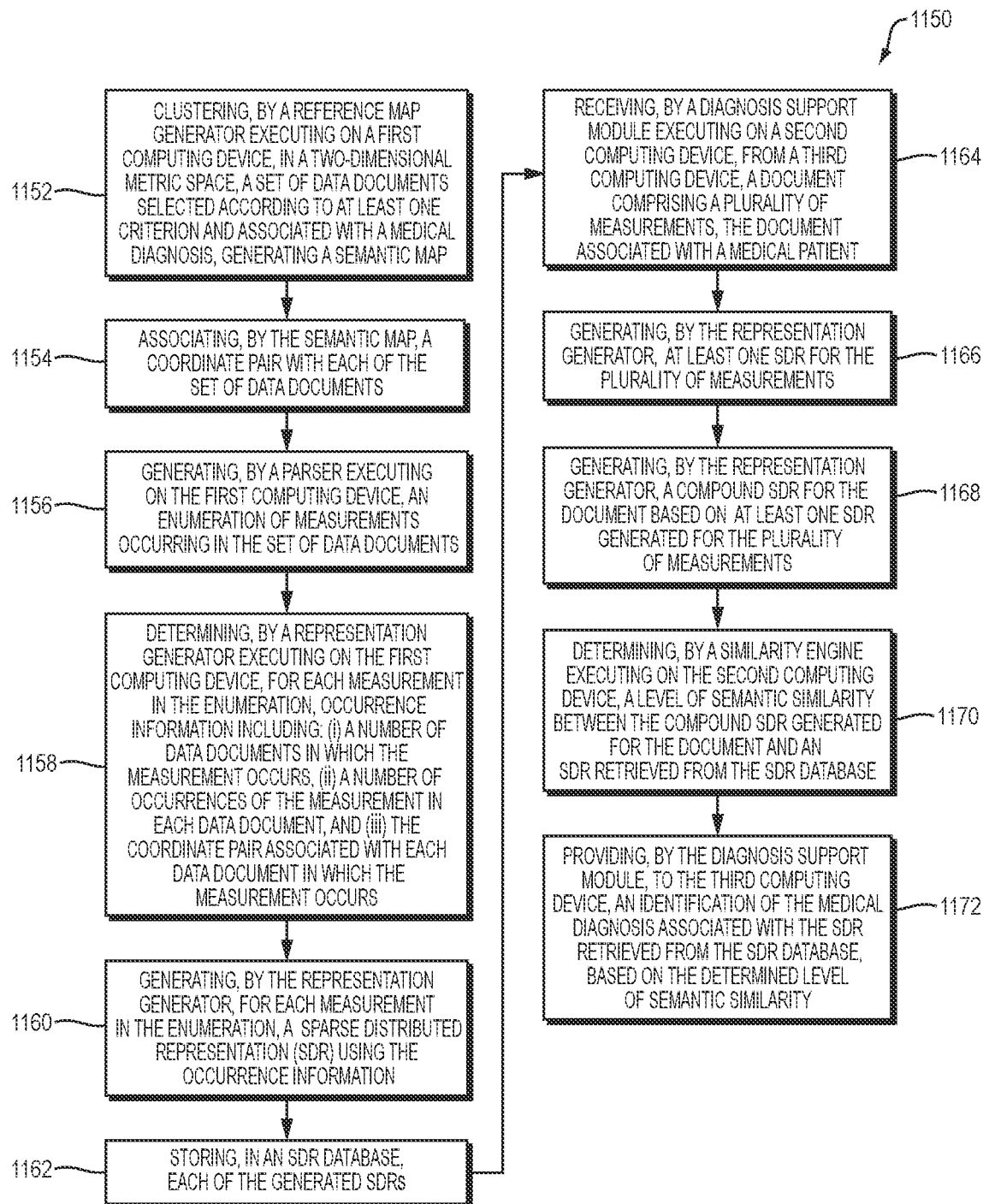
FIG. 11B is a flow diagram depicting one embodiment of a method for providing medical diagnosis support.

Referring now to FIG. 11B, in connection with FIG. 11A, a flow diagram depicts one embodiment of a method 1150 for providing medical diagnosis support. The method 1150 includes clustering in a two-dimensional metric space, by a reference map generator executing on a first computing device, a set of data documents selected according to at least one criterion and associated with a medical diagnosis, generating a semantic map (1152). The method 1150 includes associating, by the semantic map, a coordinate pair with each of the set of data documents (1154). The method 1150 includes generating, by a parser executing on the first computing device, an enumeration of measurements occurring in the set of data documents (1156). The method 1150 includes determining, by a representation generator executing on the first computing device, for each measurement in the enumeration, occurrence information including: (i) a number of data documents in which the measurement occurs, (ii) a number of occurrences of the measurement in each data document, and (iii) the coordinate pair associated with each data document in which the measurement occurs (1158). The method 1150 includes generating, by the representation generator, for each measurement in the enumeration a sparse distributed representation (SDR) using the occurrence information (1160). The method 1150 includes storing, in an SDR database, each of the generated SDRs (1162). The method 1150 includes receiving, by a diagnosis support module executing on a second computing device, from a third computing device, a document comprising a plurality of measurements, the document associated with a medical patient (1164). The method 1150 includes generating, by the representation generator, at least one SDR for the plurality of measurements (1166). The method 1150 includes generating, by the representation generator, a compound SDR for the document, based on the at least one SDR generated for the plurality of measurements (1168). The method 1150 includes determining, by a similarity engine executing on the second computing device, a level of semantic similarity between the compound SDR generated for the document and an SDR retrieved from the SDR database (1170). The method 1150 includes providing, by the diagnosis support module, to the third computing device, an identification of the medical diagnosis associated with the SDR retrieved from the SDR database, based on the determined level of semantic similarity (1172).

The method 1150 includes clustering in a two-dimensional metric space, by a reference map generator executing on a first computing device, a set of data documents selected according to at least one criterion and associated with a medical diagnosis, generating a semantic map (1152). In one embodiment, clustering occurs as described above in connection with FIG. 2. In some embodiments, each document in the set of documents includes a plurality of data items, as above. In one of these embodiments, however, the plurality of data items is a set of lab values taken at one point in time from one sample (e.g., a blood sample from a medical patient); by way of example, the plurality of data items in the document may be provided as a comma-separated list of values. As an example, the system may receive 500 documents, one for each of 500 patients, and each document may contain 5 measurements (e.g., 5 values of a type of measurement derived from a single blood sample provided by each patient) and be associated with a medical diagnosis. The system may generate the document vectors as described above in connection with FIG. 2, using the measurements as data items. In one embodiment, the system in FIG. 11A includes the functionality described in connection with FIGS. 1A-C and FIG. 3. However, the system in FIG. 11A may have a different parser no (shown as the lab document parser and pre-processing module nob), optimized for parsing documents containing lab values, and the system may include a binning module 150 for optimizing generation of an enumeration of measurements occurring in the set of data documents as will be discussed in greater detail below.

The method 1150 includes associating, by the semantic map, a coordinate pair with each of the set of data documents (1154). In one embodiment, the generation of a semantic map 108 and the distribution of document vectors onto the semantic map 108 and the association of coordinate pairs occurs as described above in connection with FIG. 2. By way of example, and without limitation, each point in the semantic map 108 may represent one or more documents containing lab values for a type of measurement, such as, without limitation, any type of measurement identified from a metabolic panel (e.g., calcium per liter). Although certain examples included herein refer to lab values derived from blood tests, one of ordinary skill in the art will understand that any type of medical data associated with a medical diagnosis may be used with the methods and systems described herein.

The method 1150 includes generating, by a parser executing on the first computing device, an enumeration of measurements occurring in the set of data documents (1156). In one embodiment, the measurements are enumerated as described above in connection with FIG. 2. In some embodiments, however, the system includes a binning module 150 that provides for an optimized process of generating the enumeration. Each document received may contain a plurality of values, each value identifying a value of a type of measurement. For example, a document may contain a value for a level of calcium in blood—the value is a number in the document and "calcium" is the type of the measurement. However, the values for each type may vary from one document to another. For example, and without limitation, in a set of 500 documents, the values for "calcium" type measurements may range from 0.0 to 5.2 mg/liter. In dealing with text-based documents, if a plurality of documents each contains a word then the word is the same in each document—for example, if two documents contain the word "quick," the text that forms that word "quick" is the same in each document. In contrast, when dealing with lab values, two documents could each contain a value for the same type of measurement (e.g., a "calcium" type measurement or a "glucose" type measurement) but have very different values (e.g., 0.1 and 5.2) each of which is a valid value for the type of measurement. In order to optimize the system, therefore, the system may identify a range of values for each type of measurement included in the set of documents and provide a user with functionality for distributing the range substantially evenly into sub-groups; such a process may be referred to as binning. Performing the binning ensures a significant amount of overlap among the measurements in a bin. By way of example, the system may indicate that there are 5000 values for a "calcium" type measurement in a set of documents, indicate that the range of values is from 0.01-5.2, and provide a user with an option to specify how to distribute the values. A user may, for example, specify that values from 0.01-0.3 should be grouped into a first sub-division (also referred to herein as a "bin"), that values from 0.3-3.1 should be grouped into a second sub-division, and that values from 3.1-5.2 should be grouped into a third sub-division. The system may then enumerate how many of the 5000 values fall into each of the three bins and that occurrence information may be used in generating SDRs for each value. The binning module 150 may provide this functionality.

The method 1150 includes determining, by a representation generator executing on the first computing device, for each measurement in the enumeration, occurrence information including: (i) a number of data documents in which the measurement occurs, (ii) a number of occurrences of the measurement in each data document, and (iii) the coordinate pair associated with each data document in which the measurement occurs (1158). In one embodiment, the occurrence information is information as described above in connection with FIG. 2.

The method 1150 includes generating, by the representation generator, for each measurement in the enumeration, a sparse distributed representation (SDR) using the occurrence information (1160). In one embodiment, the SDRs are generated as described above in connection with FIG. 2.

The method 1150 includes storing, in an SDR database, each of the generated SDRs (1162). In one embodiment, the generated SDRs are stored in the SDR database 120 as described above in connection with FIG. 2.

The method 1150 includes receiving, by a diagnosis support module executing on a second computing device, from a third computing device, a document comprising a plurality of measurements, the document associated with a medical patient (1164). In one embodiment, the diagnosis support module 1100 receives the document from a client 102C.

The method 1150 includes generating, by the representation generator, at least one SDR for the plurality of measurements (1166). In one embodiment, the diagnosis support module 1100 directs the fingerprinting module 302 to generate the SDR as described above in connection with FIGS. 1-3. In one embodiment, the diagnosis support module 1100 directs the representation generator 114 to generate the SDR as described above in connection with FIGS. 1-3.

The method 1150 includes generating, by the representation generator, a compound SDR for the document, based on the at least one SDR generated for the plurality of measurements (1168). In one embodiment, the diagnosis support module 1100 directs the fingerprinting module 302 to generate the compound SDR as described above in connection with FIGS. 1-3. In one embodiment, the diagnosis support module 1100 directs the representation generator 114 to generate the compound SDR as described above in connection with FIGS. 1-3.

The method 1150 includes determining, by a similarity engine executing on the second computing device, a level of semantic similarity between the compound SDR generated for the document and an SDR retrieved from the SDR database (1170). In one embodiment, the diagnosis support module 1100 directs the similarity engine 304 to determine the level of semantic similarity as described above in connection with FIGS. 3-5.

The method 1150 includes providing, by the diagnosis support module, to the third computing device, an identification of the medical diagnosis associated with the SDR retrieved from the SDR database, based on the determined level of semantic similarity (1172). Such a system can detect an approaching medical diagnosis, even when the individual measurements have not yet reached pathological levels. By feeding a plurality of SDRs and analyzing patterns amongst them, the system can identify changes in a patient's pattern, thus capturing even dynamic processes. For example, a pre-cancer detection system would identify small changes in certain values but by having the ability to compare the pattern to the SDRs of other patients, and analyzing time-based sequences, medical diagnoses can be identified.

In one embodiment, the diagnosis support module 1100 can direct the generation of an SDR for even an incomplete parameter vector—for example in a scenario in which the diagnosis support module 1100 receives a plurality of measurements in a document but the plurality of measurements is missing a measurement of a type relevant to a diagnosis—without degrading results. For instance, as indicated above a comparison between two SDRs can be made and a level of similarity identified, which may satisfy a threshold level of similarity even if the SDRs are not identical; so, even if the SDR generated for a document with an incomplete set of measurements is missing a point or two (e.g., a place on a semantic map 108 at which a more complete document would have had a value for a measurement), a comparison can still be made with a stored SDR. In such an embodiment, the diagnosis support module 1100 can identify the at least one parameter that is relevant to a medical diagnosis but for which a value was not received and recommend that the value be provided (e.g., recommending follow-up procedures or analyses for missing parameters).

In some embodiments, the documents received may include associations to metadata in addition to a medical diagnosis. For instance, a document may also be associated with an identification of patient gender. Such metadata may be used to provide confirmation of a level of similarity between two SDRs and an identified medical diagnosis. By way of example, the diagnosis support module 1100 may determine that two SDRs are similar and identifies a medical diagnosis associated with a document from which one of the SDRs was generated; the diagnosis support module 1100 may then apply a rule based on metadata to confirm the accuracy of the identification of the medical diagnosis. As an example, and without limitation, a rule may specify that if metadata indicates a patient is male and the identified medical diagnosis indicates there is a danger of ovarian cancer, instead of providing a user of the client 102C with the identified medical diagnosis, the diagnosis support module 1100 should instead report an error (since men do not have ovaries and cannot get ovarian cancer).

Figure 13:
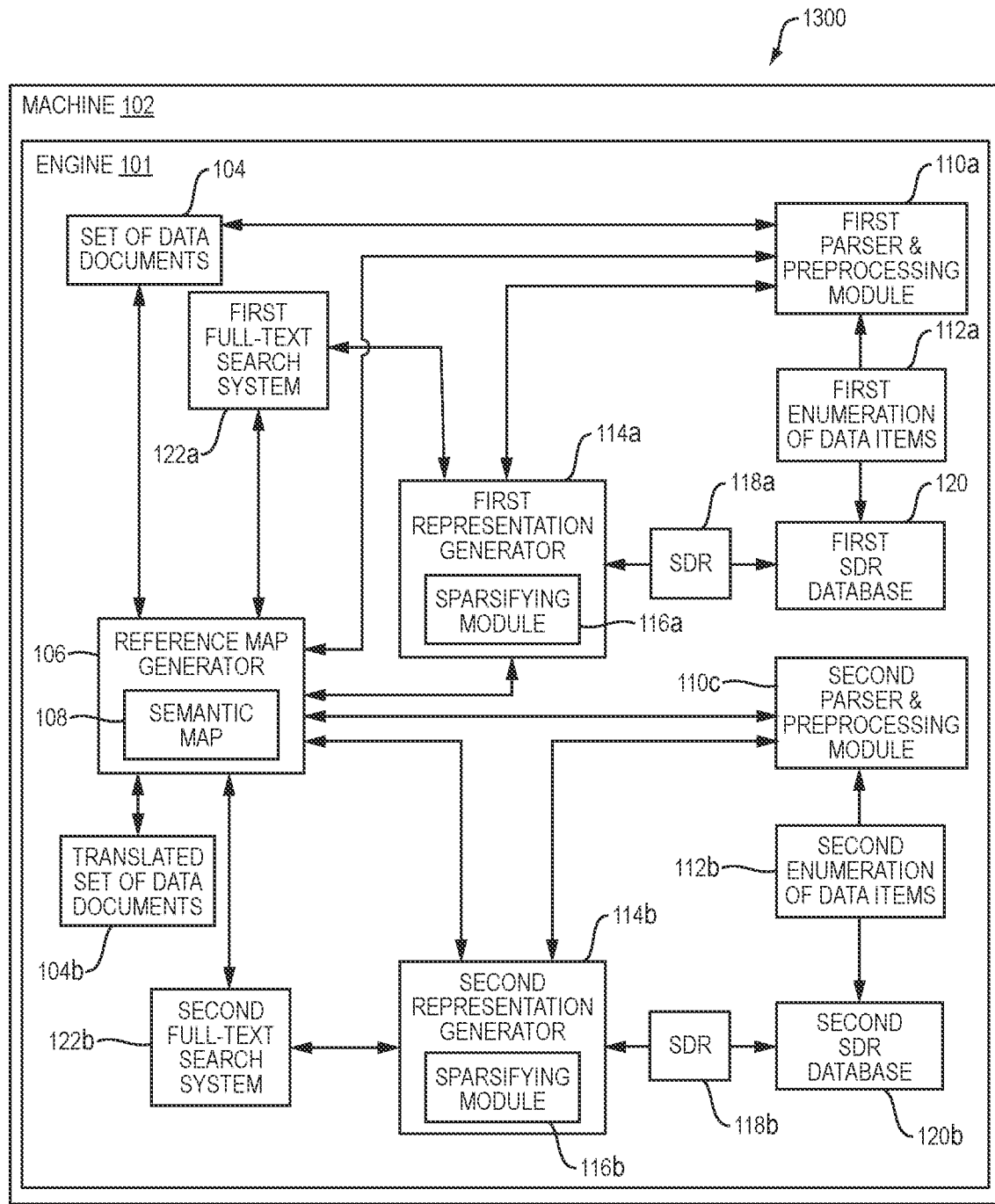
FIG. 13 is a block diagram depicting one embodiment of a system for generating cross-lingual sparse distributed representations.
Figure 14A:
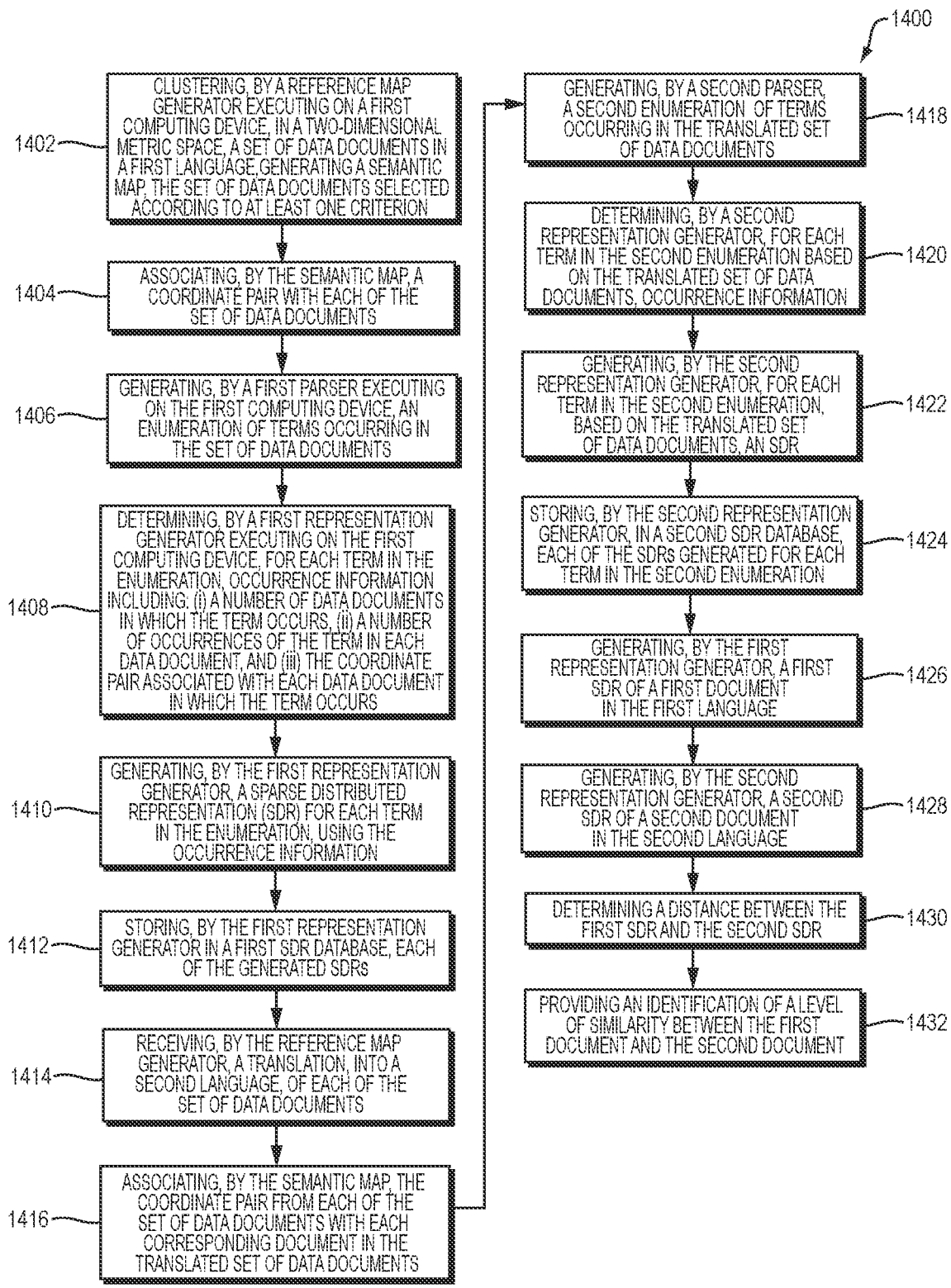
FIG. 14A is a flow diagram depicting an embodiment of a method for determining similarities between cross-lingual sparse distributed representations.
Figure 14B:
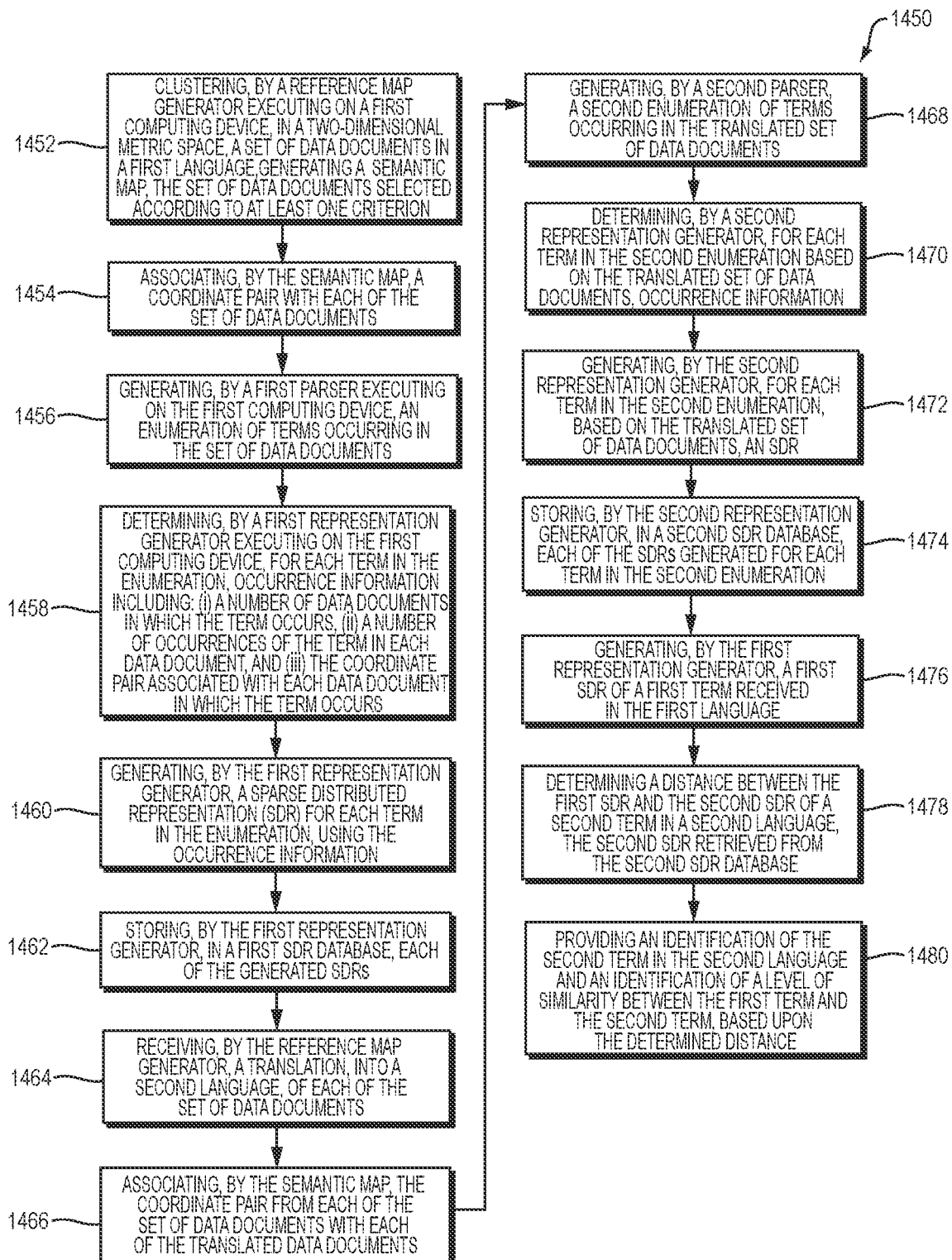
FIG. 14B is a flow diagram depicting an embodiment of a method for determining similarities between cross-lingual sparse distributed representations.

Referring ahead to FIGS. 13, 14A, and 14B, diagrams depict various embodiments of methods and systems for generation and use of cross-lingual sparse distributed representations. In some embodiments, the system 1300 may receive translations of some or all of a set of documents from a first language into a second language and the translations may be used to identify corresponding SDRs in a second SDR database generated from the corpus of translated documents. In brief overview, the system 1300 includes an engine 101, including a second representation generator 114b, a second parser and preprocessing module 110c, a translated set of data documents 104b, a second full-text search system 122b, a second enumeration of data items 112b, and a second SDR database 120b. The engine 101 may be an engine 101 as described above in connection with FIG. 1A.

In brief overview of FIG. 14A, the method 1400 includes clustering, by a reference map generator executing on a first computing device, in a two-dimensional metric space, a set of data documents in a first language, generating a semantic map, the set of data documents selected according to at least one criterion (1402). The method 1400 includes associating, by the semantic map, a coordinate pair with each of the set of data documents (1404). The method 1400 includes generating, by a first parser executing on the first computing device, an enumeration of terms occurring in the set of data documents (1406). The method 1400 includes determining, by a first representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1408). The method 1400 includes generating, by the first representation generator, a sparse distributed representation (SDR) for each term in the enumeration, using the occurrence information (1410). The method 1400 includes storing, by the first representation generator, in a first SDR database, each of the generated SDRs (1412). The method 1400 includes receiving, by the reference map generator, a translation, into a second language, of each of the set of data documents (1414). The method 1400 includes associating, by the semantic map, the coordinate pair from each of the set of data documents with each corresponding document in the translated set of data documents (1416). The method 1400 includes generating, by a second parser, a second enumeration of terms occurring in the translated set of data documents (1418). The method 1400 includes determining, by a second representation generator, for each term in the second enumeration based on the translated set of data documents, occurrence information including: (i) a number of translated data documents in which the term occurs, (ii) a number of occurrences of the term in each translated data document, and (iii) the coordinate pair associated with each translated data document in which the term occurs (1420). The method 1400 includes generating, by the second representation generator, for each term in the second enumeration, based on the translated set of data documents, an SDR (1422). The method 1400 includes storing, by the second representation generator, in a second SDR database, each of the SDRs generated for each term in the second enumeration. The method 1400 includes generating, by the first representation generator, a first SDR of a first document in the first language (1426). The method 1400 includes generating, by the second representation generator, a second SDR of a second document in the second language (1428). The method 1400 includes determining a distance between the first SDR and the second SDR (1430). The method 1400 includes providing an identification of a level of similarity between the first document and the second document (1432).

In one embodiment, (1402)-(1412) are performed as described above in connection with FIG. 2 (202-214).

The method 1400 includes receiving, by the reference map generator, a translation, into a second language, of each of the set of data documents (1414). In one embodiment, a translation process executed by the machine 102*a* provides the translation to the reference map generator 106. In another embodiment, a human translator provides the translation to the engine 101. In still another embodiment, a machine translation process provides the translation to the engine 101; the machine translation process may be provided by a third party and may provide the translation to the engine 101 directly or across a network. In yet another embodiment, a user of the system 1300 uploads the translation to the machine 102*a*.

The method 1400 includes associating, by the semantic map, the coordinate pair from each of the set of data documents with each corresponding document in the translated set of data documents (1416). In one embodiment, the semantic map 108 performs the association. In another embodiment, the association is performed as described above in connection with FIG. 2 (204).

The method 1400 includes generating, by a second parser, a second enumeration of terms occurring in the translated set of data documents (1418). In one embodiment, the generation is performed as described above in connection with FIG. 2 (206). In another embodiment, the second parser is configured (e.g., includes a configuration file) optimizing the second parser floc for parsing documents in the second language.

The method 1400 includes determining, by a second representation generator, for each term in the second enumeration based on the translated set of data documents, occurrence information including: (i) a number of translated data documents in which the term occurs, (ii) a number of occurrences of the term in each translated data document, and (iii) the coordinate pair associated with each translated data document in which the term occurs (1420). In one embodiment, the determination of occurrence information is performed as described above in connection with FIG. 2 (208).

The method 1400 includes generating, by the second representation generator, for each term in the second enumeration, based on the translated set of data documents, an SDR (1422). In one embodiment, the generation of the term SDRs is performed as described above in connection with FIG. 2 (210-214).

The method 1400 includes storing, by the second representation generator, in a second SDR database, each of the SDRs generated for each term in the second enumeration (1424). In one embodiment, the storing of the SDRs in the second database is performed as described above in connection with FIG. 1A.

The method 1400 includes generating, by the first representation generator, a first SDR of a first document in the first language (1426). In one embodiment, the generation of the first SDR is performed as described above in connection with FIG. 2.

The method 1400 includes generating, by the second representation generator, a second SDR of a second document in the second language (1428). In one embodiment, the generation of the second SDR is performed as described above in connection with FIG. 2.

The method 1400 includes determining a distance between the first SDR and the second SDR (1430). The method 1400 includes providing an identification of a level of similarity between the first document and the second document (1432). In one embodiment (1430)-(1432) are performed as described above in connection with FIGS. 3-4.

In one embodiment, the methods and systems described herein may be used to provide a measure of quality of a translation system. For example, a translation system may translate a text from a first language into a second language and both the text in the first language and the translation in the second language may be provided to the systems described herein; if the system determines that the SDR of the text in the first language is similar (e.g., exceeds a threshold level of similarity) to the SDR of the translated text (in the second language), then the translation may be said to have a high level of quality. Continuing with this example, if the SDR of the text in the first language is insufficiently similar (e.g., does not exceed a predetermined threshold level of similarity) to the SDR of the translated text (in the second language), then the translation may be said to have a low level of quality.

Referring now to FIG. 14B, and in connection with FIGS. 13 and 14A, a flow diagram depicts one embodiment of a method 1450. In brief overview of FIG. 14B, the method 1450 includes clustering, by a reference map generator executing on a first computing device, in a two-dimensional metric space, a set of data documents in a first language, generating a semantic map, the set of data documents selected according to at least one criterion (1452). The method 1450 includes associating, by the semantic map, a coordinate pair with each of the set of data documents (1454). The method 1450 includes generating, by a first parser executing on the first computing device, an enumeration of terms occurring in the set of data documents (1456). The method 1450 includes determining, by a first representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1458). The method 1450 includes generating, by the first representation generator, for each term in the enumeration, a sparse distributed representation (SDR) using the occurrence information (1460). The method 1450 includes storing, by the first representation generator, in a first SDR database, each of the generated SDRs (1462). The method 1450 includes receiving, by the reference map generator, a translation, into a second language, of each of the set of data documents (1464). The method 1450 includes associating, by the semantic map, the coordinate pair from each of the set of data documents with each of the translated data documents (1466). The method 1450 includes generating, by a second parser, a second enumeration of terms occurring in the translated set of data documents (1468). The method 1450 includes determining, by a second representation generator, for each term in the second enumeration based on the translated set of data documents, occurrence information including: (i) a number of translated data documents in which the term occurs, (ii) a number of occurrences of the term in each translated data document, and (iii) the coordinate pair associated with each translated data document in which the term occurs (1470). The method 1450 includes generating, by the second representation generator, for each term in the second enumeration, based on the translated set of data documents, an SDR (1472). The method 1450 includes storing, by the second representation generator, in a second SDR database, each of the SDRs generated for each term in the second enumeration (1474). The method 1450 includes generating, by the first representation generator, a first SDR of a first term received in the first language (1476). The method 1450 includes determining a distance between the first SDR and a second SDR of a second term in a second language, the second SDR retrieved from the second SDR database (1478). The method 1450 includes providing an identification of the second term in the second language and an identification of a level of similarity between the first term and the second term, based upon the determined distance (1480).

In one embodiment, (1452)-(1474) are performed as described above in connection with FIG. 14A (1402)-(1424).

The method 1450 includes generating, by the first representation generator, a first SDR of a first term received in the first language (1476). In one embodiment, the generation of the first SDR is performed as described above in connection with FIG. 2.

The method 1450 includes determining a distance between the first SDR and a second SDR of a second term in a second language, the second SDR retrieved from the second SDR database (1478). The method 1450 includes providing an identification of the second term in the second language and an identification of a level of similarity between the first term and the second term, based upon the determined distance (1480). In one embodiment (1478)-(1480) are performed as described above in connection with FIGS. 3-4.

In another embodiment, the methods and systems described herein may be used to provide an extension to a search system. For example, the system 1300 may receive a first term in a first language (e.g., a term a user wishes to use in a query of a search system). The system 1300 may generate an SDR of the first term and use the generated first SDR to identify a second SDR in a second SDR database that satisfies a threshold level of similarity. The system 1300 may then provide the first SDR, the second SDR, or both to a search system to enhance the user's search query, as described above in connection with FIGS. 6A-6C.

In some embodiments, the methods and systems described herein may be used to provide functionality for filtering streaming data. For example, an entity may wish to review streaming social media data to identify a sub-stream of social media data that is relevant to the entity—for example, for brand-management purposes or competitive monitoring. As another example, an entity may wish to review streams of network packets crossing a network device—for example, for security purposes.

Figure 15:
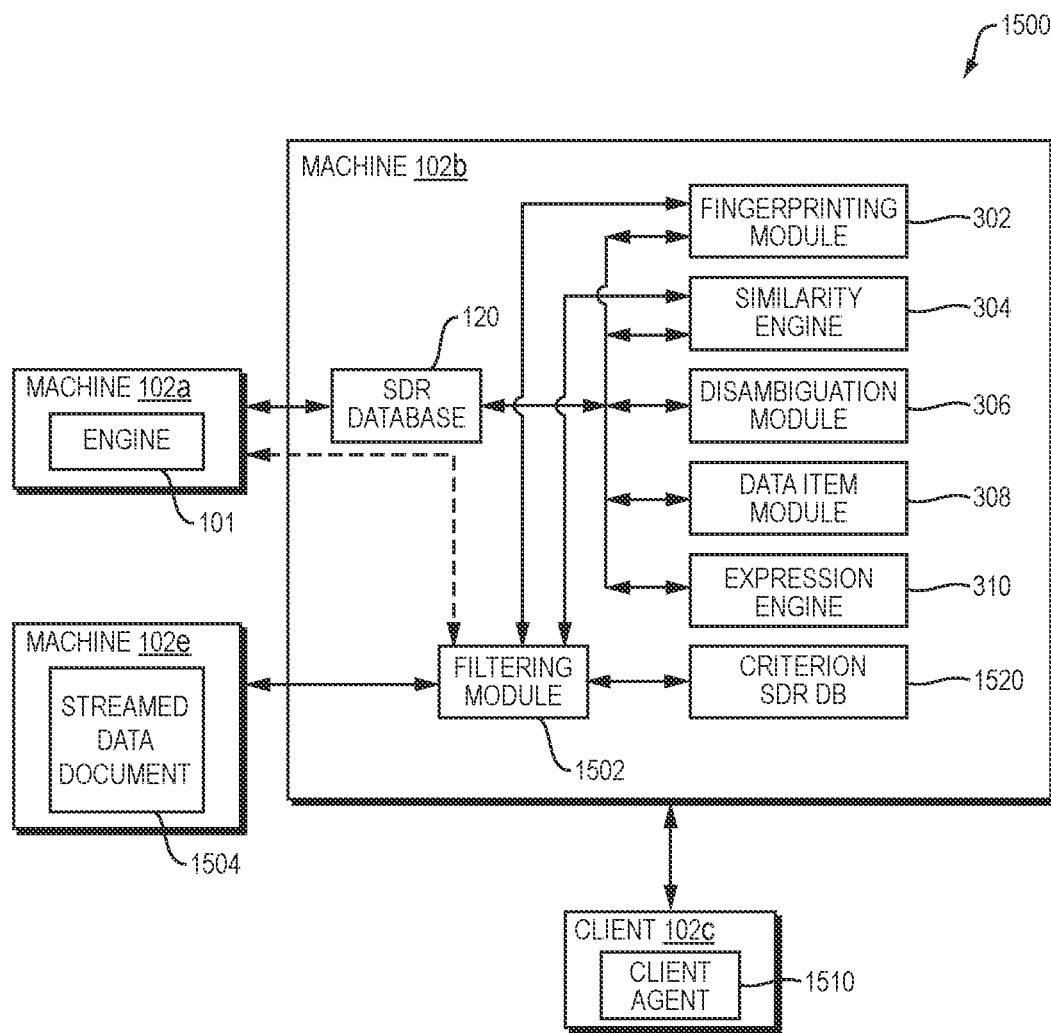
FIG. 15 is a block diagram depicting an embodiment of a system for identifying a level of similarity between a filtering criterion and a data item within a set of streamed documents.
Figure 16:
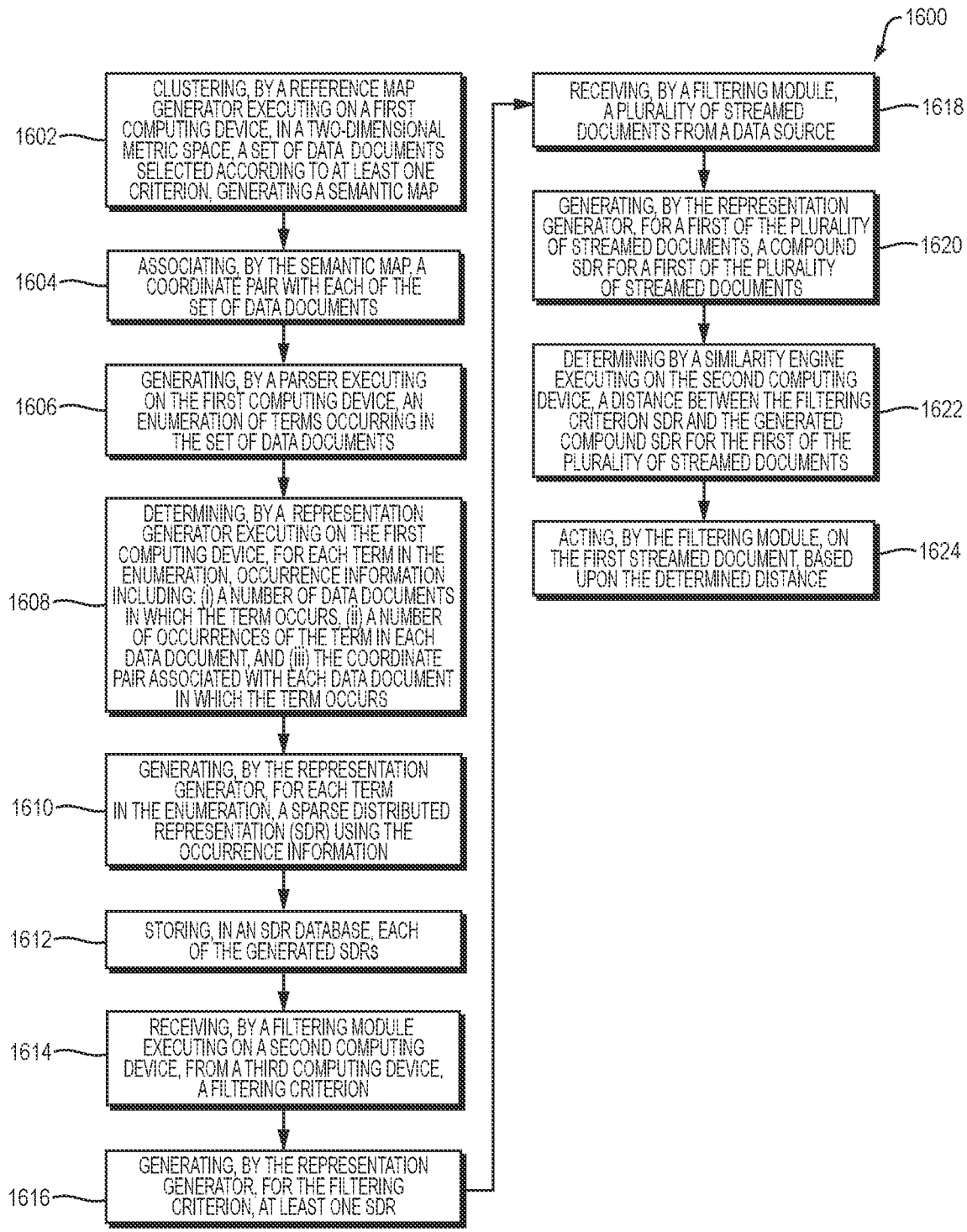
FIG. 16 is a block diagram depicting an embodiment of a system for identifying a level of similarity between a filtering criterion and a data item within a set of streamed documents.

Referring now to FIG. 16 in connection with FIG. 15, the system 1500 provides functionality for executing a method 1600 for identifying a level of similarity between a filtering criterion and a data item within a set of streamed data documents. The system 1500 includes an engine 101, a fingerprinting module 302, a similarity engine 304, a disambiguation module 306, a data item module 308, an expression engine 310, an SDR database 120, a filtering module 1502, a criterion SDR database 1520, a streamed data document 1504, and a client agent 1510. The engine 101, the fingerprinting module 302, the similarity engine 304, the disambiguation module 306, the data item module 308, the expression engine 310, and the SDR database 120 may be provided as described above in connection with FIGS. 1A-14.

The method 1600 includes clustering, by a reference map generator executing on a first computing device, in a two-dimensional metric space, a set of data documents selected according to at least one criterion, generating a semantic map (1602). The method 1600 includes associating, by the semantic map, a coordinate pair with each of the set of data documents (1604). The method 1600 generating, by a parser executing on the first computing device, an enumeration of terms occurring in the set of data documents (1606). The method 1600 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1608). The method 1600 includes generating, by the representation generator, for each term in the enumeration, a sparse distributed representation (SDR) using the occurrence information (1610). The method 1600 includes storing, in an SDR database, each of the generated SDRs (1612). The method 1600 includes receiving, by a filtering module executing on a second computing device, from a third computing device, a filtering criterion (1614). The method 1600 includes generating, by the representation generator, for the filtering criterion, at least one SDR (1616). The method 1600 includes receiving, by the filtering module, a plurality of streamed documents from a data source (1618). The method 1600 includes generating, by the representation generator, for a first of the plurality of streamed documents, a compound SDR for a first of the plurality of streamed documents (1620). The method 1600 includes determining, by a similarity engine executing on the second computing device, a distance between the filtering criterion SDR and the generated compound SDR for the first of the plurality of streamed documents (1622). The method 1600 includes acting, by the filtering module, on the first streamed document, based upon the determined distance (1624).

In one embodiment, (1602)-(1612) are performed as described above in connection with FIG. 2 (202)-(214).

The method 1600 includes receiving, by a filtering module executing on a second computing device, from a third computing device, a filtering criterion (1614). The filtering criterion may be any term that allows the filtering module 1502 to narrow down a plurality of streamed documents. By way of example, and as indicated above, an entity may wish to review streaming social media data to identify a sub-stream of social media data that is relevant to the entity—for example, for brand-management purposes or competitive monitoring. As another example, an entity may wish to review streams of network packets crossing a network device—for example, for security purposes. In one embodiment, therefore, the filtering module 1502 receives at least one brand-related term; for example, the filtering module 1502 may receive a name, such as a company, product, or individual name (related to an entity associated with the third machine or unassociated with the third machine, such as a competitor). In another embodiment, the filtering module 1502 receives a security-related term; for example, the filtering module 1502 may receive terms related to computer security exploitations (e.g., terms associated with hacking, malware, or other exploitation of security vulnerabilities) or terms related to physical security exploitations (e.g., terms associated with acts of violence or terrorism). In still another embodiment, the filtering module 1502 receives at least one virus signature (e.g., a computer virus signature, as will be understood by those of ordinary skill in the art).

In some embodiments, the filtering module 1502 receives at least one SDR. For example, a user of the machine 102C may already have interacted with the system 1500 for independent purposes and developed one or more SDRs that can now be used in connection with filtering streaming data.

In some embodiments, the filtering module 1502 communicates with a query expansion module 603 (e.g., as described above in connection with FIGS. 6A-C) to identify additional filtering criteria. For example, the filtering module 1502 may transmit, to a query expansion module 603 (executing on the machine 102b or on a separate machine 102g, not shown), the filtering criterion; the query expansion module 603 may direct the similarity engine 304 to identify a level of semantic similarity between a first SDR of the filtering criterion and a second SDR of a second term retrieved from the SDR database 120. In such an example, the query expansion module 603 may direct the similarity engine 304 to repeat the identification process for each term in the SDR database 120 and return any terms having a level of semantic similarity above a threshold; the query expansion module 603 may provide to the filtering module 1502 the resulting terms identified by the similarity engine 304. The filtering module 1502 may then use the resulting terms in filtering a streaming set of documents.

The method 1600 includes generating, by the representation generator, for the filtering criterion, at least one SDR (1616). In one embodiment, the filtering module 1502 provides the filtering criterion to the engine 101 for generation, by the representation generator 114, of the at least one SDR. In another embodiment, the filtering module 1502 provides the filtering criterion to the fingerprinting module 302. The filtering module 1502 may store the at least one SDR in a criterion SDR database 1520.

In some embodiments, the step of generating the at least one SDR is optional. In one embodiment, the representation generator 114 (or fingerprinting module 302) determines whether the received filtering criterion is, or includes, an SDR, and determines whether or not to generate the SDR based upon that determination. For example, the representation generator 114 (or fingerprinting module 302) may determine that the filtering criterion received by the filtering module 1502 is an SDR and therefore determine not to generate any other SDRs. Alternatively, the representation generator 114 (or fingerprinting module 302) may determine that an SDR for the filtering criterion already exists in the SDR database 120 or in the criterion SDR database 1520. As another example, however, the representation generator 114 (or fingerprinting module 302) determines that the filtering criterion is not an SDR and generates the SDR based upon that determination.

The method 1600 includes receiving, by the filtering module, a plurality of streamed documents from a data source (1618). In one embodiment, the filtering module 1502 receives a plurality of social media text documents, e.g., documents of any length or type generated within computer-mediated tools that allow users to create, share, or exchange any type of data (audio, video, and/or text based). Examples of such social media include, without limitation, blogs; wikis; consumer review sites such as YELP provided by Yelp, Inc., of San Francisco, Calif.; micro-blogging sites such as TWITTER, provided by Twitter, Inc. of San Francisco, Calif.; and combination micro-blogging and social networking sites such as FACEBOOK, provided by Facebook, Inc. of Menlo Park, Calif., or GOOGLE+, provided by Google, Inc. of Mountain View, Calif. In another embodiment, the filtering module 1502 receives a plurality of network traffic documents. For example, the filtering module 1502 may receive a plurality of network packets, each of which may be referred to as a document.

In one embodiment, the filtering module 1502 receives an identification of the data source with the filtering criterion from the third computing device. In another embodiment, the filtering module 1502 leverages an application programming interface provided by the data source to begin receiving the plurality of streamed documents. In still another embodiment, the filtering module receives the plurality of streamed documents from the third machine 102C. By way of example, the data source may be a third-party data source and the filtering module 1502 is programmed to contact the third-party data source to begin receiving the plurality of streamed documents—for example, where the third party provides a social media platform and streaming documents regenerated on the platform and available for download. As another example, the data source may be provided by the third machine 102C and the filtering module 1502 can retrieve the streaming documents directly from the third machine 102C—for example, where the machine 102C is a router receiving network packets from other machines on a network 104 (not shown). As will be discussed in further detail below, the filtering module may receive more than one plurality of streamed documents from one or more data sources and compare them to each other, to the criterion SDR, or to SDRs retrieved from the SDR database 120.

The method 1600 includes generating, by the representation generator, for a first of the plurality of streamed documents, a compound SDR for a first of the plurality of streamed documents (1620). The filtering module 1502 may provide the first of the plurality of streamed documents to the representation generator 114 directly. Alternatively, the filtering module 1502 may provide the first of the plurality of streamed documents to the fingerprinting module 302. The compound SDR may be generated as described above in connection with FIG. 2. In some embodiments, the representation generator 114 (or the fingerprinting module 302) generates the compound SDR for the first of the plurality of streamed documents, before receiving a second of the plurality of streamed documents.

The method 1600 includes determining, by a similarity engine executing on the second computing device, a distance between the filtering criterion SDR and the generated compound SDR for the first of the plurality of streamed documents (1622). The filtering module 1502 may provide the filtering criterion SDR and the generated compound SDR to the similarity engine 304. Alternatively, the filtering module 1502 may provide an identification of the criterion SDR database 1520 to the similarity engine 304, from which the similarity engine 304 may retrieve the filtering criterion SDR directly.

The method 1600 includes acting, by the filtering module, on the first streamed document, based upon the determined distance (1624). In one embodiment, the filtering module 1502 forwards the streamed document to the third computing device 102C. In another embodiment, the filtering module 1502 determines not to forward the streamed document to the third computing device 102C. In still another embodiment, the filtering module 1502 determines whether to transmit an alert to the third computing device, based upon the determined distance. In yet another embodiment, the filtering module 1502 determines whether to transmit an alert to the third computing device, based upon the determined distance and the filtering criterion. For example, if the streamed document and the filtering criterion have a level of similarity based on the determined distance that exceeds a predetermined threshold, the filtering module 1502 may determine that the streamed document includes malicious content (e.g., has an SDR substantially similar to an SDR for a virus signature); the filtering module 1502 may access a policy, rule, or other instruction set to determine that in such an instance, an alert should be sent to one or more users or machines (e.g., paging a network administrator).

In one embodiment, the filtering module 1502 forwards the first of the plurality of streamed documents to a client agent 1510 executing on the third machine 102C. The client agent 1510 may execute on a router. The client agent 1510 may execute on a network device of any kind. The client agent 1510 may execute on a web server. The client agent 1510 may execute on any form or type of machine described herein.

In one embodiment, the filtering module 1502 adds the first of the plurality of streamed documents to a sub-stream of streamed documents. In another embodiment, the filtering module 1502 stores the sub-stream in a database (not shown) accessible by the client agent 1510 (e.g., by polling the database or subscribing for update notifications or other mechanism known to those of ordinary skill in the art, and then downloading all or part of the sub-stream). In still another embodiment, the filtering module 1502 responds to a polling request received from the client agent 1510 by transmitting the sub-stream to the client agent 1510.

In some embodiments, the filtering module 1502 receives a second plurality of streamed documents from a second data source. The filtering module 1502 directs the generation of a compound SDR for a first of the second plurality of streamed documents (e.g., as discussed above in connection with the generation of the compound SDR for the first of the first plurality of streamed documents). The similarity engine 304 determines a distance between the generated compound SDR for the first of the second plurality of streamed documents and the generated compound SDR for the first of the first plurality of streamed documents. The filtering module 1502 determines whether to forward, to the third computing device, the first of the second plurality of streamed documents, based upon the determined distance. In one embodiment, the filtering module 1502 may determine whether to forward the first of the second plurality of streamed documents based on determining that the compared SDRs fall beneath a predetermined similarity threshold—for example, the filtering module 1502 may decide to forward the first of the second plurality of streamed documents if it is sufficiently distinct from the first of the first plurality of streamed documents (e.g., falls beneath the predetermined similarity threshold) while deciding to discard the first of the second plurality of streamed documents if it is too similar to the first of the first plurality of streamed documents (e.g., due to exceeding the predetermined similarity threshold, the first of the second plurality of streamed document may be considered to be cumulative, duplicative, or otherwise too similar to the first of the first plurality of streamed documents). In this way, the filtering module 1502 may determine that documents from different data sources (e.g., posted on different social media sites, or posted from different accounts on a single social media site, or included in different network packets) are similar enough that making just one document available provides an improved sub-stream over a sub-stream with duplicative information.

In some embodiments, steps (1606-1610) are customized for addressing data documents that include virus signatures. In one of these embodiments, the parser generates an enumeration of virus signatures occurring in the set of data documents. In another of these embodiments, the representation generator determines, for each virus signature in the enumeration, occurrence information including: (i) a number of data documents in which the virus signature occurs, (ii) a number of occurrences of the virus signature in each data document, and (iii) the coordinate pair associated with each data document in which the virus signature occurs. In still another of these embodiments, the representation generator generates, for each virus signature in the enumeration, an SDR, which may be a compound SDR. In another embodiment, the system decomposes each virus signature in the enumeration into a plurality of sub-units (e.g., a phrase, sentence, or other portion of the virus signature document), based upon a protocol (e.g., a network protocol). In still another embodiment, the system decomposes each sub-unit in the enumeration into at least one value (e.g., a word). In still another embodiment, the system determines, for each value of each of the plurality of sub-units of the virus signature in the enumeration, occurrence information including: (i) a number of data documents in which the value occurs, (ii) a number of occurrences of the value in each data document, and (iii) the coordinate pair associated with each data document in which the value occurs; the system generates, for each value in the enumeration, an SDR using the value's occurrence information. In yet another embodiment, the system generates, for each sub-unit in the enumeration a compound SDR using the value SDR(s). In a further embodiment, the system generates a compound SDR for each virus signature in the SDR based on generated sub-unit SDRs. The virus signature SDRs, sub-unit SDRs, and value SDRs may be stored in the SDR database 120.

The method 1600 includes generating, by a parser executing on the first computing device, an enumeration of terms occurring in the set of data documents (1606). The method 1600 includes determining, by a representation generator executing on the first computing device, for each term in the enumeration, occurrence information including: (i) a number of data documents in which the term occurs, (ii) a number of occurrences of the term in each data document, and (iii) the coordinate pair associated with each data document in which the term occurs (1608). The method 1600 includes generating, by the representation generator, for each term in the enumeration, a sparse distributed representation (SDR) using the occurrence information (1610).

In some embodiments, the client agent 1510 includes the functionality of the filtering module 1502, calling the fingerprinting module 302 for generation of SDRs and interacting with the similarity engine 304 to receive the identification of the level of similarity between an SDR of a streamed document and a criterion SDR; the client agent 1510 may make the determination regarding whether to store or discard the streamed document based on the level of similarity.

In some embodiments, the components described herein may execute one or more functions automatically, that is, without human intervention. For example, the system 100 may receive a set of data documents 104 and automatically proceed to execute any one or more of the methods for preprocessing the data documents, training the reference map generator 106, or generating SDRs 118 for each data item in the set of data documents 104 without human intervention. As another example, the system 300 may receive at least one data item and automatically proceed to execute any one or more of the methods for identifying levels of similarity between the received data item and data items in the SDR database 120, generating enumerations of similar data items, or performing other functions as described above. As a further example, the system 300 may be part of, or include components that are part of, the so-called "Internet of Things" in which autonomous entities execute, communicate, and provide functionality such as that described herein; for instance, an automated autonomous process may generate queries, receive responses from the system 300, and provide responses to other users (human, computer, or otherwise). In some instances, speech-to-text or text-to-speech based interfaces are included so that, by way of example and without limitation, users may generate voice commands that the interfaces recognize and with which the interfaces generate computer-processable instructions.

As described above in connection with FIG. 5, the similarity engine 304 may receive a first data item from a user, determine a distance between a first SDR of the first data item and a second SDR of a second data item retrieved from the SDR database, and provide an identification of the second data item and an identification of a level of semantic similarity between the first data item and the second data item, based on the determined distance. In some embodiments, the first data item is a description of a profile. By way of example, the profile may be a profile for an ideal job candidate. As another example, the profile may be a profile of an individual the user would be interested in meeting (e.g., for networking purposes, dating purposes, or other relationship-building purposes). In some embodiments, the profile is a free-text description of one or more characteristics of an ideal individual and the similarity engine 304 searches the SDR database 120 for one or more profiles of individuals where the SDR generated from the individuals' profiles overlaps with (e.g., has minimal distance from) the SDR of the ideal candidate profile provided. In some embodiments, the profile is a profile of a product (e.g., a good or service) that the user is interested in learning more about or acquiring. By way of example, the user may provide a text-based description of a needed or desired product attribute; in contrast to systems that recommend products based on the user's previous purchasing history or other user-based attribute, the methods and systems described herein may search an SDR database 120 including SDRs generated from product descriptions and provide results where the descriptions of the products themselves (not the users or the users' habits) are semantically similar to the desired need or functionality.

In some embodiments, the methods and systems described herein provide functionality for retrieving and generating an SDR of a web page (e.g., a document stored on a computer and made available for retrieval by other computers over one or more computer networks, in accordance with any number of computer networking protocols) and populating the SDR database 120 with SDRs of web pages. In one of these embodiments, the set of data documents is therefore a plurality of web pages retrieved by the system (e.g., by a web crawler in communication with the system) or by a user of the system. In another of these embodiments, the similarity engine 304 receives a data item including a description of a web search a user wishes to execute and performs functionality as described above in connection with FIG. 5; the similarity engine 304 may receive the data item directly from the user (e.g., via a query module provided by the system, including as described above and in connection with FIGS. 6A, 9A-B, and 10A-B) or from a third party system that forwards the user input to the similarity engine 304).

In some embodiments, the methods and systems described herein may benefit from training on a particular document corpus in order to provide more accurate search results. By way of example, the system may be customized to provide improved results when providing fraud detection functionality in a particular topic or area of specialty or industrial knowledge. As another example, the system may be customized to provide improved results when providing forensic analysis. In such an embodiment, a user may not have a specific description of a feature or attribute they are searching for (unlike for example, a user seeking a job candidate with particular skills or a user seeking to purchase a product with particular functionality); however, the user may have one or more documents that are exemplars of the kind of documents she wishes to find; those documents may be used as described above in connection with FIG. 5. For example, the user may have examples of electronic mail messages that triggered financial reporting requirements or ethics violations; even if the specific words used in the electronic mail (or even the nature of the document or communication) vary from one scenario to the other, leveraging the semantic fingerprints allows users to find semantically similar documents.

In some embodiments, the similarity engine 304 determines a distance between an SDR generated based on a user-provided data item and a previously generated SDR retrieved from the SDR database 120 (as described above in connection with FIG. 5) and determines that the distance exceeds a predetermined threshold. In one of these embodiments, the similarity engine 304 determines that such an SDR is an outlier, which may merit additional analysis. For example, when a business document contains information that is substantially different from information contained in other business documents of that type, it may signal to an analyzer (human or computer or both working together) that the outlier document should undergo additional analysis. Continuing with this example, if a plurality of documents is being analyzed to attempt to identify instances of insider trading, the document authors may have used coded words that are not conventionally used in business documents in their industry; regardless of the particular words used, such documents would result in generation of SDRs that are different enough from conventional documents as to be flagged for additional analysis. In some embodiments, such additional analysis is done by the systems described herein or by a human analyzer; for example, investigators can link a date of generation of the document to a timeline to determine whether there are other anomalous characteristics of the document. Use of the systems and methods described herein in such an example benefits the investigator by narrowing down a group of documents that may merit additional analysis.

In some embodiments, the methods and systems described herein may interface with other third party artificial intelligence algorithms in order to provide additional functionality. For example, in providing anomaly detection functionality, an artificial intelligence system may be trained to predict a data item that will follow a data item (e.g., as a result of identifying a pattern in a sequence of data items). Continuing with that example, when the artificial intelligence system is provided a plurality of SDRs generated as described above, the artificial intelligence system may identify a pattern in the SDRs and determine what should come next in the pattern; if the SDR that comes next breaks the pattern, the system may identify an anomaly. Anomalies may include new topics in a stream of data; for example, in a stream of data items relating to news, an anomaly may indicate breaking news on a different topic.

In some embodiments, the systems and methods described herein may be used to replace a language model in providing functionality to support machine translation (including speech-to-text translations, optical character recognition, as well as other uses of machine translation). Conventional systems use a language model that can compute the probability that a piece of language (word, sentence, etc.) will be in relation with another piece of language—for example that one word will follow another in a sentence. In one embodiment, the similarity engine 304 may be leveraged to replace the language model. The similarity engine 304 may receive a data item (e.g., a word or phrase in a sentence or a sentence in a paragraph), generate an SDR for the data item and identify an SDR of a word, phrase, or data item that is typically found in association with the received data item. The similarity engine 304 may also receive the document or portion of the document that includes the received word and generate a compound SDR for comparison with compound SDRs of other documents to identify similar documents and then determine which data items typically follow the received data item. In such embodiments, the system may also leverage the topic slicing functionality described above.

In some embodiments, the data item is a managed document (e.g., a document in a system in which at least one item of metadata is associated with the document and the SDR of the document may become metadata associated with the document as well). In one of these embodiments, the managed document is a document that is being edited and for which an SDR is generated and updated throughout the time a user is writing or editing the document. In another of these embodiments, the systems and methods described herein provide functionality for giving the user feedback while the document is still being written, updated, or otherwise edited. By way of example, the data item may be the managed document at a first point in time and an initial SDR may be generated for the managed document at the first point in time; at a subsequent point in time (e.g., a point predetermined by the user or an administrator, or at a point when the user requests an update, or at a point when the system is programmed to ask if the user wishes to have an update generated), the system may generate an updated SDR. At the time of generating an updated SDR, the similarity engine 304 may compare the SDR with an SDR generated from previously generated managed documents (the SDR retrieved, for example, from the SDR database 120). Based on the comparison, the system may provide feedback to the user generating or modifying the managed document; for example, the system may identify a type of the managed document and ask the user whether the user would like access to other previously generated documents of a similar type (for example, other letters, other contracts, other documents containing similar key words, or other documents containing similar sections) and then provide access to the requested documents. The system may further provide other guidance to the user (e.g., providing reminders that other managed documents whose SDRs are substantially similar to an SDR of the managed document being generated or modified typically include certain sections or text or attachments).

In some embodiments, the methods and systems described herein provide functionality for routing documents. In one of these embodiments, the similarity engine 304 receives an SDR of a document to be routed to one of a plurality of users (e.g., an email to be sent to a particular individual in a plurality of email recipients or a document to be reviewed by one of a plurality of users) and compares the received SDR to SDRs retrieved from the SDR database 120. In one embodiment, the SDR database 120 is populated with SDRs of profiles of users in the system. For example, a user profile associated with a user that reviews tax documents may have a different SDR from a user profile associated with a user that reviews financial documentation; by comparing the SDR of the incoming document with SDRs of profiled users, the similarity engine 304 will be able to identify an SDR of a profile of a user having substantial similarity with an SDR of the incoming document and the system can then determine to provide the incoming document to the user identified in the profile. In some embodiments, the SDR database 120 is populated with SDRs of previously routed documents and the system may determine where the other documents were routed; e.g., based on analyzing metadata of the documents having similar SDRs to the received SDR, the system may determine that the document to be routed should go to a contract attorney or a corporate accountant or to an individual responsible for reviewing work by interns.

Semantic Sentiment Analysis

In some embodiments, the methods and systems described herein provide functionality for performing sentiment analysis. In one of these embodiments, a sequence of a plurality of data items under analysis impacts the results of the analysis; to determine a sentiment intended by a sentence containing a plurality of data items, the order in which the data items appear makes a difference (e.g., man bites dog vs dog bites man). In certain embodiments described above, the system would generate the same SDR regardless of the word order of the sentence. Therefore, to improve the functionality provided when determining whether an SDR of a data item (or groups of data items) is substantially similar to SDRs of data items (or groups of data items) conveying one or more sentiments, the methods and systems described herein may include functionality for interfacing with artificial intelligence systems that provide sequence learning functionality. As will be understood by those of ordinary skill in the art, a sequence learner is exposed to a sequence of patterns and is capable of predicting what the next pattern will be and of providing a representation of words (or data items generally) in a particular sequence. The sequence learner functionality may include or be in communication with a hierarchical temporal memory, which identifies a sequence as a related group of data items (e.g., a sentence) and generates an output SDR that stands for the sentence in that particular order—if the order of the words in the sentence were to be modified, the hierarchical temporal memory would generate a second, different output SDR for the sentence with words in the modified order. Therefore, the similarity engine 304 may receive, from an artificial intelligence system, an output SDR reflecting an order of data items in a plurality of data items and compare such an output SDR with other output SDRs. Furthermore, the artificial intelligence system may have been trained on data that is associated with particular sentiments (e.g., positive, negative, neutral, angry, anxious, etc.) resulting in a classifier for use in sentiment analysis.

In some embodiments, the data item includes the content of an advertisement. By way of example, an advertisement company may seek to identify advertisement placement opportunities for an advertisement (e.g., an ad being placed on behalf of a customer) and may use the systems and methods described herein to improve the placement of the advertisement. As another, more specific, example, the systems and methods described herein may improve the placement of an advertisement by comparing an SDR of an Internet user's shopping context (e.g., the contents of the Internet user's shopping-related cookies, which may include an identification of items the user recently searched for or acquired) with SDRs previously generated from advertisement in a catalog of advertisements available for placement (e.g., for which SDRs were previously generated and stored in an SDR database 120). In one of these embodiments, the similarity engine 304 may receive the SDR of the shopping context (which is the received data item in this embodiment) and compare the SDR with the SDRs in the SDR database 120 to determine which advertisements in the catalog of advertisements would be relevant to the user's shopping context; the system may then recommend placement of the identified advertisement in a location (e.g., web site) where the user having the shopping context will view the advertisement. In contrast with conventional systems which are typically only able to match keyword to keyword, the use of the similarity engine would enable a rapid identification of related topics even though the keywords are different. In some embodiments, the methods and systems described herein are able to provide an identification of data items having substantially similar SDRs to the SDR of the shopping context and do so quickly enough to satisfy the constraints of doing so in an Internet advertising environment where, for example, the advertisements are to be identified and placed in milliseconds in order to prevent the delivery from exceeding acceptable time limits (e.g., milliseconds).

In some embodiments, and unlike conventional systems, the systems and methods described herein bring a semantic context into an individual representation; for example, even without knowing how a particular SDR was generated, the system can still compare the SDR with another SDR and use a semantic context of the two SDRs to provide insights to a user. In other embodiments, and unlike conventional systems, which historically focus on document-level clustering, the systems and methods described herein use document-level context to provide semantic insights at the term level, enabling users to identify semantic meaning of individual terms within a corpus of documents.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

Although referred to herein as engines, generators, modules, or components, the elements described herein may each be provided as software, hardware, or a combination of the two, and may execute on one or more machines 100. Although certain components described herein are depicted as separate entities, for ease of discussion, it should be understood that this does not restrict the architecture to a particular implementation. For instance, the functionality of some or all of the described components may be encompassed by a single circuit or software function; as another example, the functionality of one or more components may be distributed across multiple components.

A machine 102 providing the functionality described herein may be any type of workstation, desktop computer, laptop or notebook computer, server, portable computer, mobile telephone, mobile smartphone, or other portable telecommunication device, media playing device, gaming system, mobile computing device, or any other type and/or form of computing, telecommunications or media device that is capable of communicating on any type and form of network and that has sufficient processor power and memory capacity to perform the operations described herein. A machine 102 may execute, operate or otherwise provide an application, which can be any type and/or form of software, program, or executable instructions, including, without limitation, any type and/or form of web browser, web-based client, client-server application, an ActiveX control, a JAVA applet, or any other type and/or form of executable instructions capable of executing on machine 102.

Machines 100 may communicate with each other via a network, which may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network may comprise a wireless link, such as an infrared channel or satellite band. The topology of the network may be a bus, star, or ring network topology. The network may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE.

The machine 102 may include a network interface to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, BLUETOOTH ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Figure 12A:
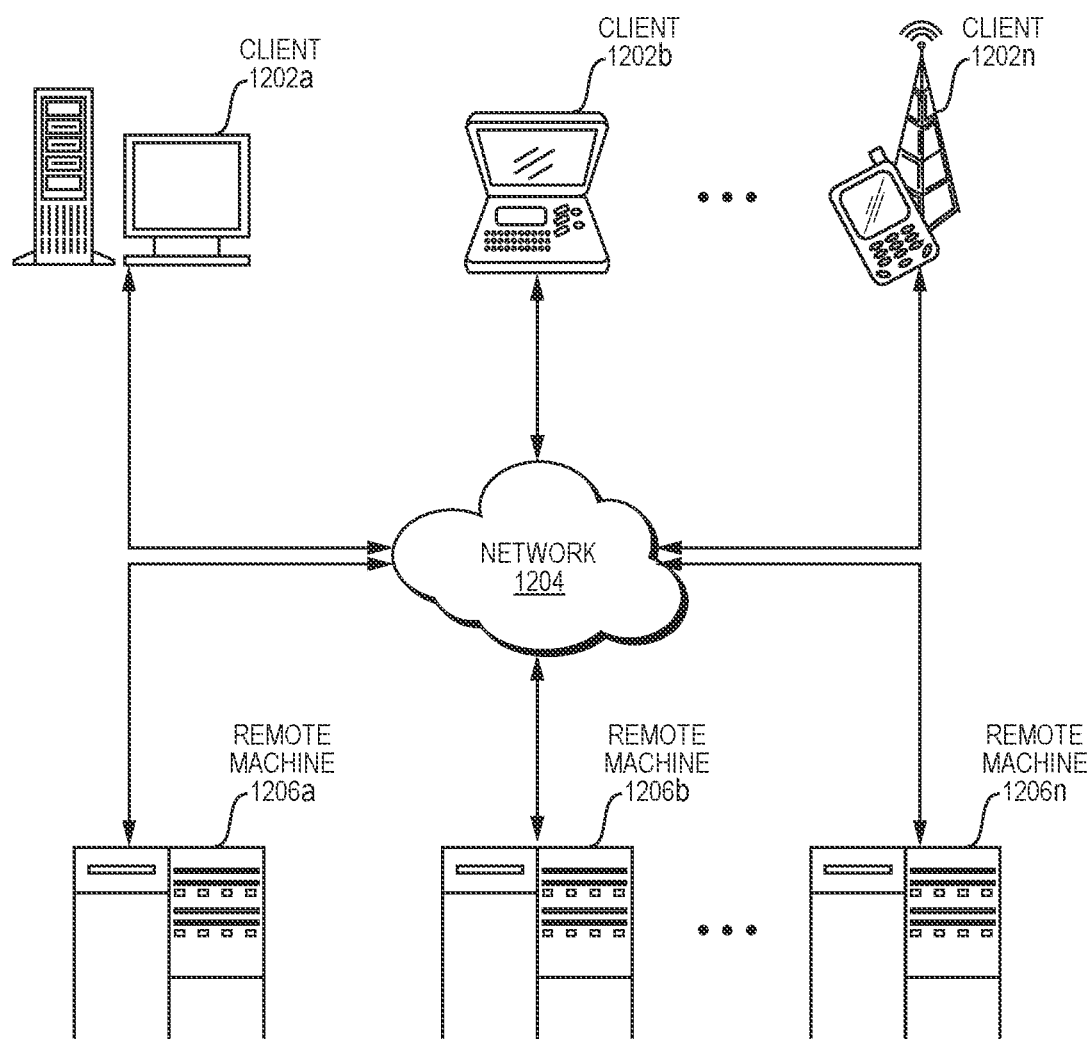
FIGS. 12A-12C are block diagrams depicting embodiments of computers useful in connection with the methods and systems described herein.

More specifically and in connection to FIG. 12A, an embodiment of a network environment is depicted. In brief overview, the network environment comprises one or more clients 1202a-1202n in communication with one or more remote machines 1206a-1206n (also generally referred to as server(s) 1206 or computing device(s) 1206) via one or more networks 1204. The machine 102 described above may be provided as a machine 1202, a machine 1206, or any type of machine 1200.

Although FIG. 12A shows a network 1204 between the clients 1202 and the remote machines 1206, the clients 1202 and the remote machines 1206 may be on the same network 1204. The network 1204 can be a local area network (LAN), such as a company Intranet, a metropolitan area network (MAN), or a wide area network (WAN), such as the Internet or the World Wide Web. In other embodiments, there are multiple networks 1204 between the clients 1202 and the remote machines 1206. In one of these embodiments, a network 1204' (not shown) may be a private network and a network 1204 may be a public network. In another of these embodiments, a network 1204 may be a private network and a network 1204' a public network. In still another embodiment, networks 1204 and 1204' may both be private networks.

The network 1204 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 1204 may comprise a wireless link, such as an infrared channel or satellite band. The topology of the network 1204 may be a bus, star, or ring network topology. The network 1204 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 1202 and a remote machine 1206 (referred to generally as computing devices 1200) may be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 1200 may have different processors, operating systems, and input devices consistent with the device. In other embodiments, the computing device 1200 is a mobile device, digital audio player, digital media player, or a combination of such devices. A computing device 1200 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on the computing device 1200.

In one embodiment, a computing device 1200 provides functionality of a web server. In some embodiments, a web server 1200 comprises an open-source web server, such as the APACHE servers maintained by the Apache Software Foundation of Delaware. In other embodiments, the web server 1200 executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically grouped computing devices 1200. In one of these embodiments, the logical group of computing devices 1200 may be referred to as a server farm. In another of these embodiments, the server farm may be administered as a single entity.

Figure 12B:
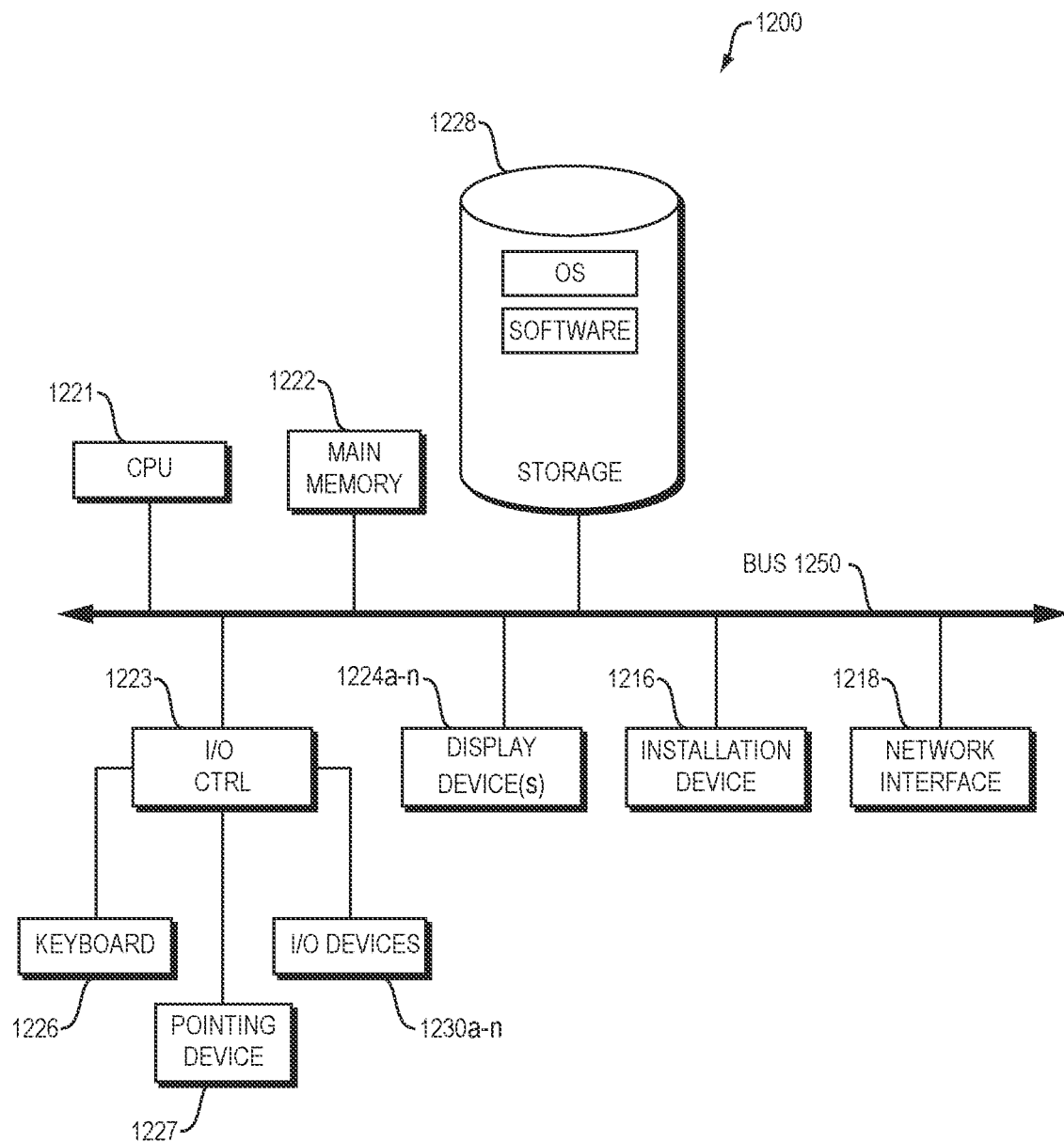
Figure 12C:
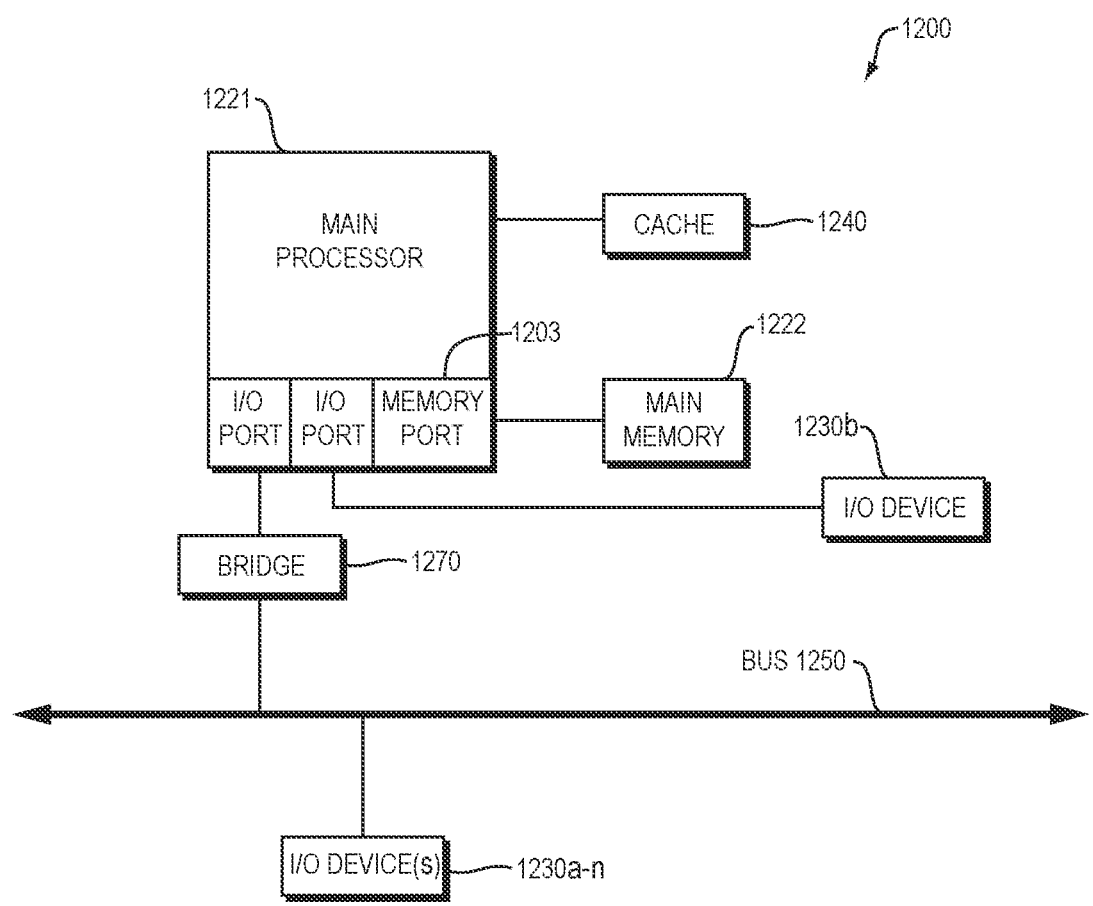

FIGS. 12B and 12C depict block diagrams of a computing device 1200 useful for practicing an embodiment of the client 1202 or a remote machine 1206. As shown in FIGS. 12B and 12C, each computing device 1200 includes a central processing unit 1221, and a main memory unit 1222. As shown in FIG. 12B, a computing device 1200 may include a storage device 1228, an installation device 1216, a network interface 1218, an I/O controller 1223, display devices 1224a-n, a keyboard 1226, a pointing device 1227, such as a mouse, and one or more other I/O devices 1230a-n. The storage device 1228 may include, without limitation, an operating system and software. As shown in FIG. 12C, each computing device 1200 may also include additional optional elements, such as a memory port 1203, a bridge 1270, one or more input/output devices 1230a-1230n (generally referred to using reference numeral 1230), and a cache memory 1240 in communication with the central processing unit 1221.

The central processing unit 1221 is any logic circuitry that responds to and processes instructions fetched from the main memory unit 1222. In many embodiments, the central processing unit 1221 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 1200 may be based on any of these processors, or any other processor capable of operating as described herein.

Main memory unit 1222 may be one or more memory chips capable of storing data and allowing any storage location to be directly accessed by the microprocessor 1221. The main memory 1222 may be based on any available memory chips capable of operating as described herein. In the embodiment shown in FIG. 12B, the processor 1221 communicates with main memory 1222 via a system bus 1250. FIG. 12C depicts an embodiment of a computing device 1200 in which the processor communicates directly with main memory 1222 via a memory port 1203. FIG. 12C also depicts an embodiment in which the main processor 1221 communicates directly with cache memory 1240 via a secondary bus, sometimes referred to as a backside bus. In other embodiments, the main processor 1221 communicates with cache memory 1240 using the system bus 1250.

In the embodiment shown in FIG. 12B, the processor 1221 communicates with various I/O devices 1230 via a local system bus 1250. Various buses may be used to connect the central processing unit 1221 to any of the I/O devices 1230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1224, the processor 1221 may use an Advanced Graphics Port (AGP) to communicate with the display 1224. FIG. 12C depicts an embodiment of a computer 1200 in which the main processor 1221 also communicates directly with an I/O device 1230b via, for example, HYPERTRANSPORT, RAPIDIO, or INFINIBAND communications technology.

A wide variety of I/O devices 1230a-1230n may be present in the computing device 1200. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 1223 as shown in FIG. 12B. Furthermore, an I/O device may also provide storage and/or an installation device 1216 for the computing device 1200. In some embodiments, the computing device 1200 may provide USB connections (not shown) to receive handheld USB storage devices such as the USB Flash Drive line of devices manufactured by Twintech Industry, Inc. of Los Alamitos, Calif.

Referring still to FIG. 12B, the computing device 1200 may support any suitable installation device 1216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 1200 may provide functionality for installing software over a network 1204. The computing device 1200 may further comprise a storage device, such as one or more hard disk drives or redundant arrays of independent disks, for storing an operating system and other software.

Furthermore, the computing device 1200 may include a network interface 1218 to interface to the network 1204 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.15.4, BLUETOOTH, ZIGBEE, CDMA, GSM, WiMax, and direct asynchronous connections). In one embodiment, the computing device 1200 communicates with other computing devices 1200' via any type and/or form of gateway or tunneling protocol such as Secure Socket Layer (SSL) or Transport Layer Security (TLS). The network interface 1218 may comprise a built-in network adapter, network interface card, PCMCIA network card, card bus network adapter, wireless network adapter, USB network adapter, modem, or any other device suitable for interfacing the computing device 1200 to any type of network capable of communication and performing the operations described herein.

In further embodiments, an I/O device 1230 may be a bridge between the system bus 1250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 1200 of the sort depicted in FIGS. 12B and 12C typically operates under the control of operating systems, which control scheduling of tasks and access to system resources. The computing device 1200 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; and LINUX, a freely-available operating system distributed by Caldera Corp. of Salt Lake City, Utah; Red Hat Enterprise Linux, a Linus-variant operating system distributed by Red Hat, Inc, of Raleigh, N.C.; Ubuntu, a freely-available operating system distributed by Canonical Ltd. of London, England; or any type and/or form of a UNIX operating system, among others.

As indicated above, the computing device 1200 can be any type and/or form of computing, telecommunications or media device that is capable of communication and that has sufficient processor power and memory capacity to perform the operations described herein. The computing device 1200 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 1200 is a smart phone, POCKET PC, POCKET PC PHONE, or other portable mobile device supporting Microsoft Windows Mobile Software.

In some embodiments, the computing device 1200 is a digital audio player. In one of these embodiments, the computing device 1200 is a digital audio player such as the Apple IPOD, IPOD Touch, IPOD NANO, and IPOD SHUFFLE lines of devices manufactured by Apple Inc. In another of these embodiments, the digital audio player may function as both a portable media player and as a mass storage device. In other embodiments, the computing device 1200 is a digital audio player such as those manufactured by, for example and without limitation, Samsung Electronics America of Ridgefield Park, N.J., or Creative Technologies Ltd. of Singapore. In yet other embodiments, the computing device 1200 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 1200 comprises a combination of devices, such as a mobile phone combined with a digital audio player or portable media player. In one of these embodiments, the computing device 1200 is a device in the Google/Motorola line of combination digital audio players and mobile phones. In another of these embodiments, the computing device 1200 is a device in the IPHONE smartphone line of devices manufactured by Apple Inc. In still another of these embodiments, the computing device 1200 is a device executing the ANDROID open source mobile phone platform distributed by the Open Handset Alliance; for example, the device 1200 may be a device such as those provided by Samsung Electronics of Seoul, Korea, or HTC Headquarters of Taiwan, R.O.C. In other embodiments, the computing device 1200 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Figure 12D:
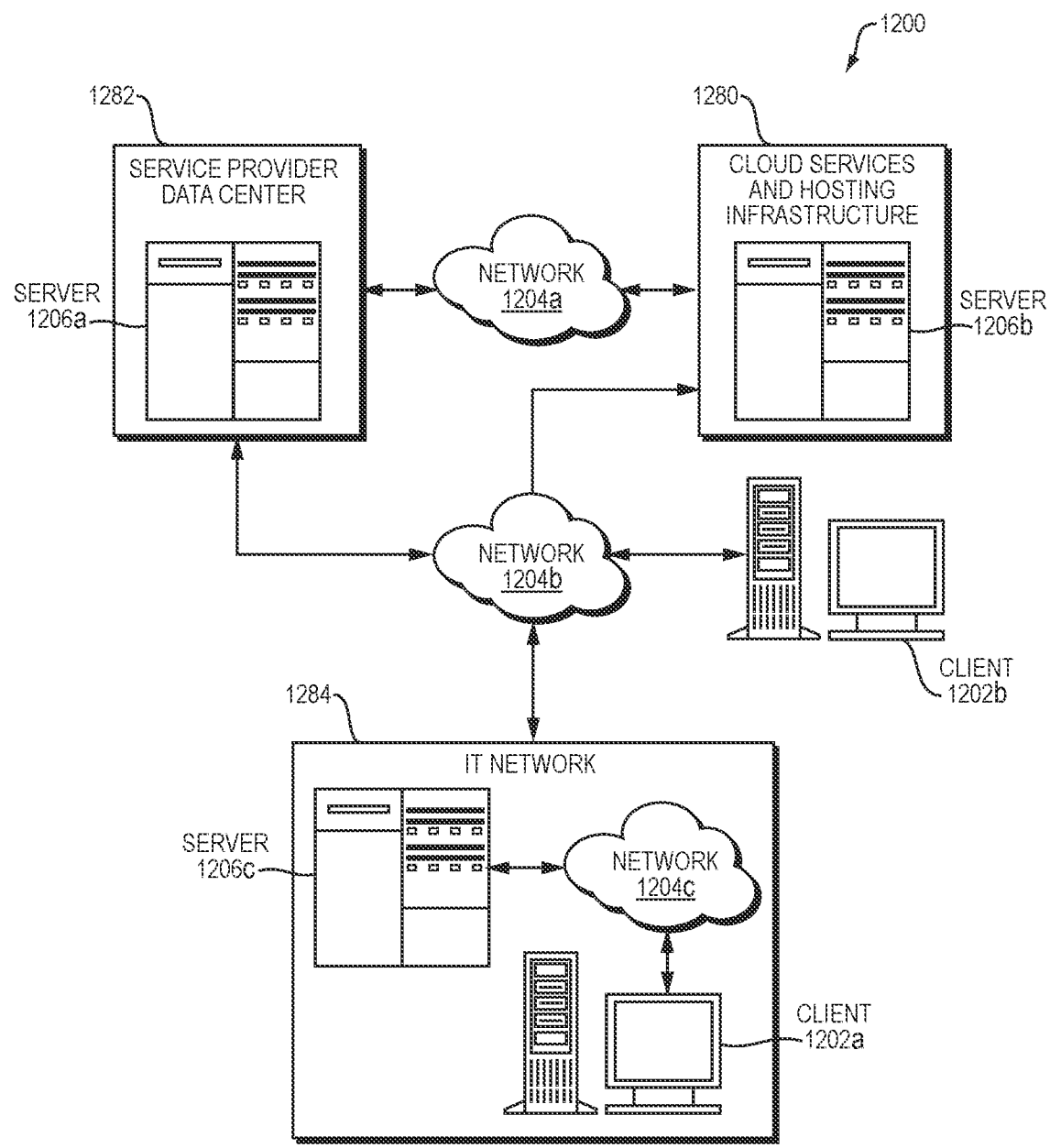
FIG. 12D is a block diagram depicting one embodiment of a system in which a plurality of networks provides data hosting and delivery services.

Referring now to FIG. 12D, a block diagram depicts one embodiment of a system in which a plurality of networks provides hosting and delivery services. In brief overview, the system includes a cloud services and hosting infrastructure 1280, a service provider data center 1282, and an information technology (IT) network 1284.

In one embodiment, the data center 1282 includes computing devices such as, without limitation, servers (including, for example, application servers, file servers, databases, and backup servers), routers, switches, and telecommunications equipment. In another embodiment, the cloud services and hosting infrastructure 1280 provides access to, without limitation, storage systems, databases, application servers, desktop servers, directory services, web servers, as well as services for accessing remotely located hardware and software platforms. In still other embodiments, the cloud services and hosting infrastructure 1280 includes a data center 1282. In other embodiments, however, the cloud services and hosting infrastructure 1280 relies on services provided by a third-party data center 1282. In some embodiments, the IT network 1204C may provide local services, such as mail services and web services. In other embodiments, the IT network 1204*c* may provide local versions of remotely located services, such as locally-cached versions of remotely-located print servers, databases, application servers, desktop servers, directory services, and web servers. In further embodiments, additional servers may reside in the cloud services and hosting infrastructure 1280, the data center 1282, or other networks altogether, such as those provided by third-party service providers including, without limitation, infrastructure service providers, application service providers, platform service providers, tools service providers, and desktop service providers.

In one embodiment, a user of a client 1202 accesses services provided by a remotely located server 1206*a*. For instance, an administrator of an enterprise IT network 1284 may determine that a user of the client 1202*a* will access an application executing on a virtual machine executing on a remote server 1206*a*. As another example, an individual user of a client 1202*b* may use a resource provided to consumers by the remotely located server 1206 (such as email, fax, voice or other communications service, data backup services, or other service).

As depicted in FIG. 12D, the data center 1282 and the cloud services and hosting infrastructure 1280 are remotely located from an individual or organization supported by the data center 1282 and the cloud services and hosting infrastructure 1280; for example, the data center 1282 may reside on a first network 1204*a* and the cloud services and hosting infrastructure 1280 may reside on a second network 1204*b*, while the IT network 1284 is a separate, third network 1204*c*. In other embodiments, the data center 1282 and the cloud services and hosting infrastructure 1280 reside on a first network 1204*a* and the IT network 1284 is a separate, second network 1204*c*. In still other embodiments, the cloud services and hosting infrastructure 1280 resides on a first network 1204*a* while the data center 1282 and the IT network 1284 form a second network 1204*c*. Although FIG. 12D depicts only one server 1206*a*, one server 1200, one server 1206*c*, two clients 1202, and three networks 1204, it should be understood that the system may provide multiple ones of any or each of those components. The servers 1206, clients 1202, and networks 1204 may be provided as described above in connection with FIGS. 12A-12C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 1284 may use a remotely located data center 1282 to store servers (including, for example, application servers, file servers, databases, and backup servers), routers, switches, and telecommunications equipment. The data center 1282 may be owned and managed by the IT network 1284 or a third-party service provider (including for example, a cloud services and hosting infrastructure provider) may provide access to a separate data center 1282. As another example, the machine 102*a* described in connection with FIG. 3 above may owned or managed by a first entity (e.g., a cloud services and hosting infrastructure provider 1280) while the machine 102*b* described in connection with FIG. 3 above may be owned or managed by a second entity (e.g., a service provider data center 1282) to which a client 1202 connects directly or indirectly (e.g., using resources provided by any of the entities 1280, 1282, or 1284).

In some embodiments, one or more networks providing computing infrastructure on behalf of customers is referred to a cloud. In one of these embodiments, a system in which users of a first network access at least a second network, including a pool of abstracted, scalable, and managed computing resources capable of hosting resources, may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 1206 may be leased or rented from third-party companies such as, by way of example and without limitation, Amazon Web Services LLC of Seattle, Wash.; Rackspace US, Inc. of San Antonio, Tex.; Microsoft Corporation of Redmond, Wash.; and Google Inc. of Mountain View, Calif. In other embodiments, all the hosts 1206 are owned and managed by third-party companies including, without limitation, Amazon Web Services LLC, Rackspace US, Inc., Microsoft, and Google.

As described above, many types of hardware may be used in conjunction with the systems and methods described above to provide the described functionality. In some embodiments, however, the hardware itself may be modified so as to provide improved execution of the methods and systems described above.

Figure 17A:
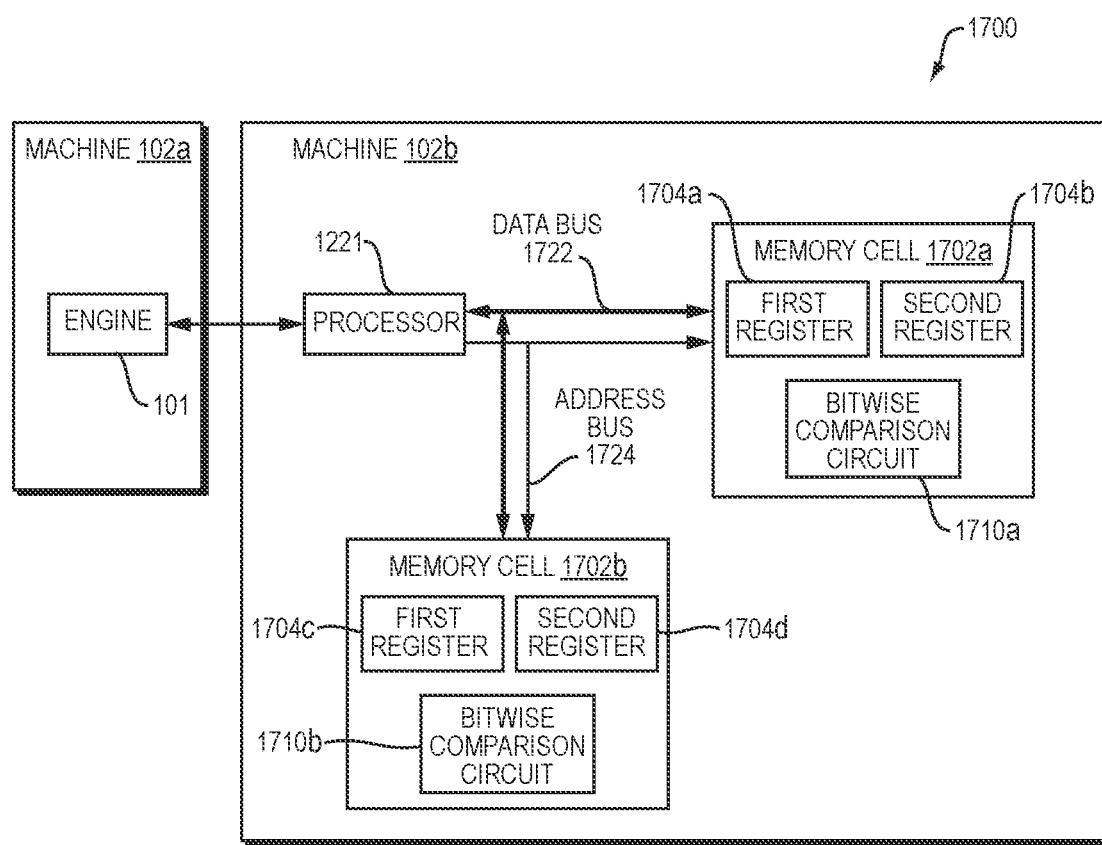
FIG. 17A is a block diagram depicting an embodiment of a system for identifying a level of similarity between a plurality of binary vectors.

FIG. 17A is a block diagram depicting an embodiment of a system for identifying a level of similarity between a plurality of binary vectors. The system 1700 includes a machine 102*a* executing an engine 101 as described above. The system 1700 includes a machine 102*b*, which includes a processor 1221, a data bus 1722 (which may be part of the system bus 1250 or the memory port 1203, each of which is described above), an address bus 1724 (which may be part of the system bus 1250 or the memory port 1203, each of which is described above), and a plurality of memory cells 1702*a-n* (which may be referred to herein as memory cells 1702). The memory cells 1702 each include a first register 1704*a*, a second register 1704*b*, and a bitwise comparison circuit 1710.

Figure 17B:
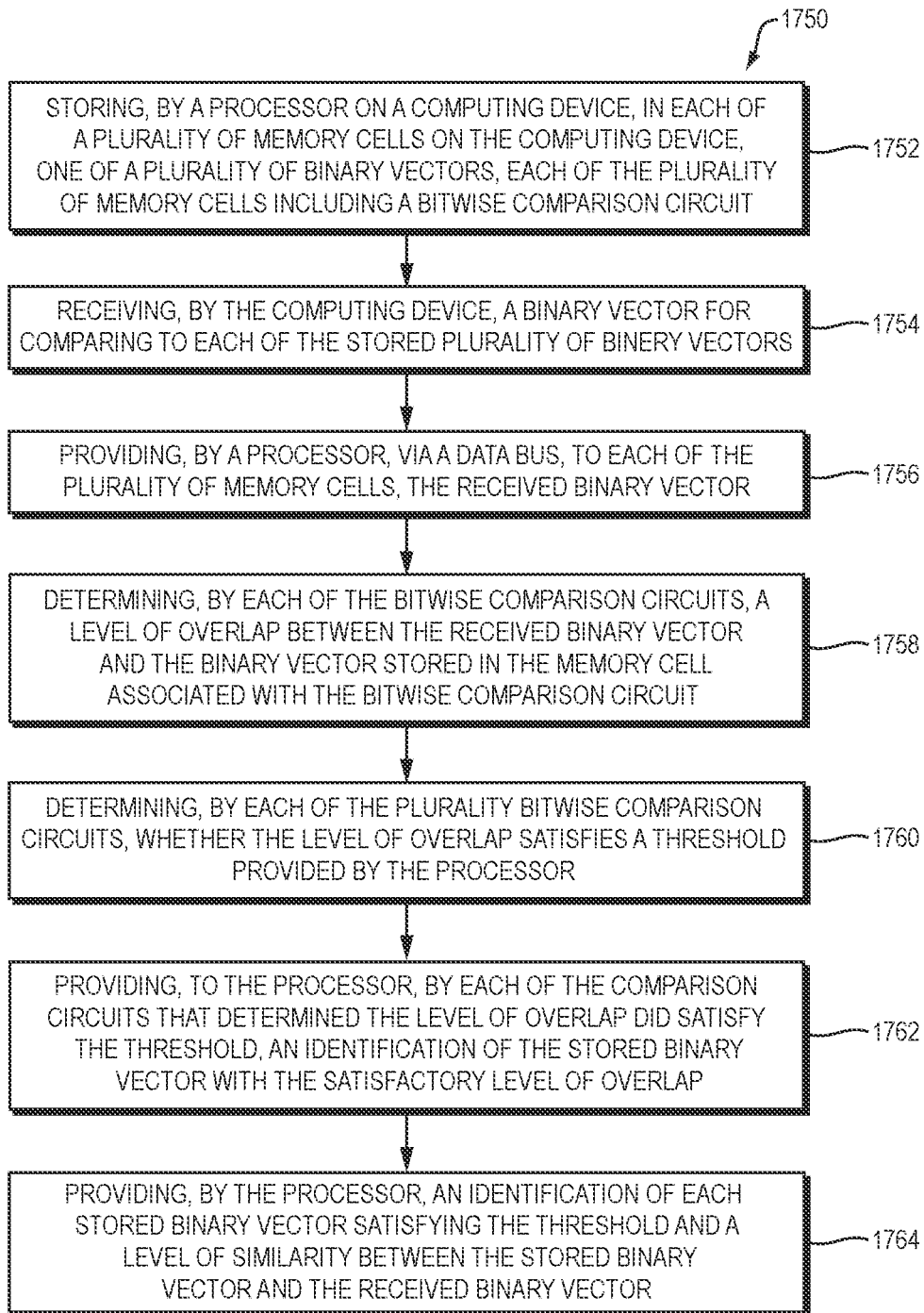
FIG. 17B is a flow diagram depicting an embodiment of a method for identifying a level of similarity between a plurality of binary vectors.

Referring now to FIG. 17B, and in connection with FIG. 17A, a flow diagram depicting an embodiment of a method 1750 for identifying a level of similarity between a plurality of binary vectors. The method 1750 includes storing, by a processor on a computing device, in each of a plurality of memory cells on the computing device, one of a plurality of binary vectors, each of the plurality of memory cells including a bitwise comparison circuit (1752). The method 1750 includes receiving, by the computing device, a binary vector for comparing to each of the stored plurality of binary vectors (1754). The method 1750 includes providing, by a processor, via a data bus, to each of the plurality of memory cells, the received binary vector (1756). The method 1750 includes determining, by each of the bitwise comparison circuits, a level of overlap between the received binary vector and the binary vector stored in the memory cell associated with the bitwise comparison circuit (1758). The method 1750 includes determining, by each of the plurality of bitwise comparison circuits, whether the level of overlap satisfies a threshold provided by the processor (1760). The method 1750 includes providing, to the processor, by each of the comparison circuits that determined the level of overlap did satisfy the threshold, an identification of the stored binary vector with the satisfactory level of overlap (1762). The method 1750 includes providing, by the processor, an identification of each stored binary vector satisfying the threshold and a level of similarity between the stored binary vector and the received binary vector (1764).

The method 1750 includes storing, by a processor on a computing device, in each of a plurality of memory cells on the computing device, one of a plurality of binary vectors, each of the plurality of memory cells including a bitwise comparison circuit (1752). The processor 1221 may receive the plurality of binary vectors for storage from the engine 101. In one embodiment, the processor 1221 uses an address bus 1724 to identify a memory cell into which one of the plurality of binary vectors will be stored. In another embodiment, the processor 1221 uses the data bus 1722 to transmit the binary vector to the memory cell for storage in the first register 1704a. The machine 102b may implement cell selector logic, chip selector logic, and board selector logic to address a particular memory cell in which a binary vector will be stored.

The method 1750 includes receiving, by the computing device, a binary vector for comparing to each of the stored plurality of binary vectors (1754). In one embodiment, the processor 1221 receives the binary vector. In another embodiment, a user (e.g., of the machine 102b or a different machine 100) provides the binary vector. In some embodiments, the processor 1221 also receives a request for an identification of similar binary vectors.

The method 1750 includes providing, by a processor, via a data bus, to each of the plurality of memory cells, the received binary vector (1756). In one embodiment, the processor 1221 transmits the same binary vector to all of the memory cells. In another embodiment, the processor 1221 transmits an instruction to store the received binary vector (e.g., in the second register 1704b). In another embodiment, the processor 1221 send an instruction to compare the previously stored binary vector (e.g., the binary vector in the first register 1704a) and the received binary vector (e.g., stored in the second register 1704b).

The method 1750 includes determining, by each of the bitwise comparison circuits, a level of overlap between the received binary vector and the binary vector stored in the memory cell associated with the bitwise comparison circuit (1758). In one embodiment, a bitwise comparison circuit in a memory cell instructs a shift register to compare a bit in the first register 1704a with a corresponding bit in the second register 1704b (e.g., both of the bits in the first position in the registers, both of the bits in the second position in the registers, and so on). In another embodiment, the bitwise comparison circuit instructs the shift register to return a 1 if both bits at a particular position are set to 1 (e.g., if the bits are the same). In still another embodiment, the bitwise comparison circuit adds the number of is received to calculate a number that represents a level of overlap between the received binary vector and the binary vector stored in the memory cell associated with the bitwise comparison circuit.

The method 1750 includes determining, by each of the plurality of bitwise comparison circuits, whether the level of overlap satisfies a threshold provided by the processor (1760). In one embodiment, the processor 1221 sends to the memory cell a number that represents a certain percentage of overlap (e.g., in a memory cell that can store 16,000 pieces of information in a register, the processor 1221 would send over the number 16,000 if it only wanted to receive an identification of memory cells in which there was 100% overlap between the binary vectors); the bitwise comparison circuit determines whether the calculated level of overlap matches the number sent from the processor 1221. For example, without limitation, if the bitwise comparison circuit determined that there 16,000 instances where the two registers each contained the same data, the bitwise comparison circuit could transmit to the processor an indication that the memory cell satisfies the threshold level of overlap; if the bitwise comparison circuit determined that there only 14,000 instances where the two registers each contained the same data, the bitwise comparison circuit would not respond to the processor 1221. In some embodiments, the processor 1221 uses a number representing a threshold level of overlap previously specified by a user. In other embodiments, the processor 1221 uses the highest available number (e.g., highest number of bits the registers are capable of storing) as a counter and decrements the number it transmits to the memory cells, recursing until it receives a response from a bitwise comparison circuit indicating that there is a memory cell storing a binary vector that has a level of overlap with the received binary vector that satisfies the threshold received from the processor 1221.

The method 1750 includes providing, to the processor, by each of the comparison circuits that determined the level of overlap did satisfy the threshold, an identification of the stored binary vector with the satisfactory level of overlap (1762). For example, an identifier may be stored in a third register.

The method 1750 includes providing, by the processor, an identification of each stored binary vector satisfying the threshold and a level of similarity between the stored binary vector and the received binary vector (1764). The processor may return the identification directly to a user (e.g., via a user interface). Alternatively, the processor may return the identification to any executing process in which a comparison between two binary vectors was originally requested.

In this way, comparison and sorting are both accomplished at the same time and in the memory cell, not the processor. In contrast to the methods and systems described herein, conventional systems for leveraging memory cannot feasibly store large binary vectors because typical techniques for size reduction (e.g. hashing) are ineffective for comparisons between very large binary vectors.

In some embodiments, the systems and methods described in connection with FIGS. 17A and 17B may be leveraged to improve the efficiency and speed of comparisons. In one of these embodiments, therefore, the systems and methods may be used to replace or augment the similarity engine 304 (effectively implementing the similarity engine 304 in hardware instead of software). The systems and methods described above in connection with FIG. 1A through 16 may be combined with the systems and methods described in connection with FIGS. 17A and 17B.

Figure 18A:
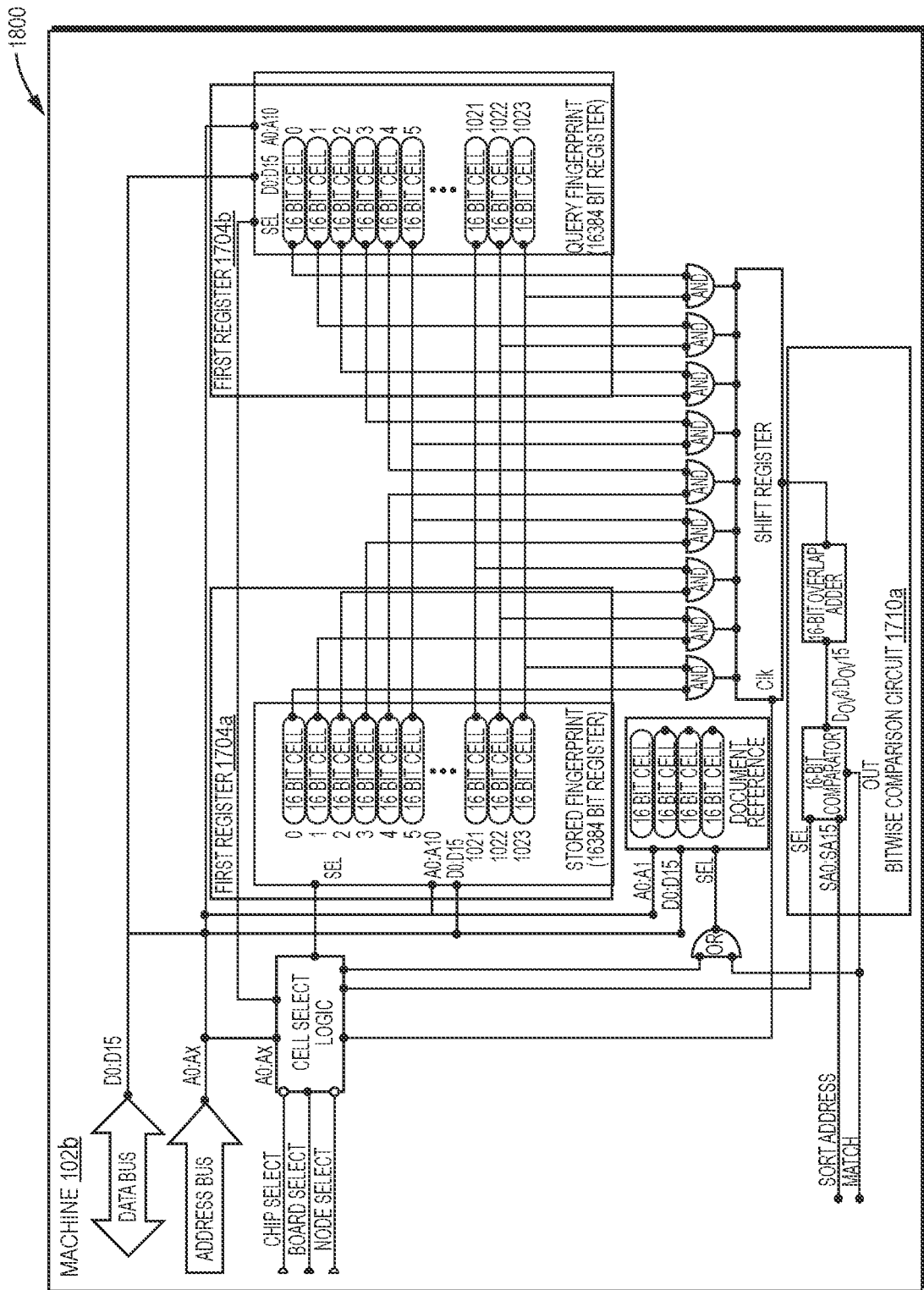
FIG. 18A is a block diagram depicting an embodiment of a system for identifying a level of similarity between a plurality of data representations.
Figure 18B:
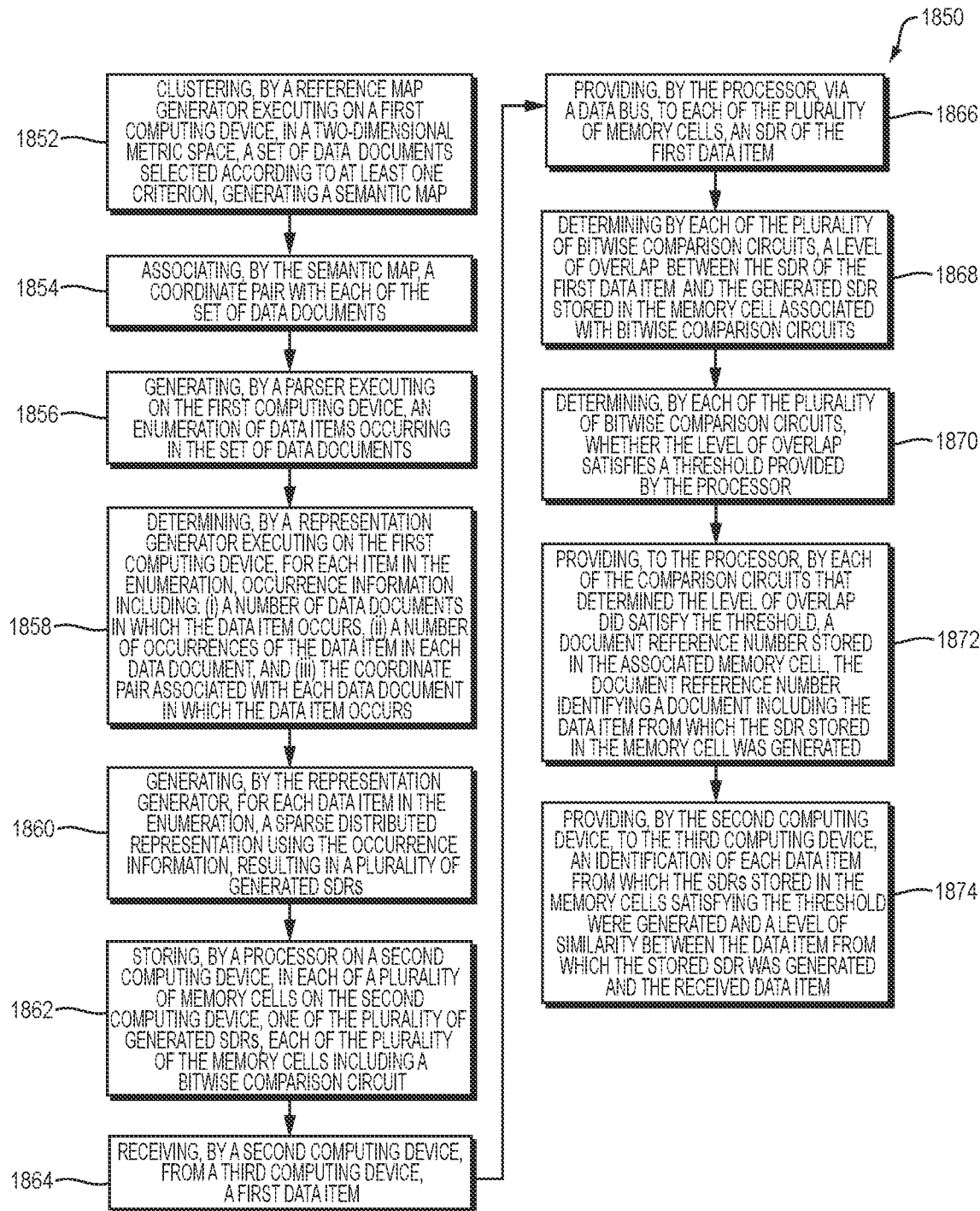
FIG. 18B is a flow diagram depicting an embodiment of a method for identifying a level of similarity between a plurality of data representations.

FIG. 18A is a block diagrams depicting an embodiment of a system for identifying a level of similarity between a plurality of data representations. In addition to the components explicitly described in connection with FIG. 17A above, the methods and systems described herein may include the components described in FIG. 18A. For example, a separate register may be used to store a document reference that identifies a document including a data item from which a stored SDR ("fingerprint") was generated. As another example, the bitwise comparison circuit moa may include additional subcomponents, such as an overlap adder and a comparator that provides the functionality described herein. FIG. 18B is a flow diagram depicting an embodiment of a method for identifying a level of similarity between a plurality of data representations.

Referring to FIGS. 18A-B, and in conjunction with FIGS. 17A-B, a method 1850 for identifying a level of similarity between a first data item and a data item within a set of data documents includes clustering, by a reference map generator executing on a first computing device, in a two-dimensional metric space, a set of data documents selected according to at least one criterion, generating a semantic map (1852). The method 1850 includes associating, by the semantic map, a coordinate pair with each of the set of data documents (1854). The method 1850 includes generating, by a parser executing on the first computing device, an enumeration of data items occurring in the set of data documents (1856). The method 1850 includes determining, by a representation generator executing on the first computing device, for each data item in the enumeration, occurrence information including: (i) a number of data documents in which the data item occurs, (ii) a number of occurrences of the data item in each data document, and (iii) the coordinate pair associated with each data document in which the data item occurs (1858). The method 1850 includes generating, by the representation generator, for each data item in the enumeration, a sparse distributed representation (SDR) using the occurrence information, resulting in a plurality of generated SDRs (1860). The method 1850 includes storing, by a processor on a second computing device, in each of a plurality of memory cells on the second computing device, one of the plurality of generated SDRs, each of the plurality of memory cells including a bitwise comparison circuit (1862). The method 1850 includes receiving, by the second computing device, from a third computing device, a first data item (1864). The method 1850 includes providing, by the processor, via a data bus, to each of the plurality of memory cells, an SDR of the first data item (1866). The method 1850 includes determining, by each of the plurality of bitwise comparison circuits, a level of overlap between the SDR of the first data item and the generated SDR stored in the memory cell associated with the bitwise comparison circuit (1868). The method 1850 includes determining, by each of the plurality of bitwise comparison circuits, whether the level of overlap satisfies a threshold provided by the processor (1870). The method 1850 includes providing, to the processor, by each of the comparison circuits that determined the level of overlap did satisfy the threshold, a document reference number stored in the associated memory cell, the document reference number identifying a document including the data item from which the SDR stored in the memory cell was generated (1872). The method 1850 includes providing, by the second computing device, to the third computing device, an identification of each data item from which the SDRs stored in the memory cells satisfying the threshold were generated and a level of similarity between the data item from which the stored SDR was generated and the received data item (1874).

In one embodiment, (1852)-(1860) are performed as described above in connection with FIG. 2 (202)-(214).

The method 1850 includes storing, by a processor on a second computing device, in each of a plurality of memory cells on the second computing device, one of the plurality of generated SDRs, each of the plurality of memory cells including a bitwise comparison circuit (1862). The processor may store each of the plurality of generated SDRs in the plurality of memory cells as described above in connection with FIG. 17B (1752).

The method 1850 includes receiving, by the second computing device, from a third computing device, a first data item (1864). The processor may receive the first data item as described above (e.g., without limitation, in connection with FIG. 5).

The method 1850 includes providing, by the processor, via a data bus, to each of the plurality of memory cells, an SDR of the first data item (1866). The processor may first direct the generation of the SDR as described above and then provide the generated SDR to the memory cells for comparison with previously stored SDRs.

The method 1850 includes determining, by each of the plurality of bitwise comparison circuits, a level of overlap between the SDR of the first data item and the generated SDR stored in the memory cell associated with the bitwise comparison circuit (1868). The bitwise comparison circuit may perform the determination as described above in connection with FIGS. 17A-B.

The method 1850 includes determining, by each of the plurality of bitwise comparison circuits, whether the level of overlap satisfies a threshold provided by the processor (1870). The bitwise comparison circuit may perform the determination as described above in connection with FIGS. 17A-B.

The method 1850 includes providing, to the processor, by each of the comparison circuits that determined the level of overlap did satisfy the threshold, a document reference number stored in the associated memory cell, the document reference number identifying a document including the data item from which the SDR stored in the memory cell was generated (1872). The bitwise comparison circuit may provide the determined level of overlap as described above in connection with FIGS. 17A-B.

The method 1850 includes providing, by the second computing device, to the third computing device, an identification of each data item from which the SDRs stored in the memory cells satisfying the threshold were generated and a level of similarity between the data item from which the stored SDR was generated and the received data item (1874). The processor may provide the identifications as described above in connection with FIGS. 17A-B, either to the third computer directly or to other processors executing any of the methods described above in connection with FIGS. 1A-16 that implement comparisons between SDRs.

Having described certain embodiments of methods and systems for identifying a level of similarity between a plurality of data representations, it will now become apparent to one of skill in the art that other embodiments incorporating the concepts of the disclosure may be used.

What is claimed is:

1. A computer-implemented method for identifying a level of similarity between a first data item and a data item within a set of data documents, the method comprising:

clustering, by a reference map generator executing on a first computing device, in a two-dimensional metric space, a set of data documents selected according to at least one criterion and associated with a medical diagnosis, generating a semantic map;

associating, by the semantic map, a coordinate pair with each of the set of data documents;

generating, by a parser executing on the first computing device, an enumeration of measurements occurring in the set of data documents;

determining, by a representation generator executing on the first computing device, for each measurement in the enumeration, occurrence information including: (i) a number of data documents in which the measurement occurs, (ii) a number of occurrences of the measurement in each data document, and (iii) the coordinate pair associated with each data document in which the measurement occurs;

generating, by the representation generator, for each measurement in the enumeration, a sparse distributed representation (SDR) using the occurrence information, resulting in a plurality of generated SDRs;

storing, by a processor on a second computing device, in each of a plurality of memory cells on the second computing device, one of the plurality of generated SDRs, each of the plurality of memory cells including a bitwise comparison circuit;

receiving, by a diagnosis support module executing on the first computing device, from a third computing device, a document comprising a plurality of measurements, the document associated with a medical patient;

generating, by the representation generator, at least one SDR for the plurality of measurements;

generating, by the representation generator, a compound SDR for the document, based on the at least one SDR generated for the plurality of measurements;

providing, by the processor on the second computing device, via a data bus, to each of the plurality of memory cells, the compound SDR;

determining, by each of the plurality of bitwise comparison circuits, a level of overlap between the compound SDR and the generated SDR stored in the memory cell associated with the bitwise comparison circuit;

determining, by each of the plurality of bitwise comparison circuits, whether the level of overlap satisfies a threshold provided by the processor;

providing, to the processor on the second computing device, by each of the comparison circuits that determined the level of overlap did satisfy the threshold, a document reference number stored in the associated memory cell, the document reference number identifying a document including the measurement from which the SDR stored in the memory cell was generated; and providing, by the first computing device, to the third computing device, (i) an identification of each measurement from which the SDRs stored in the memory cells satisfying the threshold were generated and (ii) a level of similarity between the measurement from which the stored SDR was generated and the received document comprising the plurality of measurements and (iii) an identification of the medical diagnosis associated with the stored SDR, based on the determined level of semantic similarity.

2. The method of claim 1 further comprising receiving, prior to clustering, access to the set of data documents, at least one of the set of documents including a set of lab values taken from a sample.

3. The method of claim 1, wherein generating, by the parser, the enumeration of measurements occurring in the set of data documents further comprises receiving, by the parser, from a binning module, the enumeration of measurements.

4. The method of claim 3 further comprising:

identifying, by the binning module, a range of values for each of a plurality of types of measurement included in the set of data documents;

receiving, by the binning module, user input specifying a method for distributing the range of values; and distributing, by the binning module, the range of values into one or more sub-groups, responsive to the received user input.

* * * * *